United States Patent
Shirakawa

(10) Patent No.: US 6,612,292 B2
(45) Date of Patent: Sep. 2, 2003

(54) FUEL INJECTION CONTROL FOR DIESEL ENGINE

(75) Inventor: Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 81 days.

(21) Appl. No.: 09/997,029

(22) Filed: Nov. 30, 2001

(65) Prior Publication Data
US 2002/0124828 A1 Sep. 12, 2002

(30) Foreign Application Priority Data
Jan. 9, 2001 (JP) ............................. 2001-001547

(51) Int. Cl.⁷ ............................................. F02M 37/04
(52) U.S. Cl. ........................ 123/501; 123/502; 123/357
(58) Field of Search ................................. 123/299, 300, 123/501, 502, 357, 672, 679

(56) References Cited

U.S. PATENT DOCUMENTS

| | | | | |
|---|---|---|---|---|
| 5,803,022 A | * | 9/1998 | Nelson et al. | 123/25 D |
| 6,158,413 A | * | 12/2000 | Kimura et al. | 123/306 |
| 6,161,519 A | * | 12/2000 | Kimura et al. | 123/299 |
| 6,276,347 B1 | * | 8/2001 | Hunt | 123/549 |
| 6,332,447 B1 | * | 12/2001 | Kimura et al. | 123/299 |
| 6,390,076 B2 | * | 5/2002 | Hunt | 123/549 |

FOREIGN PATENT DOCUMENTS

| | | |
|---|---|---|
| JP | 6-346763 | 12/1994 |
| JP | 2864896 | 12/1998 |
| JP | 2000-64891 | 2/2000 |

OTHER PUBLICATIONS

Ito et al., "Injection Rate Shaping Technology with Common Rail Fuel System (ECD–U2)," Lecture Papers of the 13$^{th}$ Symposium on the Internal Combustion Engine, Jul. 1996, pp. 73–77.

* cited by examiner

Primary Examiner—John Kwon
(74) Attorney, Agent, or Firm—Foley & Lardner

(57) ABSTRACT

A sensor (55) detects a parameter expressing the oxygen concentration or oxygen amount in gas aspirated into the diesel engine (51). A controller (41) calculates a target parameter during a steady running state of the diesel engine (51) (S4) and calculates a difference between the measured parameter and the target parameter (S212). When the difference is large, following a small amount of pilot fuel injection, a main fuel injection is performed at a timing that makes the combustion of fuel complete before the compression top dead center of the piston (51C). When the difference is small, a larger amount of pilot fuel injection is performed and the main fuel injection is performed after the injected fuel is combusted. By varying the fuel injection pattern in this way, combustion noise and the deterioration of exhaust gas composition in a transient running state of the diesel engine (51) is suppressed.

13 Claims, 50 Drawing Sheets

FIG. 46A FUEL INJECTION AMOUNT
FIG. 46B EXHAUST PRESSURE
FIG. 46C INTAKE PRESSURE
FIG. 46D EGR RATE
FIG. 46E EXCESS AIR FACTOR

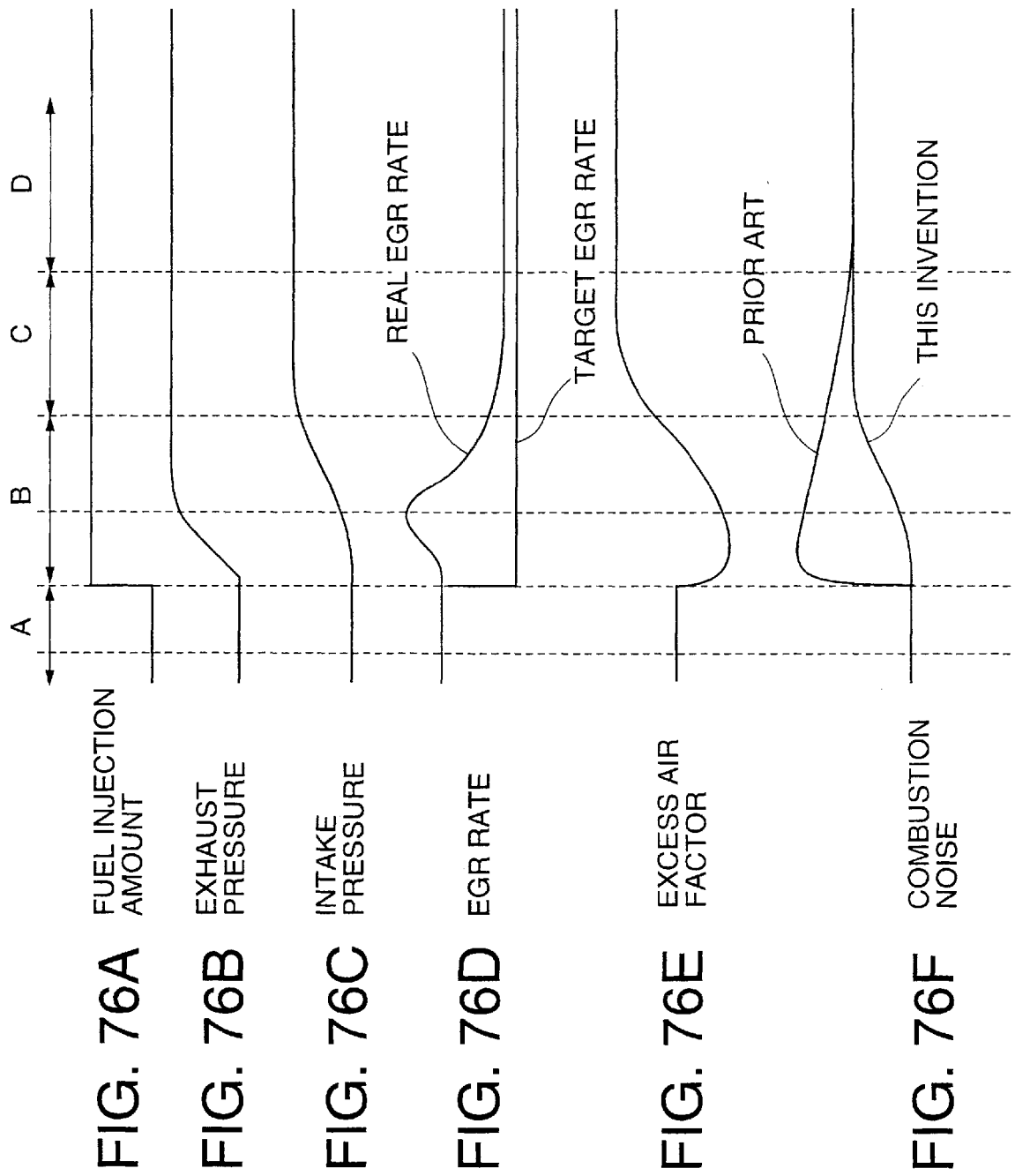

FUEL INJECTION CONTROL FOR DIESEL ENGINE

FIELD OF THE INVENTION

This invention relates to fuel injection control for preventing combustion noise in a transient running state of a diesel engine.

BACKGROUND OF THE INVENTION

Tokkai Hei 6-346763 published by the Japanese Patent Office in 1994 and Japanese Patent No. 2864896 issued by the Japanese Patent Office in 1998 disclose low-temperature premixing combustion performed by a diesel engine in order to reduce noise and smoke produced by the operation thereof.

This low-temperature premixing combustion is applied specifically to a diesel engine for a vehicle that has a low compression ratio ranging from 14 to 18 and is provided with an exhaust gas recirculation system, a turbocharger and a swirl control valve.

In a diesel engine designed to perform the low-temperature premixing combustion, fuel ignition timing is largely retarded to lengthen the ignition delay period of injected fuel so that the fuel injection is terminated and the injected fuel is fully mixed with air within this ignition delay period. Further, large amounts of exhaust gas recirculation (EGR) is conducted so that the resultant fuel mixture is burnt gradually. On the other hand, an excess air factor of the fuel mixture is maintained by turbocharging and the premixing is enhanced by a swirl control valve.

SUMMARY OF THE INVENTION

The low-temperature premixing combustion as described above is effective in suppressing the generation of noise and smoke in a steady running state of the engine, but results in the following problems in a transient running state such as when the engine is accelerating.

The operation mechanism of the engine during acceleration may be described as follows.

Firstly the fuel injection amount is increased and the exhaust pressure and exhaust temperature are increased as a result of combustion of increased fuel. The energy of the exhaust gas drives the exhaust gas turbine of the turbocharger and the compressor of the turbocharger which is driven by the exhaust gas turbine increases the fresh air intake amount into the engine.

Due to a turbo-lag of the turbocharger, a differential pressure upstream and downstream of the EGR valve is temporarily increased by the decrease in the intake pressure during the initial period of acceleration. Thus the exhaust gas recirculation amount is also temporarily increased. With the increase in the exhaust gas recirculation amount, the excess air factor of the gaseous fuel mixture in the engine is reduced and the ignition delay period of injected fuel may undergo an abnormal increase.

When the ignition delay period undergoes an abnormal increase, since the fuel is rapidly combusted after ignition, it is not possible to realize low-temperature premixing combustion. As a result, a large combustion noise is generated and exhaust gas composition is adversely affected.

It is therefore an object of this invention to prevent increases in noise and to prevent adverse effects on exhaust gas composition in the transient running state of the diesel engine.

In order to achieve the above object, this invention provides a fuel injection control device for such a diesel engine that comprises a piston reciprocating through a compression top dead center and a fuel injection mechanism of which a fuel injection amount and a fuel injection timing is controllable. The fuel injection control device comprises a sensor which detects a parameter expressing either of oxygen concentration and oxygen amount in gas aspirated into the diesel engine, and a programmable controller. The controller is programmed to calculate a difference between a parameter value set for a steady running state of the diesel engine and the parameter detected by the sensor. The controller is further programmed to control the fuel injection mechanism, when the difference is greater than a predetermined value, to cause the fuel injection mechanism to perform a main fuel injection at a first timing which completes a combustion of an injected fuel before the compression top dead center and a pilot fuel injection at a second timing earlier than the first timing. The controller is further programmed to control the fuel injection mechanism, when the difference is smaller than the predetermined value, to cause the fuel injection mechanism to perform a pilot fuel injection at a third timing with an injection amount which is larger than an injection amount of the pilot injection performed when the difference is greater than the predetermined value, and a main injection at a fourth timing, an interval between the third timing and the fourth timing being larger than a period required for combusting fuel injected by the pilot injection at the third timing.

This invention also provides a fuel injection control method for such a diesel engine that comprises a piston reciprocating through a compression top dead center and a fuel injection mechanism of which a fuel injection amount and a fuel injection timing is controllable. The fuel injection control method comprises detecting a parameter expressing either of oxygen concentration and oxygen amount in gas aspirated into the diesel engine, and calculating a difference between a parameter value set for a steady running state of the diesel engine and the parameter detected by the sensor. The method further comprises controlling the fuel injection mechanism, when the difference is greater than a predetermined value, to cause the fuel injection mechanism to perform a main fuel injection at a first timing which completes a combustion of an injected fuel before the compression top dead center and a pilot fuel injection at a second timing earlier than the first timing. The method further comprises controlling the fuel injection mechanism, when the difference is smaller than the predetermined value, to cause the fuel injection mechanism to perform a pilot fuel injection at a third timing with an injection amount which is larger than an injection amount of the pilot injection injection at a fourth timing, an interval between the third timing and the fourth timing being larger than a period required for combusting fuel injected by the pilot injection at the third timing.

The details as well as other features and advantages of this invention are set forth in the remainder of the specification and are shown in the accompanying drawings.

BRIEF DESCRIPTION OF THE DRAWINGS

FIGS. 76A–76F are timing charts showing combustion injection control executed by the fuel injection control device according to this invention during acceleration of the diesel engine.

DESCRIPTION OF THE PREFERRED EMBODIMENTS

Figure 1:
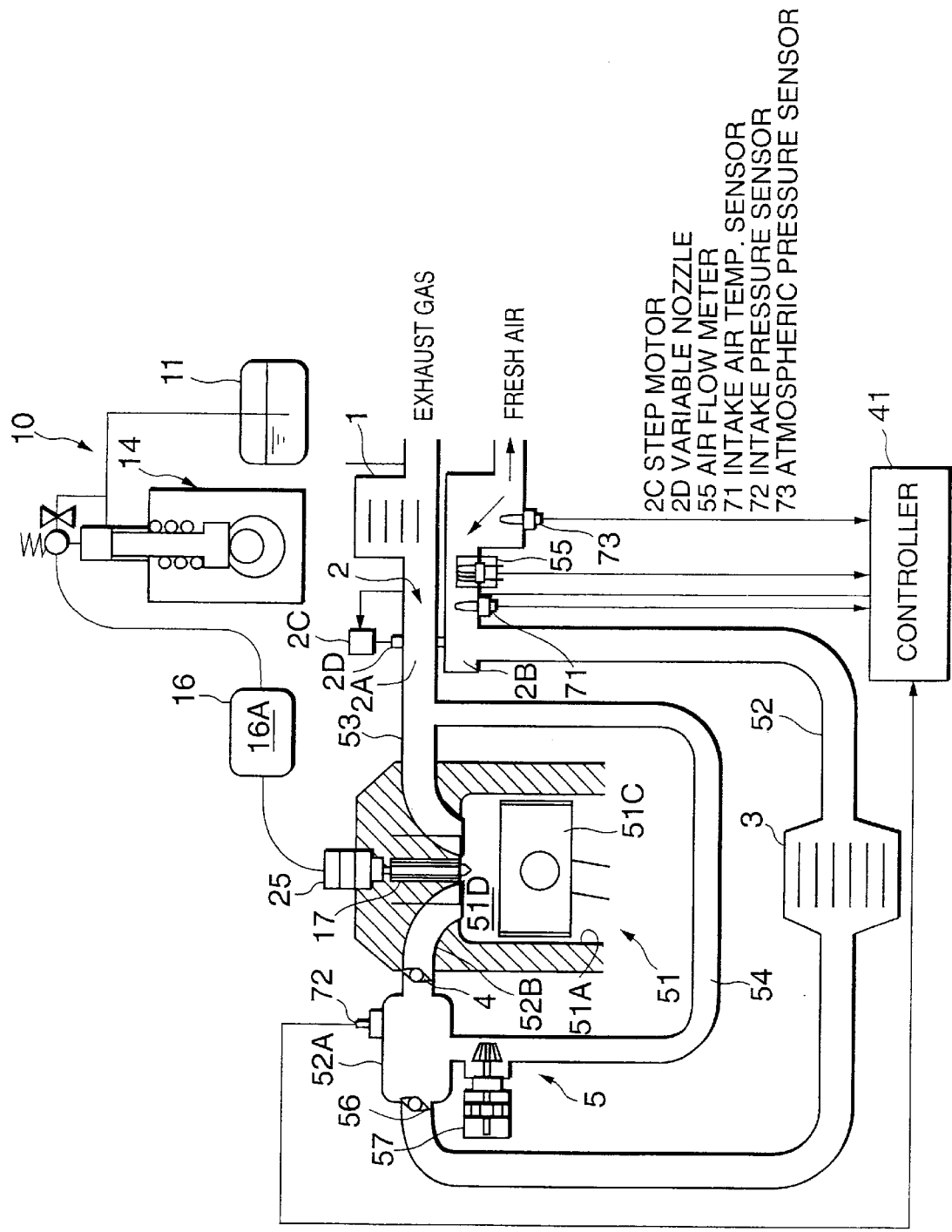
FIG. 1 is a schematic diagram of a fuel injection control device for a diesel engine according to this invention.

Referring to FIG. 1 of the drawings, a diesel engine 51 for a vehicle is operated with turbocharging by a turbocharger 2 and exhaust gas recirculation by a exhaust gas recirculation (EGR) mechanism 5. The diesel engine 51 is a multi-cylinder engine adapted to perform low-temperature premixing combustion with a pattern of heat release corresponding to single-stage combustion. A piston 51C is stored in each cylinder 51A of the diesel engine 51. A combustion chamber 51D is partitioned inside the cylinder 51A by the piston 51C.

The diesel engine 51 is provided with an intake passage 52 and an exhaust passage 53.

A compressor 2B of the turbocharger 2, an inter-cooler 3 which cools intake air and a throttle 56 are provided in the intake passage 52.

The intake passage 52 is connected to the combustion chamber 51D via a collector 52A and an intake manifold 52B. A swirl control valve 4 is provided in the intake manifold 52B. The swirl control valve 4 forms a swirl in the airflow entering the combustion chamber 51D by closing a part of a sectional area of intake air when the diesel engine 51 is operating at a low rotation speed and low load.

The combustion chamber 51D is so called a large diameter toroidal combustion chamber comprising a cylindrical cavity formed on the top of the piston 51. A conical portion is formed in the bottom of the cavity so as to reduce resistance to the swirl entering the cavity, thereby promoting nature of air and fuel. Furthermore the shape of the cavity allows the swirl to extend from within the cavity to the outside as the piston is depressed by combustion.

An airflow meter 55 which detects an intake fresh air flowrate, an intake air temperature sensor 71 which detects a temperature of intake fresh air and an atmospheric pressure sensor 73 which detects atmospheric pressure Pa are provided in the intake passage 52 upstream of the compressor 2B.

The exhaust passage 53 is provided with a catalytic converter 1 and an exhaust gas turbine 2A of the turbocharger 2. The exhaust gas turbine 2A and the compressor 2B rotate together on a same rotation shaft. The exhaust gas turbine 2A rotates according to a pressure of exhaust gas flowing in through a variable nozzle 2D. The variable nozzle 2D is driven by a step motor 2C. When the engine 51 is operating in a low rotation speed region, the sectional area of exhaust gas flow is reduced and the exhaust pressure applied to the exhaust gas turbine 2A is increased by narrowing the variable nozzle 2D. It is possible to use a diaphragm actuator and a pressure control valve instead of the step motor 2C.

The EGR mechanism 5 comprises an exhaust gas recirculation passage (EGR passage) 54 and an exhaust gas recirculation valve (EGR valve) 57. The EGR passage 54 branches from the exhaust passage 53 upstream of the exhaust gas turbine 2A and is connected to the collector 52A. The EGR valve 57 is provided in the EGR passage 54. An exhaust gas recirculation amount (EGR amount) which is recirculated to the collector 52A from the exhaust passage 53 undergoes variation in response to the opening of the EGR valve 57 and the differential pressure between an intake negative pressure that is dependent on an opening the throttle 56 and the exhaust pressure of the exhaust passage 53.

An intake pressure sensor 72 which detects a pressure in the collector 52A as an intake pressure Pm is provided in the collector 52A.

Fuel from the fuel injection mechanism 10 is supplied to each combustion chamber 51D by injection from a nozzle 17.

Figure 2:
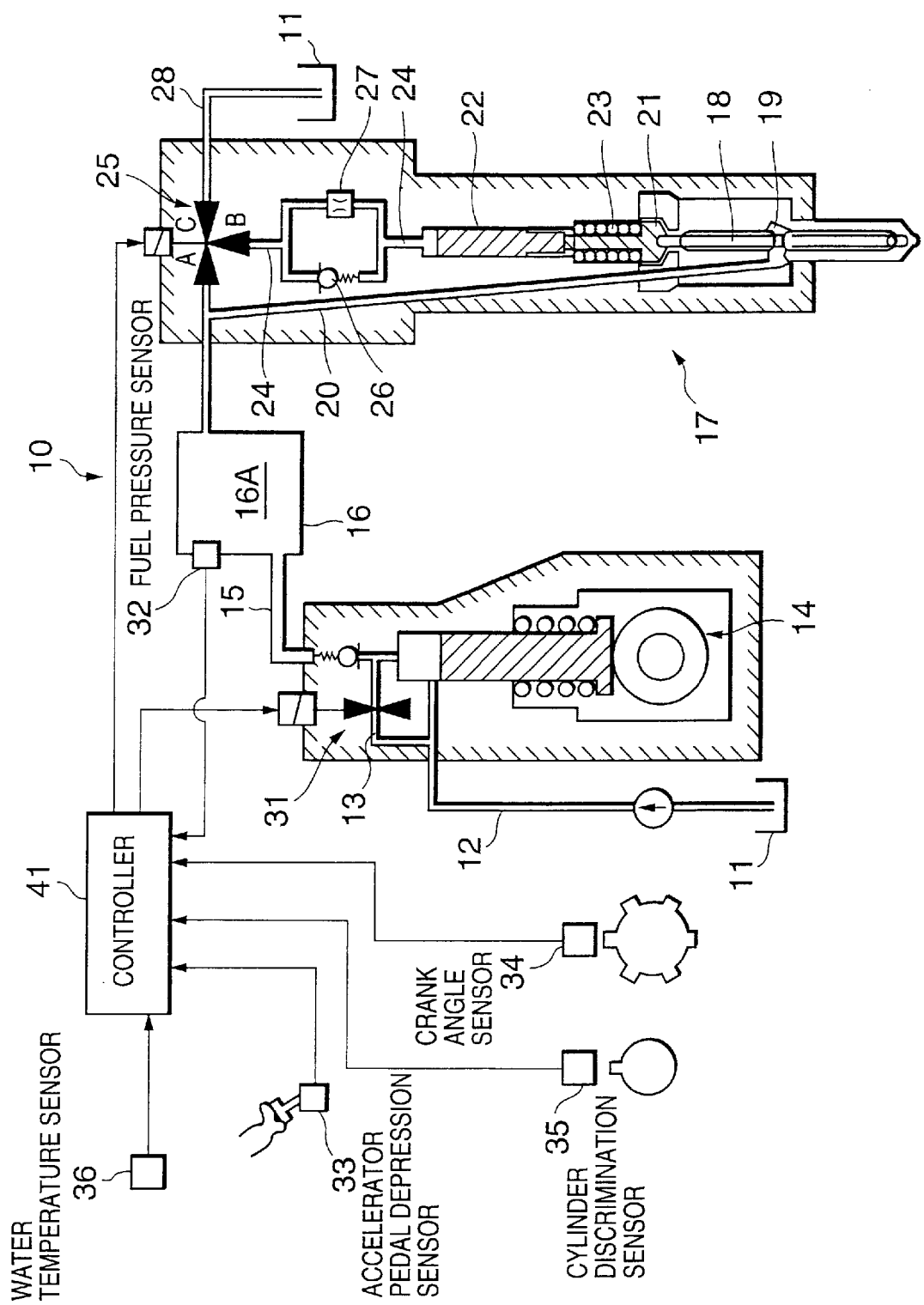
FIG. 2 is a schematic diagram of a common-rail fuel injection mechanism provided in the diesel engine.

Referring to FIG. 2, a fuel injection mechanism 10 comprises a fuel tank 11, fuel supply passage 12, supply pump 14, pressure accumulating chamber 16A formed in a common rail 16, and a nozzle 17 which is provided for every cylinder. After the fuel supplied from the supply pump 14 is stored in a pressure accumulator 16A via a high pressure fuel passage 15, it is distributed to each of the nozzles 17.

The nozzle 17 comprises a needle valve 18, nozzle chamber 19, fuel passage 20 to the nozzle chamber 19, retainer 21, hydraulic piston 22, return spring 23, fuel passage 24 which leads high pressure fuel to the hydraulic piston 22, and three-way solenoid valve 25 interposed in the fuel passage 24. A check valve 26 and an orifice 27 are also provided in parallel in the fuel passage 24. The return spring 23 pushes the needle valve 18 in the closing direction of the lower part of the figure via the retainer 21. The hydraulic piston 22 comes in contact with the upper edge of the retainer 21.

The three-way valve 25 comprises a port A connected to the pressure accumulating chamber 16A, port B connected to the fuel passage 24 and port C connected to a drain 28. When the three-way valve 25 is OFF, ports A and B are connected and ports B and C are shut off. As a result, the fuel passages 20 and 24 are connected, and high pressure fuel is led to both the upper part of the hydraulic piston 22 and the nozzle chamber 19 from the pressure accumulating chamber 16A. As the pressure-receiving surface area of the hydraulic piston 22 is larger than the pressure-receiving surface area of the needle valve 18, in this state, the needle valve 18 sits in the valve seat, and the nozzle 17 is thereby closed.

In the state where the three-way valve 25 is ON, the ports A and B are shut off, and the ports B and C are connected. Consequently, the fuel pressure of the fuel passage 24 which pushes the hydraulic piston 22 downward is released to the fuel tank 11 via the drain 28, the needle valve 18 lifts due to the fuel pressure of the nozzle chamber 19 which acts on the needle valve 18 in an upward direction, and the fuel of the nozzle chamber 19 is injected from the hole at the end of the nozzle 17. If the three-way valve 25 is returned to the OFF state, the fuel pressure of the pressure accumulating chamber 16A again acts downward on the hydraulic piston 22, the needle valve 18 sits in the valve seat, and fuel injection is terminated.

That is, fuel injection start timing is adjusted by the change-over timing from OFF to ON of the three-way valve 25, and fuel injection amount is adjusted by the duration of the ON state. Therefore, if the pressure of the pressure accumulating chamber 16A is the same, the fuel injection amount increases the longer the ON time of the three-way valve 25. In this description, the term "fuel injection timing" denotes the fuel injection start timing.

Further, to adjust the pressure of the pressure accumulating chamber 16A, the fuel injection mechanism 10 comprises a return passage 13 which returns the surplus fuel discharged by the supply pump 14 to the fuel supply passage 19 The return passage 13 is provided with a pressure regulating valve 31. The pressure regulating valve 31 opens and closes the return passage 13, and adjusts the pressure of the pressure accumulating chamber 16A by varying the fuel injection amount to the pressure accumulating chamber 16A.

The fuel pressure of the pressure accumulating chamber 16A is equal to the fuel injection pressure of the nozzle 17, and the fuel injection rate is higher the higher the fuel pressure of the pressure accumulating chamber 16. The three-way valve 25 and the pressure regulating valve 31 function according to the input signal from a controller 41.

The above construction of the fuel injection mechanism 10 is disclosed and known from pp. 73–77, Lecture Papers of the 13th Symposium on the Internal Combustion Engine.

Fuel injected from the nozzle 17 to each combustion chamber 51D is mixed with air aspirated from the intake manifold 52B and undergoes pressure ignition and combustion due to pressure applied by the piston 51C. The exhaust gas is exhausted through the exhaust passage 53.

Figure 3:
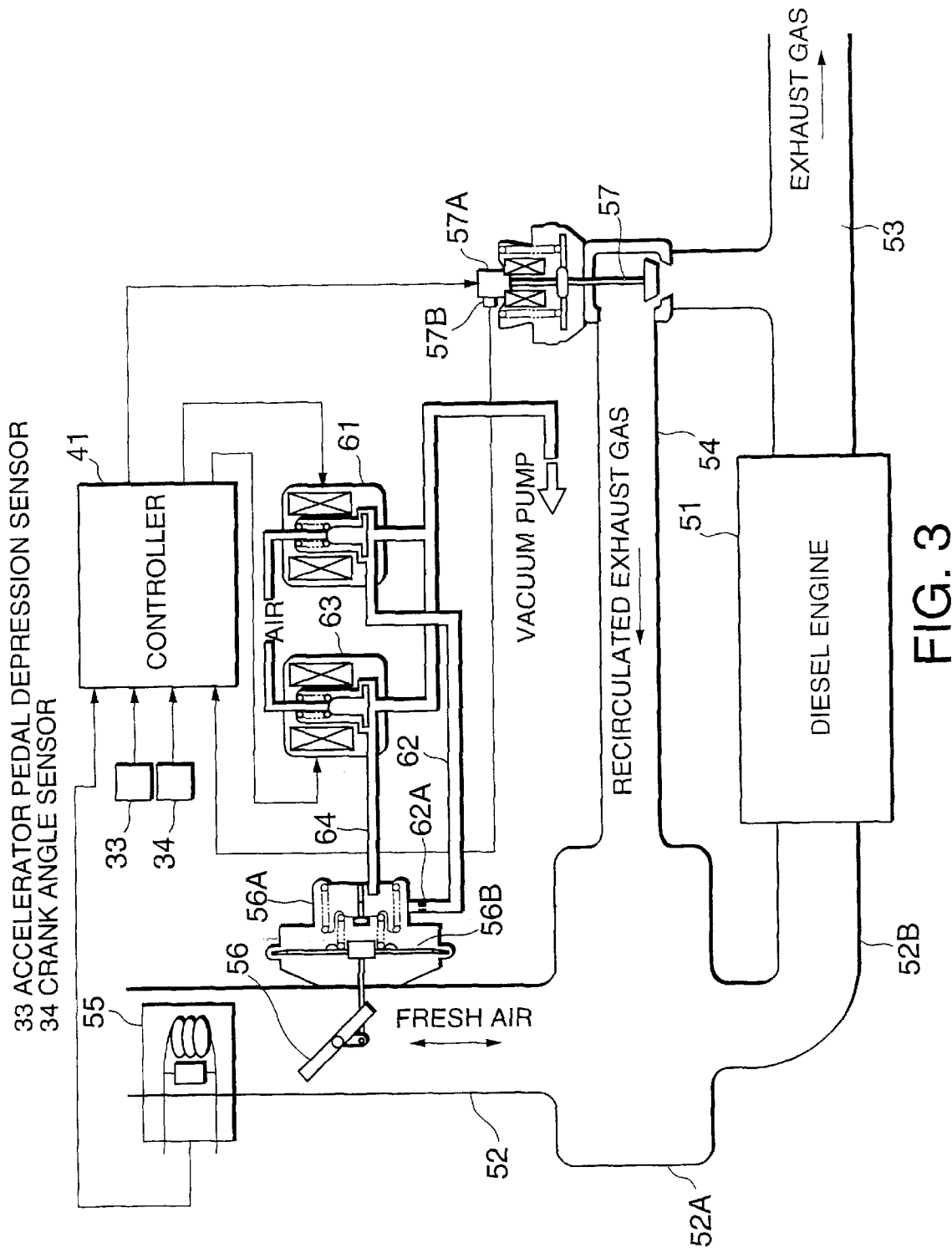
FIG. 3 is a schematic diagram of an exhaust gas recirculation mechanism provided in the diesel engine.

The structure of the throttle 56 and the EGR valve 57 will be described below referring to FIG. 3.

The throttle 56 is driven by a diaphragm-type negative pressure actuator 56A and varies the opening thereof with a two-step operation. A first pressure passage 62 and a second pressure passage 64 are connected to the negative pressure chamber 56B partitioned by the diaphragm of the negative pressure actuator 56A. An orifice 62A is provided in the first pressure passage 62. A first solenoid valve 61 is provided in the first pressure passage 62. A second solenoid valve 63 is provided in the second pressure passage 64. The solenoid valves 61 and 63 are operated in response to a signal from the controller 41 in order to selectively supply atmospheric pressure and the negative pressure of a vacuum pump to the pressure passages 62 and 64.

When the first solenoid valve 61 supplies atmospheric pressure to the first pressure passage 62 and the second solenoid valve 63 supplies the negative pressure of the vacuum pump to the second pressure passage 64, the negative pressure in the negative pressure chamber 56B is reduced and the opening of the intake air throttle 56 is increased. On the other hand, when the first solenoid valve 61 and the second solenoid valve 63 supply negative pressure from the vacuum pump to both the first pressure passage 62 and the second pressure passage 64, the negative pressure in the negative pressure chamber 56B is increased and the opening of the intake air throttle 56 is decreased. Furthermore when the first solenoid valve 61 and the second solenoid valve 63 supply atmospheric pressure to the first pressure passage 62 and the second pressure passage 64, the pressure in the negative pressure chamber 56B coincides with atmospheric pressure and the intake air throttle 56 becomes fully opened by the action of a return spring.

The EGR valve 57 is driven by a step motor 57A and the opening of the valve 57 is varied in response to the rotation of the step motor 57A. The step motor 57A is rotated in response to step signals from the controller 41. An EGR valve opening sensor 57B which detects the opening of the EGR valve is provided in the EGR valve 57.

The controller 41 comprises a microcomputer or plural microcomputers each of which is provided with a central processing unit (CPU), a read only memory (ROM), a random access memory (RAM) and an input/output interface (I/O interface).

Detection signals from the air flow meter 55, the EGR valve opening sensor 57, the intake air temperature sensor 71, the intake pressure sensor 72 and the atmospheric pressure sensor 73 are respectively input to the controller 41, Further, as shown in FIG. 2, detection signals are input from a pressure sensor 32 which detects the fuel pressure in the accumulation chamber 16A, an accelerator pedal depression sensor 33 which detects a depression amount of an accelerator pedal provided in the vehicle, a crank angle sensor 34 which detects a rotation speed Ne and a predetermined crank angle of the diesel engine 1, a cylinder discrimination sensor 35 which identifies the cylinders of the diesel engine 1 and a water temperature sensor 36 which detects a cooling water temperature Tw of the diesel engine 1. Further, as shown in FIG. 3, a detection signal is input from the EGR valve opening sensor 57B to the controller 41.

The controller 41 uses the input signals in order to control the opening of the throttle 56, an opening of the swirl control valve 4, a turbocharging pressure of the turbocharger 2, the EGR amount of the EGR mechanism 5 and the fuel injection timing and fuel injection amount of the fuel injection mechanism 10. The control of the turbocharging pressure of the turbocharger 2, the EGR amount of the EGR mechanism 5 and the control of the fuel injection timing and the fuel injection amount of the fuel injection mechanism 10 will be described below.

Firstly a control process for the turbocharging pressure of the turbocharger 2 executed by the controller 41 will be described below.

Figure 4:
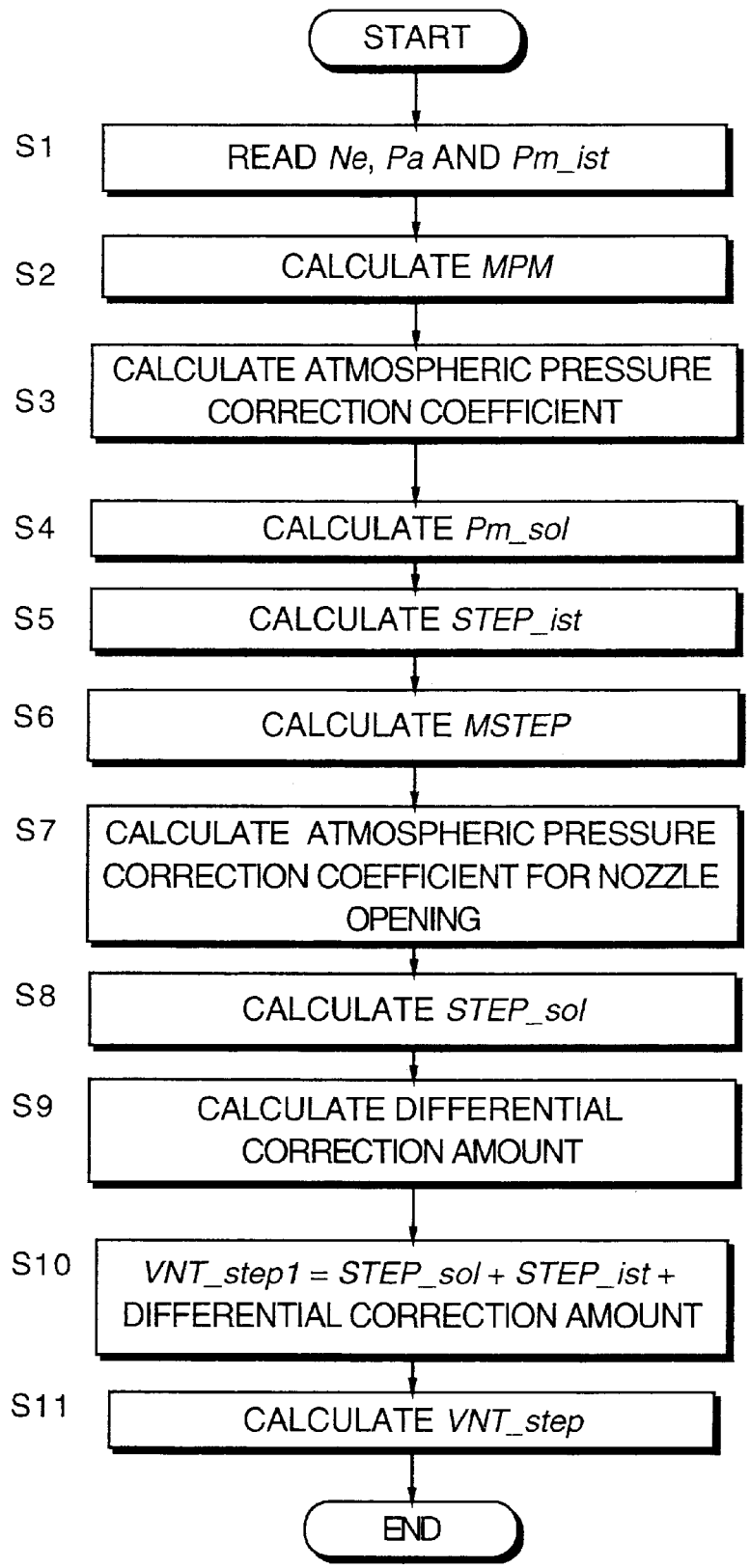
FIG. 4 is a flowchart describing a calculation routine for a command opening VNTstep of a variable nozzle of a turbocharger, executed by a controller according to this invention.

FIG. 4 shows a calculation routine for a command opening of the variable nozzle 2D. The controller 41 executes this routine at intervals of ten milliseconds by employing a known calculation method.

In a step S1, the engine rotation speed Ne, a fuel injection amount Qf, the atmospheric pressure Pa and a real turbocharging pressure $Pm\_ist$ are read.

The engine rotation speed Ne is detected by the crank angle sensor 34. The real turbocharging pressure $Pm\_ist$ is equal to the intake pressure Pm detected by the intake pressure sensor 72. The atmospheric pressure Pa is detected by the atmospheric pressure sensor 73. The fuel injection amount Qf will be described hereafter.

Figure 5:
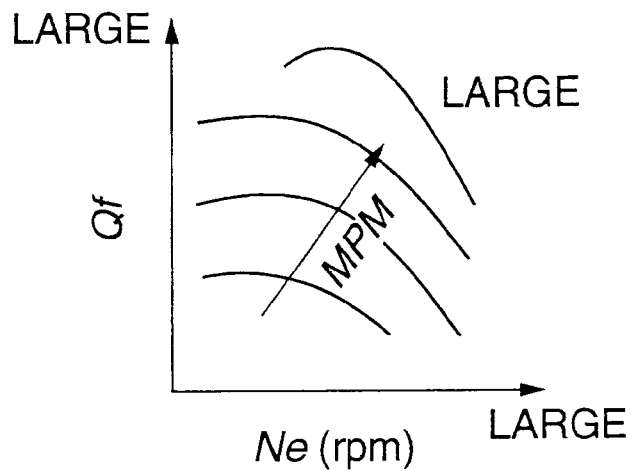
FIG. 5 is a diagram showing the characteristics of a map of a basic turbocharging pressure MPM, stored in the controller.

In a step S2, a basic turbocharging pressure MPM is calculated on the basis of the engine rotation speed Ne and the fuel injection amount Qf by looking up a map having the characteristics shown in FIG. 5 which is pre-stored in the memory of the controller 41.

Figure 6:
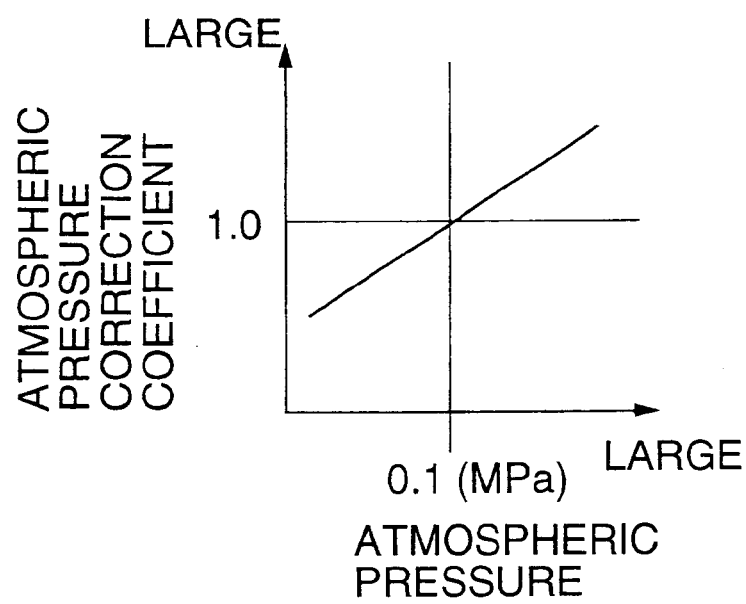
FIG. 6 is a diagram showing the characteristics of a map of an atmospheric pressure correction value for a turbocharging pressure, stored in the controller.

In a next step S3, the atmospheric pressure correction coefficient is calculated on the basis of the atmospheric pressure Pa by looking up a map having the characteristics shown in FIG. 6 which is pre-stored in the memory of the controller 41.

In a next step S4, a target turbocharging pressure $Pm\_sol$ is calculated by multiplying the atmospheric pressure correction coefficient by the basic turbocharging pressure MPM.

In a next step S5, a PI correction amount $STEP\_ist$ for the nozzle opening is calculated by known proportional integral control (PI control) so that the real turbocharging pressure $Pm\_ist$ coincides with the target turbocharging pressure $Pm\_sol$.

Figure 7:
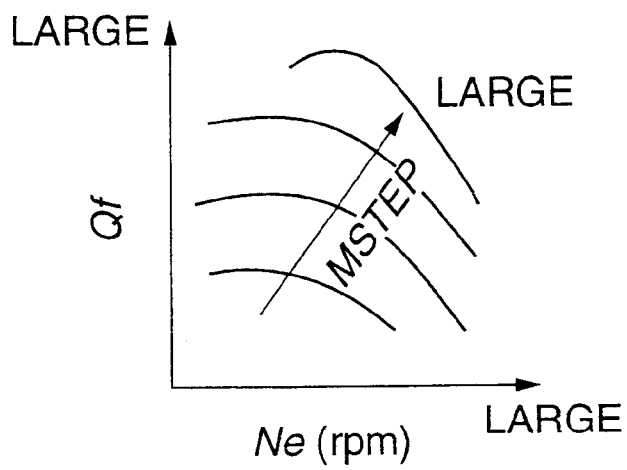
FIG. 7 is a diagram showing the characteristics of a map of a basic opening MSTEP of a variable nozzle, stored in the controller.

In a next step S6, a basic opening MSTEP for the variable nozzle 2D is calculated on the basis of the engine rotation speed Ne and the fuel injection amount Qf by looking up a map having the characteristics shown in FIG. 7 which is pre-stored in the memory of the controller 41.

Figure 8:
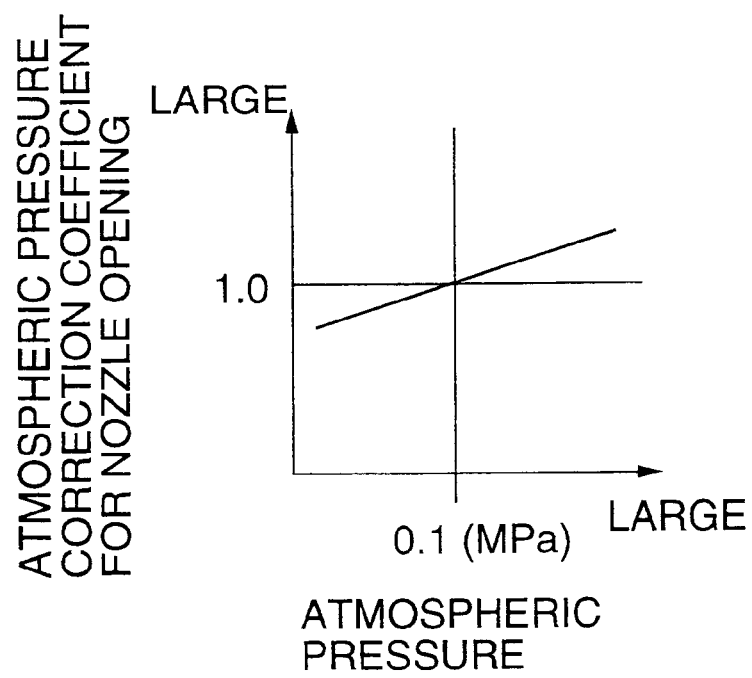
FIG. 8 is a diagram showing the characteristics of a map of an atmospheric pressure correction value for a nozzle opening, stored in the controller.

In a next step S7, the atmospheric pressure correction coefficient for the nozzle opening is calculated on the basis of the atmospheric pressure Pa looking up a map having the characteristics shown in FIG. 8 which is pre-stored in the memory of the controller 41.

In a step S8, a target opening $STEP\_sol$ is calculated by multiplying the basic opening MSTEP by the atmospheric pressure correction coefficient.

In a next step S9, a differential correction amount is calculated from the real turbocharging pressure $Pm\_ist$ and the engine rotation speed Ne.

In a next step S10, a target opening $VNT\_step1$ is calculated by adding the differential correction amount and the PI correction amount $STEP\_ist$ to the target opening $STEP\_sol$.

In a next step S11, an upper limiting valve and a lower limiting value are calculated corresponding to the engine rotation speed Ne and the real turbocharging pressure $Pm\_ist$. When the target opening $VNT\_step1$ falls in a range between the upper limiting value and the lower limiting value, the value for the target opening $VNT\_step1$ is set to the command opening VNTstep. When the value for the target opening $VNT\_step1$ does not fall in the range, the target opening VNT_step1 is replaced by either the upper limiting value or the lower limiting value as the command opening VNTstep.

The command opening VNTstep of the variable nozzle 2D set in the step S11 is converted to a step number and output to the step motor 2C.

The EGR control performed by the controller 41 will be described below.

The controller 41 is adapted so that an exhaust gas recirculation rate (EGR rate) which is an exhaust gas flow-rate of EGR passage 54 divided by a flowrate of aspirated gas by the diesel engine 51 take a maximum value during low load and low rotation speed operation of the diesel engine 51. When this value is taken as 100 percent, the EGR rate decreases as the engine load or the engine rotation speed increase. Since the exhaust gas temperature is high when the diesel engine 51 is operating under high load or at high rotation speed, large amounts of EGR cause increases in the intake air temperature. Increases in the intake air temperature make it difficult to reduce NOx. It also becomes difficult to perform premixing combustion since the ignition delay period of injected fuel is shortened. The reason that the EGR rate is decreased as the engine load or engine rotation speed increase is in order to prevent the above problems.

When the EGR amount is varied, the turbocharging pressure of the turbocharger 2 also varies. Conversely, when the turbocharging pressure varies, the EGR amount also varies as a result of the variation in the exhaust pressure. Consequently the EGR amount and the turbocharging pressure can not be controlled independently and controlling one tends to resulting in disturbance to the control of the other. It is essential to have accurate measurement of the real exhaust gas amount Qexh and the real EGR amount Qegr in order to perform accurate overall control on the EGR amount and the turbocharging pressure.

The real exhaust gas amount Qexh and the real EGR amount Qegr can be calculated from the following five parameters: the intake pressure Pm, the exhaust pressure Pexh, the atmospheric pressure Pa, an effective sectional area equivalence value Aegr of the EGR valve 57 and the effective sectional area equivalence value Avnt of the variable nozzle 2D. The intake pressure Pm corresponds to an outlet pressure of the compressor 2B, the atmospheric pressure Pa corresponds to an inlet pressure of the compressor 2B and the exhaust pressure Pexh corresponds to an inlet pressure of the exhaust gas turbine 2A.

Except for the exhaust pressure Pexh, it is possible to detect four of these parameters in a simple manner using a sensor or from signals output from the controller 41 to the step motors 57A and 2C that drive the EGR valve 57 and variable nozzle 2D. However, the sensor detecting the exhaust pressure Pexh must be resistant to acidic conditions and high exhaust gas temperatures. This type of sensor is expensive and difficult to maintain. Furthermore it is difficult to ensure required response characteristics. Instead of using an exhaust pressure sensor, therefore, the controller 41 estimates the exhaust pressure Pexh using an intake air flowrate Qas0, the fuel injection amount Qf, the effective sectional area equivalence value Avnt of the variable nozzle 2D and the exhaust gas temperature Texh.

Figure 9:
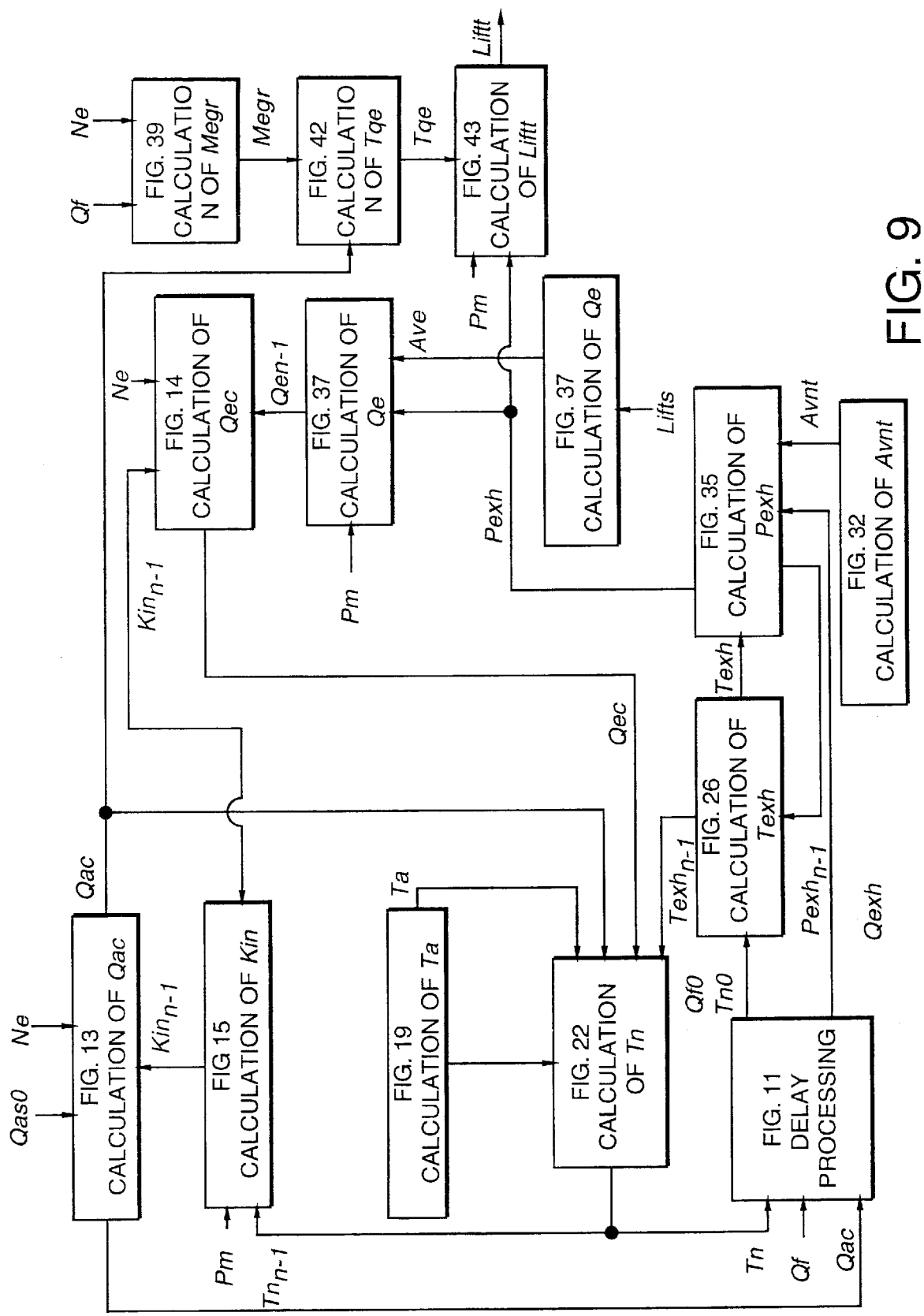
FIG. 9 is a block diagram schematically showing exhaust gas recirculation control executed by the controller.

EGR control performed by the controller 41 is so called model reference adaptive control which uses a model defined by a multiplicity of variables. EGR control is performed by executing various routines in the sequence shown in FIG. 9. This control uses the detection signals from the accelerator pedal opening sensor 33, the crank angle sensor 34, the cylinder discrimination sensor 35, the water temperature sensor 36, the intake air temperature sensor 71 and the intake pressure sensor 72. Other parameters required for control are predicted based on the above detection signals.

In this EGR control, a sampling operation on the sensor detection values such as those from the air flow meter 55 is performed at predetermined intervals. On the other hand, the calculation of parameters is performed synchronous with a Ref signal that corresponds to the predetermined crank angle. Resultant signal outputs to various actuators are performed at predetermined intervals.

Figure 10:
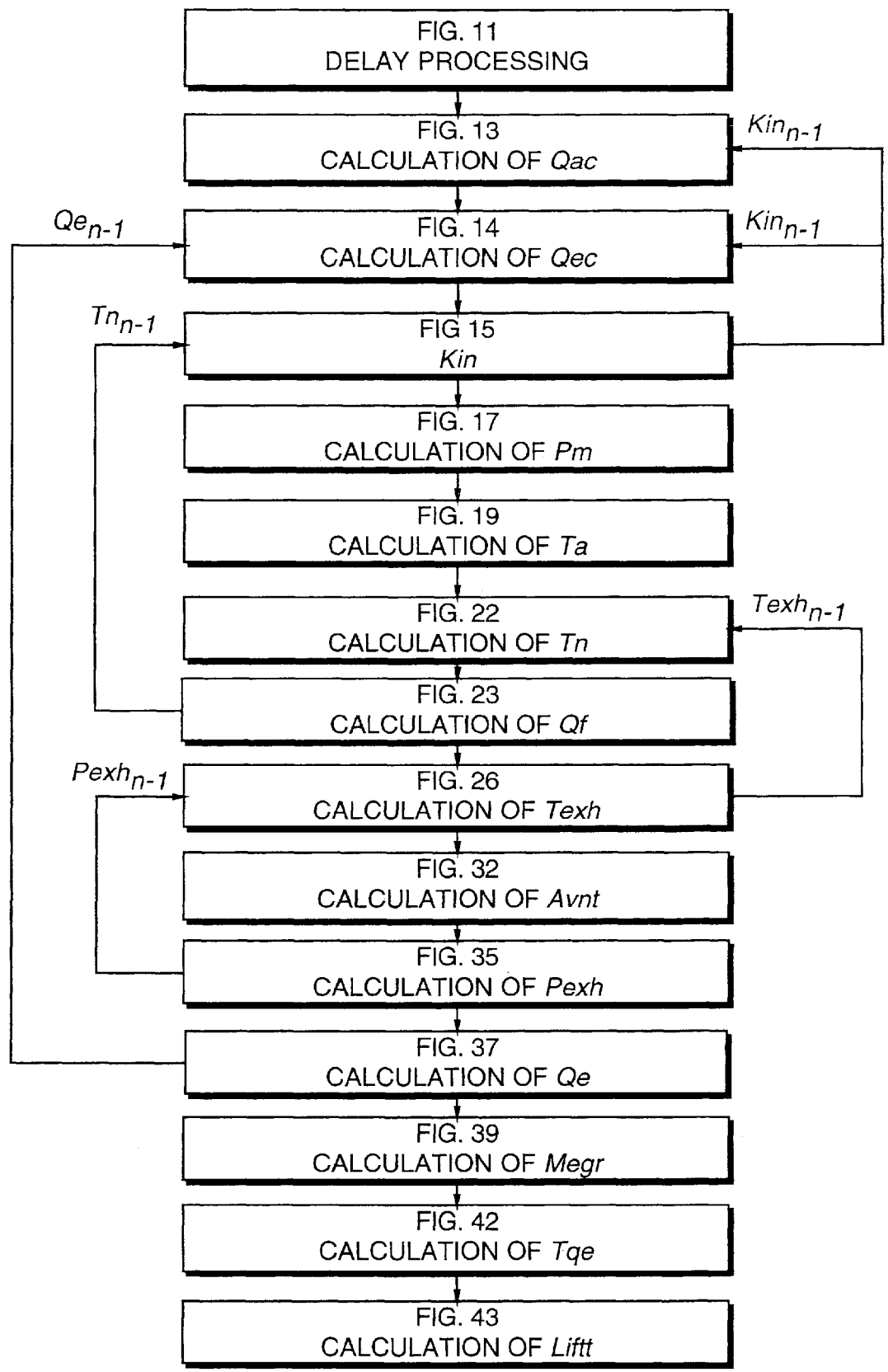
FIG. 10 is a flowchart describing a calculation routine of various parameters calculated by the controller.

The calculation of parameters is performed in the sequence shown in FIG. 10. The symbols in FIG. 10 having the subscript n−1 denote the values calculated on the immediately previous occasion the calculation routine was performed.

Figure 11:
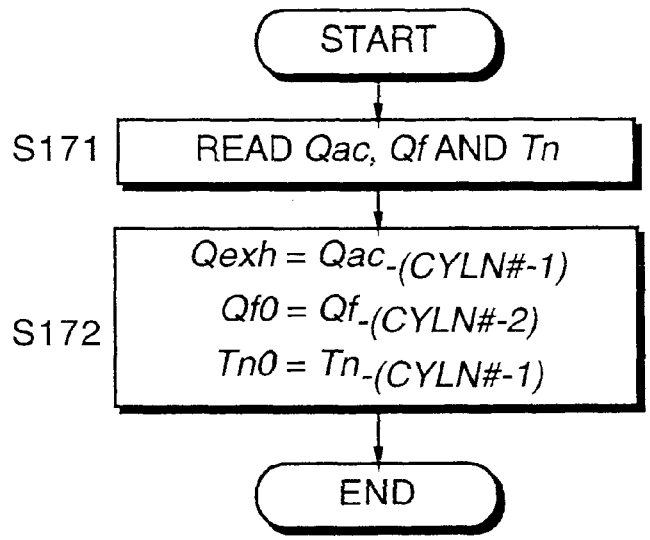
FIG. 11 is a flowchart describing a delay processing routine executed by the controller.

Firstly a delay processing routine for a cylinder intake fresh air amount Qac, the fuel injection amount Qf and a cylinder intake gas temperature Tn will be described with reference to FIG. 11. The controller 41 executes this routine at intervals of ten milliseconds.

The controller 41 firstly reads the cylinder intake fresh air amount Qac, the fuel injection amount Qf and the cylinder intake gas temperature Tn in a step S171. The calculation of these values will be described hereafter.

In a next step S172, a delay processing is applied to these values on the basis of equations (1)–(3) below to calculate an exhaust gas amount Qexh, a delay processing value Qf0 of fuel injection amount, and a delay processing value Tn0 of intake gas temperature.

$$Qexh = Qac_{-(CYLN\#-1)} \quad (1)$$
$$Qf0 = Qf_{-(CYLN\#-2)} \quad (2)$$
$$Tn0 = Tn_{-(CYLN\#-1)} \quad (3)$$

where, CYLN# = numbers of the cylinders of the diesel engine 51.

The terms −(CYLN#−1) and −(CYLN#−2) are values calculated on respectively the (CYLN#−1)-th or (CYLN#−2)-th previous occasion of the routine. The cylinder intake gas temperature Tn, the fuel injection amount Of and the cylinder intake fresh air amount Qac vary with a predetermined delay as a result of variation in the intake air flowrate measured by the air flow meter 55. In order to obtain their present values, therefore, a delay processing must be applied to the values calculated based on the fresh air flowrate. In a four-stroke four-cylinder engine, the fuel injection amount calculated based on the intake air flowrate of the air flow meter 55 has a delay of 180 degrees×(cylinder number−2) in crank angle with respect to the detection timing of the intake air flowrate. Considering this delay, the fuel injection amount obtained on (CYLN#−2)-th previous occasion of the routine is set to the fuel injection amount of the present occasion.

A calculation routine for the cylinder intake fresh air amount Qac will be described below referring to FIGS. 12 and 13.

Herein, the amount of fresh air actually aspirated into the cylinder 51A is calculated on the basis of the intake fresh air flowrate detected by the air flow meter 55.

Figure 12:
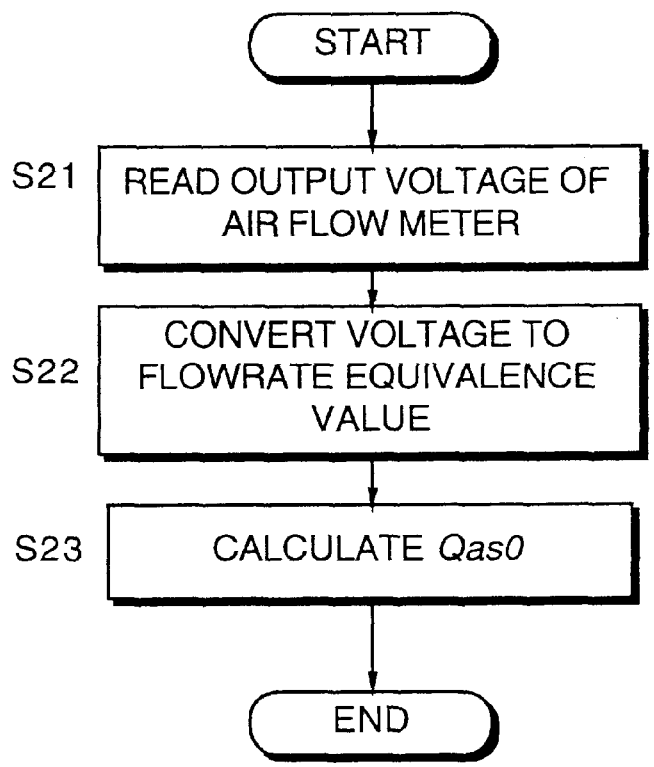
FIG. 12 is a flowchart describing an output conversion routine of an air flow meter executed by the controller.

FIG. 12 shows a routine for converting the output voltage of the air flow meter 55 into a flowrate. The controller 41 executes this routine at intervals of four milliseconds.

Firstly in a step S21, the controller 41 reads the output voltage of the air flow meter 55.

In a next step S22, the output voltage is converted to a flowrate equivalence value. The flowrate equivalence value is a mass flowrate.

In a next step S23, an intake fresh air flowrate Qas0 is calculated by applying a weighted average to the flowrate equivalence value in order to counter the effect of intake air pulsation of the diesel engine 51. The intake fresh air flowrate Qas0 is also a mass flowrate.

Figure 13:
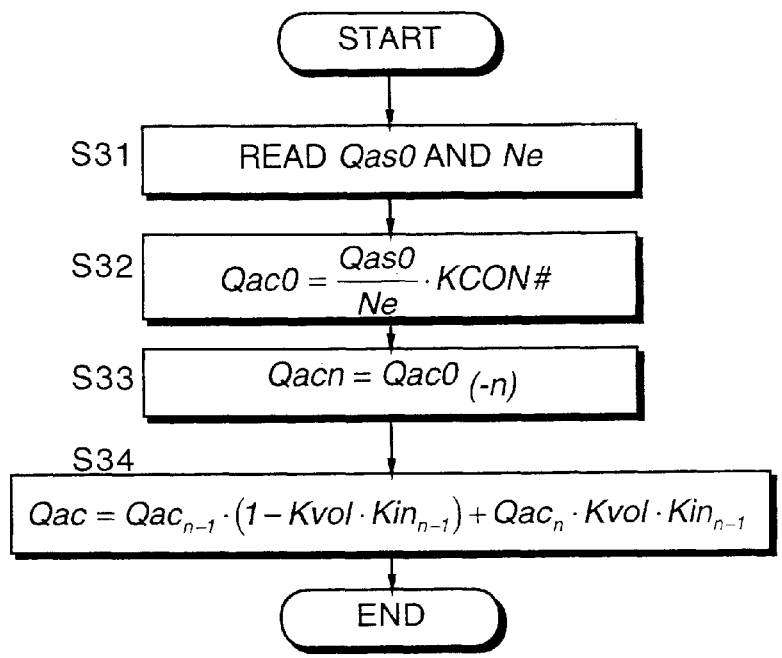
FIG. 13 is a flowchart describing a calculation routine for a cylinder intake fresh air amount Qac executed by the controller.

FIG. 13 shows a routine for calculating the cylinder intake fresh air amount Qac on the basis of the intake fresh air flowrate Qas0. The controller 41 executes this routine on each occasion the Ref signal is input.

Firstly in a step S31, the controller 41 reads the engine rotation speed Ne and the intake fresh air flowrate Qas0.

In a next step S32, the intake fresh air flowrate Qac0 is converted to an intake fresh air amount Qac0 per cylinder using Equation (4) on the basis of the engine rotation speed Ne. The intake fresh air amount Qac0 per cylinder is expressed as mass.

$$Qac0 = \frac{Qas0}{Ne} \cdot KCON\# \qquad (4)$$

where, $KCON\#$ = constant.

The air flow meter 55 is disposed upstream of the compressor 2B. Accordingly in a step S33, a delay process is performed corresponding to the required time for fresh air to reach the collector 52A from the air flow meter 55. In other words, the value for Qac0 on the n-th previous occasion is taken to be the intake fresh air amount $Qac_n$ per cylinder measured at an inlet of the collector 52A.

In a next step S34, an intake fresh air amount Qac per cylinder measured at an intake valve position of the cylinder 51A is calculated from Equation (5). This value is hereafter referred to as the "cylinder intake fresh air amount". The cylinder intake fresh air amount Qac is also expressed as mass.

$$Qac = Qac_{n-1} \cdot (1 - Kvol \cdot Kin_{n-1}) + Qac_n \cdot Kvol \cdot Kin_{n-1} \qquad (5)$$

where, $Qac_{n-1}$ = Qac calculated on the immediately preceding occasion the routine was performed, and $Kin_{n-1}$ = immediately previous value of volume efficiency equivalence value Kin.

The volume efficiency equivalence value Kin will be described later. Equation (5) is a first order delay equation taking $Kvol \cdot Kin_{n-1}$ as a time constant.

Figure 14:
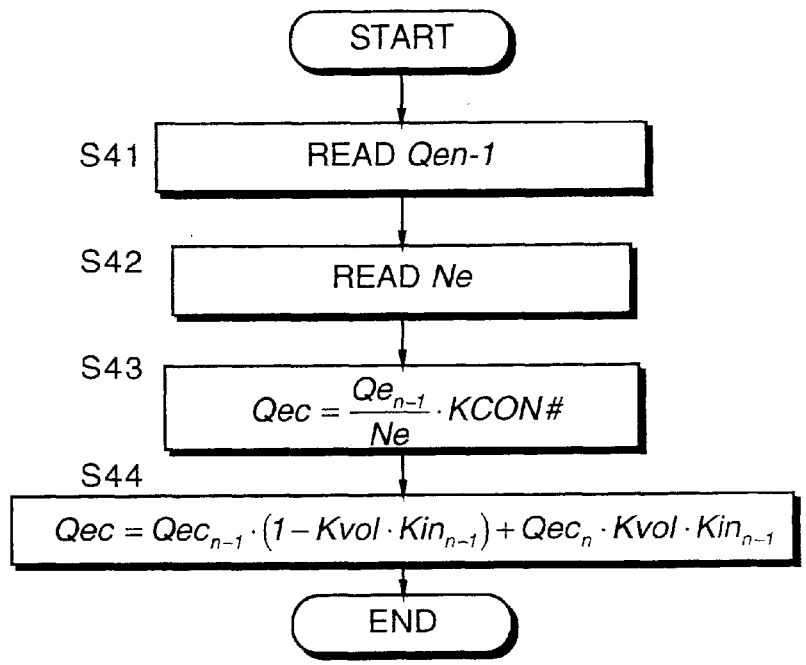
FIG. 14 is a flowchart describing a calculation routine for a cylinder EGR intake amount Qec executed by the controller.

The calculation routine of a cylinder intake EGR amount Qec will be described below with reference to FIG. 14.

The controller 41 executes this routine synchronous with the Ref signal. The method of calculation is the same as the method of calculating the cylinder intake fresh air amount Qac in FIG. 13.

The controller 41 firstly reads $Qe_{n-1}$ which is the immediately previous value of an EGR flowrate Qe in a step S41. The calculation of EGR flowrate Qe will be described later.

In a next step S42, the engine rotation speed Ne is read. In a next step S43, the intake EGR amount $Qec_n$ per cylinder at the inlet of the collector 52A is calculated from Equation (6) using the immediately previous value $Qe_{n-1}$ of the EGR flowrate, the engine rotation speed Ne and the constant KCON#.

$$Qec = \frac{Qe_{n-1}}{Ne} \cdot KCON\# \qquad (6)$$

where, $KCON\#$ = constant.

In a next step S44, an intake EGR amount Qec per cylinder at the intake valve position of the cylinder 51A is calculated from Equation (7). This value is hereafter referred to as the "cylinder intake EGR amount".

$$Qec = Qec_{n-1} \cdot (1 - Kvol \cdot Kin_{n-1}) + Qec_n \cdot Kvol \cdot Kin_{n-1} \qquad (7)$$

where, $Qec_{n-1}$ = Qec calculated on the immediately preceding occasion the routine was performed, and $Kin_{n-1}$ = immediately previous value of the volume efficiency equivalence value Kin.

Equation (6) is also a first order delay equation using the term $Kvol \cdot Kin_{n-1}$ as the time constant.

Figure 15:
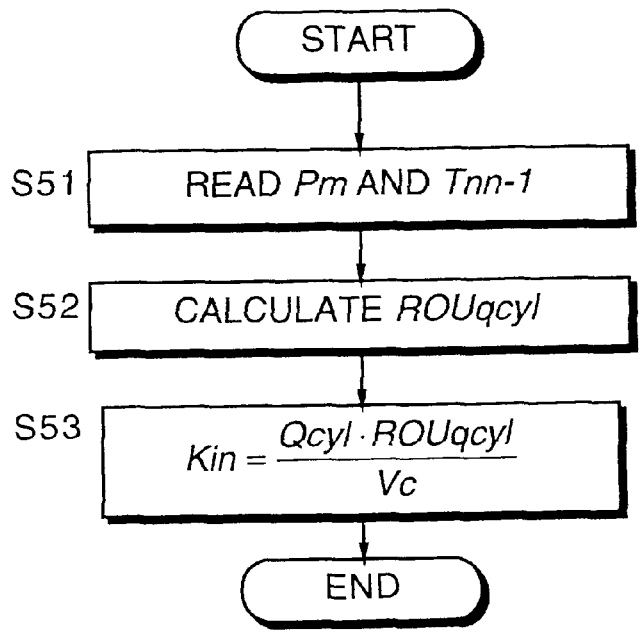
FIG. 15 is a flowchart describing a calculation routine for a volume efficiency equivalence value Kin executed by the controller.

A calculation routine for the volume efficiency equivalence value Kin will be described below referring to FIG. 15. The controller 41 executes the routine synchronous with the Ref signal input.

Firstly in a step S51, the controller 41 reads the cylinder intake fresh air amount Qac, the cylinder intake EGR amount Qec, the intake pressure Pm and an immediately previous value $Tn_{n-1}$ of the cylinder intake gas temperature.

Figure 16:
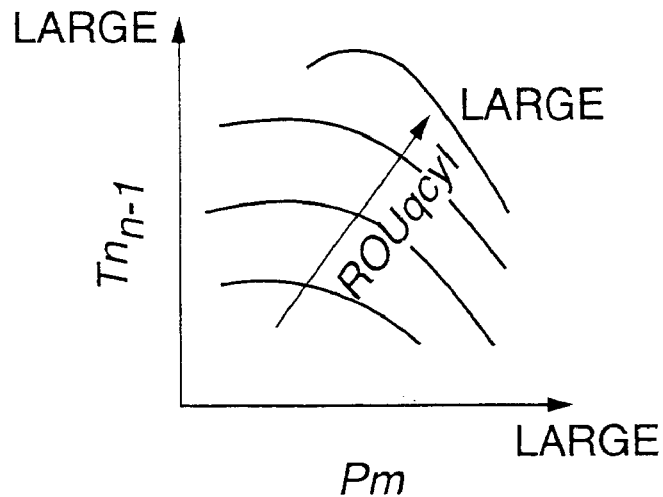
FIG. 16 is a diagram showing the characteristics of a map of gas density ROUqcyl and air density stored in the controller.

In a next step S52, a gas density ROUqcyl is calculated from the intake pressure Pm and the immediately previous value $Tn_{n-1}$ of the cylinder intake gas temperature by looking up a map having the characteristics as shown in FIG. 16 which is pre-stored in the memory of the controller 41.

In a next step S53, a volume efficiency equivalence value Kin is calculated from Equation (8) using the gas density ROUqcyl and a cylinder gas mass defined by Qcyl=Qac+Qec.

$$Kin = \frac{Qcyl \cdot ROUqcyl}{Vc} \qquad (8)$$

where, $Vc$ = capacity of the cylinder 51A.

Figure 17:
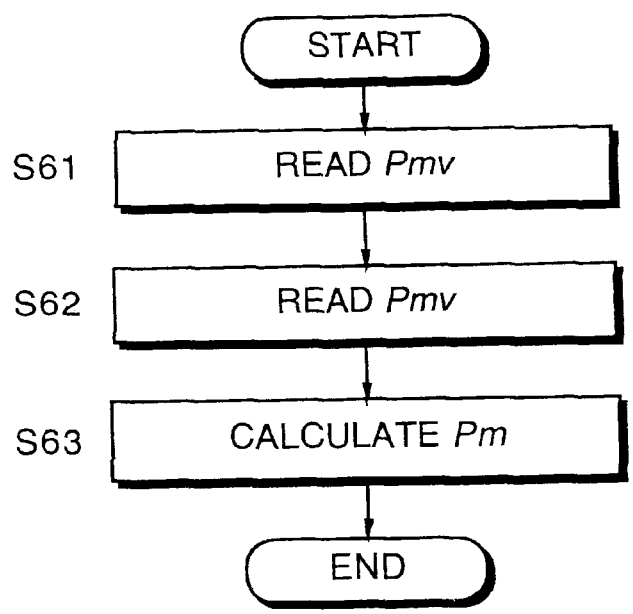
FIG. 17 is a flowchart describing a calculation routine for an intake pressure Pm executed by the controller.

Next a calculation routine for the intake pressure Pm in the collector 52A will be described with reference to FIG. 17. The controller 41 executes this routine at intervals of four milliseconds.

The controller firstly reads an output voltage Pmv of the intake pressure sensor 72 in a step S61.

Figure 18:
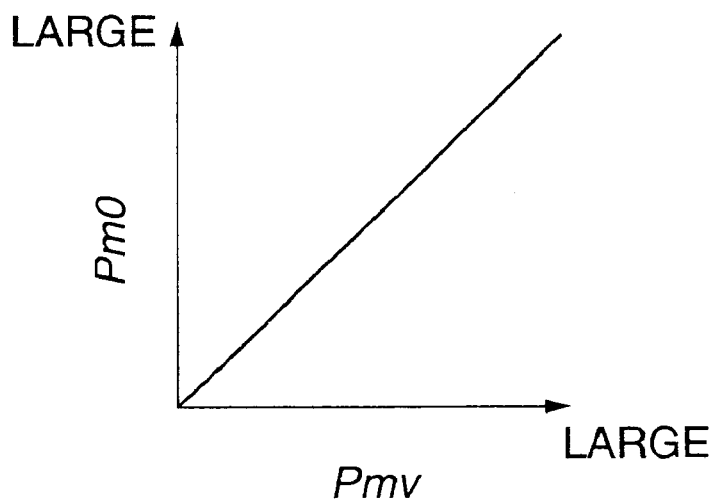
FIG. 18 is a diagram showing the characteristics of a map of a pressure equivalent value Pm0 stored in the controller.

In a next step S62, the output voltage Pmv is converted to a pressure equivalence value Pm0 by looking up a map having the characteristics as shown in FIG. 18 which is pre-stored in the memory of the controller 41.

In a next step S63, the intake pressure Pm is calculated by applying a weighted average to the pressure equivalence value Pm0.

Figure 19:
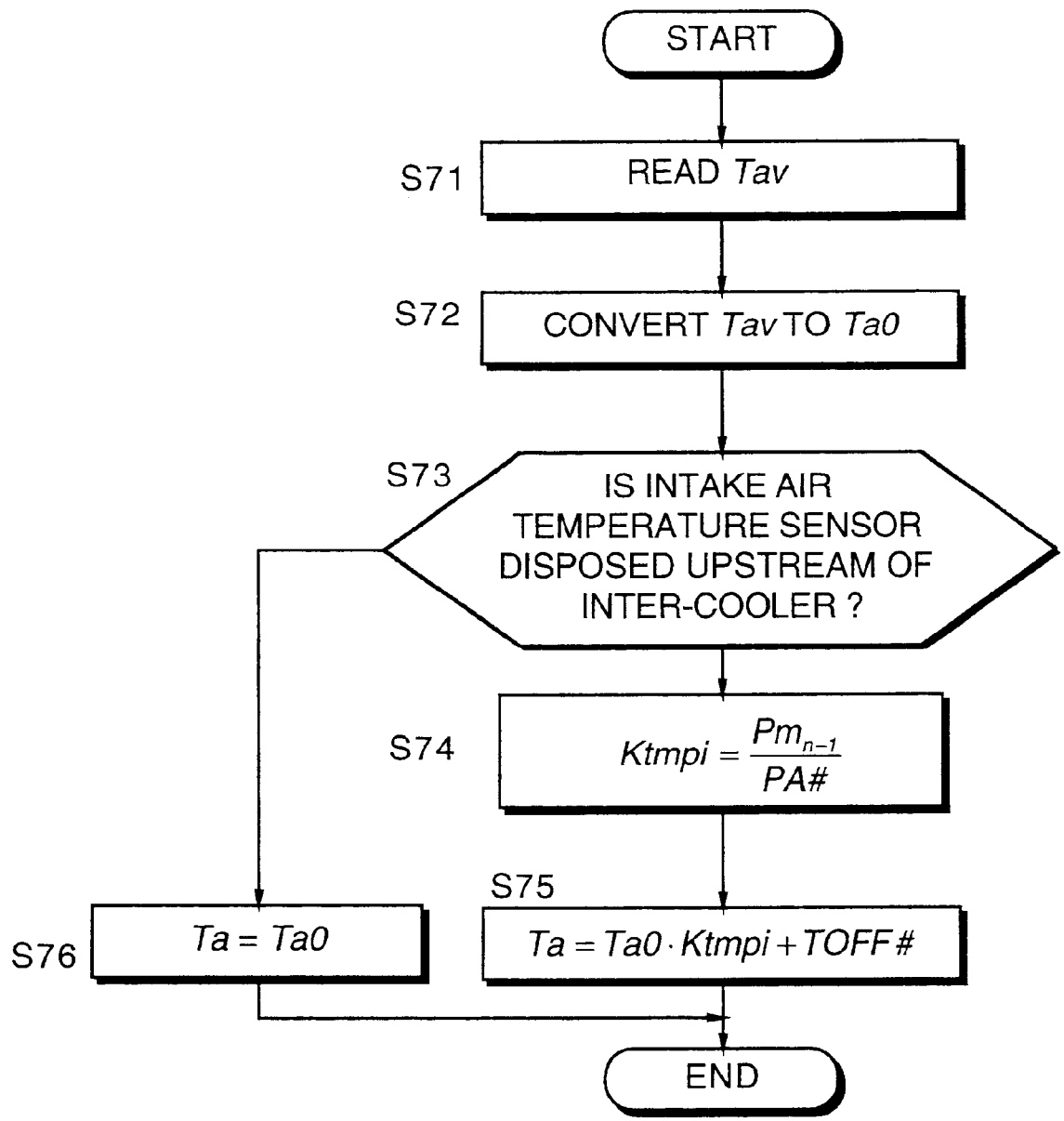
FIG. 19 is a flowchart describing a calculation routine for a collector fresh air intake temperature Ta executed by the controller.

A calculation routine for an intake fresh air temperature Ta in the collector 52A will be described with reference to FIG. 19. The controller 41 executes this routine at intervals of ten milliseconds.

The controller firstly reads an output voltage Ta_v of the intake air temperature sensor 71 in a step S71.

In a next step S72, the output voltage Ta_v is converted to a detected temperature ta0 by looking up a map which is pre-stored in the memory of the controller 41. The map is provided with linear characteristics in the same manner as the map of FIG. 18.

In a next step S73, it is determined whether or not the intake air temperature sensor 71 is disposed upstream or downstream of the inter-cooler 3.

The routine proceeds to a step S74 when the intake air temperature sensor 71 is disposed upstream of the inter-cooler 3 as shown in FIG. 1.

In the step S74, a pressure correction coefficient Ktmpi is calculated from Equation (9) based on the immediately previous value $Pm_{n-1}$ of the intake pressure Pm.

$$Ktmpi = \frac{Pm_{n-1}}{PA\#} \quad (9)$$

where, $PA\#$ = constant.

In a next step S75, the collector intake fresh air temperature Ta is calculated from Equation (10) based on the pressure correction coefficient Ktmpi.

$$Ta = ta0 \cdot Ktmpi + TOFF\# \quad (10)$$

where, $TOFF\#$=constant.

Equation (10) is an approximation for predicting temperature variation through the principle of thermodynamics.

Figure 20:
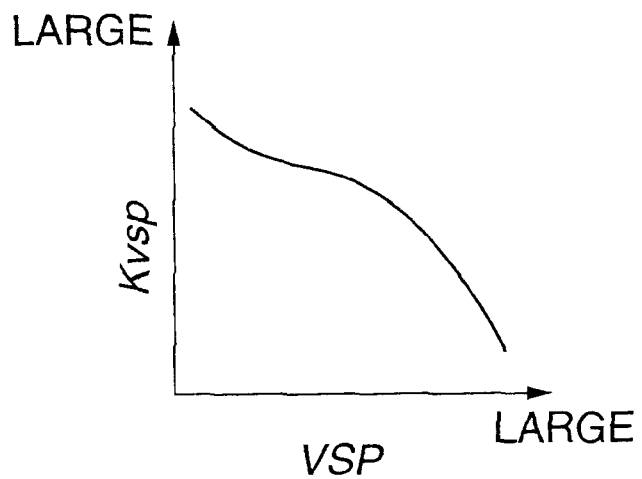
FIG. 20 is a diagram showing the characteristics of a map of a vehicle speed correction coefficient Kvsp stored in the controller.
Figure 21:
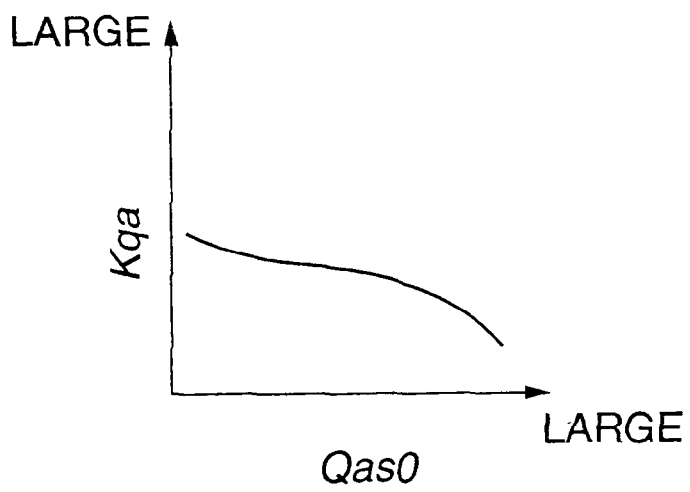
FIG. 21 is a diagram showing the characteristics of a map of an intake fresh air amount correction coefficient Kqa stored in the controller

The intake air temperature may be corrected using parameters such as the vehicle speed VSP and the intake fresh air flowrate Qas0. In other words, a vehicle speed correction coefficient Kvsp is calculated based on the vehicle speed VSP as shown in FIG. 20 and an intake fresh air flowrate correction coefficient Kqa is calculated based on the intake fresh air flowrate Qas0 as shown in FIG. 2 1.

In this case, instead of using Equation (10), the collector intake fresh air temperature Ta is calculated from Equation (11).

$$Ta = Kvsp \cdot Kqa \cdot ta0 \cdot Ktmpi + TOFF\# \quad (11)$$

In a step S73, when it is determined that the intake air temperature sensor 71 is disposed downstream of the inter-cooler 3, the detected temperature ta0 is not corrected and is set as the collector intake fresh air temperature Ta. When the intake air temperature sensor 71 is disposed downstream of the inter-cooler 3, the detected temperature ta0 represents a value after temperature increase due to turbocharging and after temperature decrease due to the inter-cooler. Thus the detected temperature ta0 can be regarded as the collector intake fresh air temperature Ta.

Figure 22:
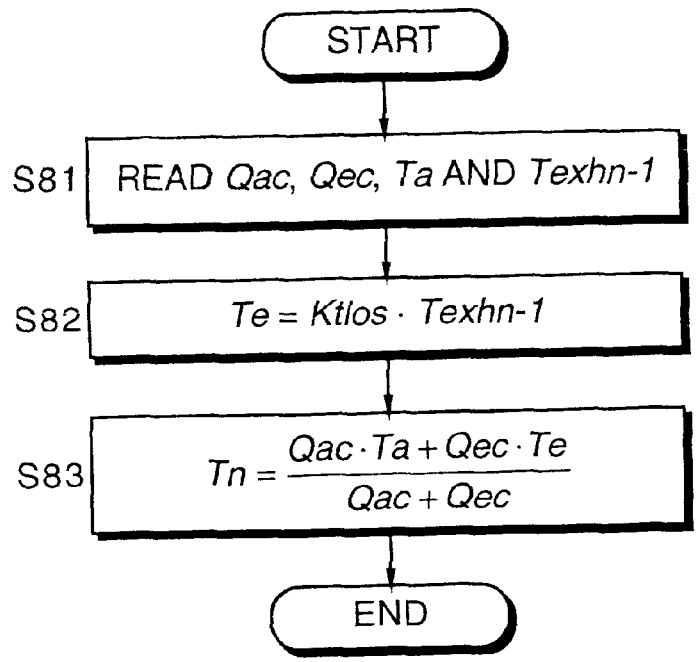
FIG. 22 is a flowchart describing a calculation routine for a cylinder intake gas temperature Tn executed by the controller.

A calculation routine for the cylinder intake gas temperature Tn will be described below referring to FIG. 22. The controller 41 executes this routine synchronous with the Ref signal input.

Firstly in a step S81, the controller 41 reads the cylinder intake fresh air amount Qac, the collector intake fresh air temperature Ta, the cylinder intake EGR amount Qec and the immediately previous value $Texh_{n-1}$ of the exhaust gas temperature Texh. The calculation of the exhaust gas temperature Texh will be described hereafter.

Next in a step S82, a cylinder intake EGR gas temperature Te is calculated by multiplying an exhaust gas temperature reduction coefficient Ktlos which expresses the reduction in the exhaust gas temperature in the EGR passage 54 by the immediately previous value $Texh_{n-1}$ of the exhaust gas temperature.

In a next step S83, a cylinder intake gas temperature Tn is calculated by Equation (12).

$$Tn = \frac{Qac \cdot Ta + Qec \cdot Te}{Qac + Qec} \quad (12)$$

Figure 23:
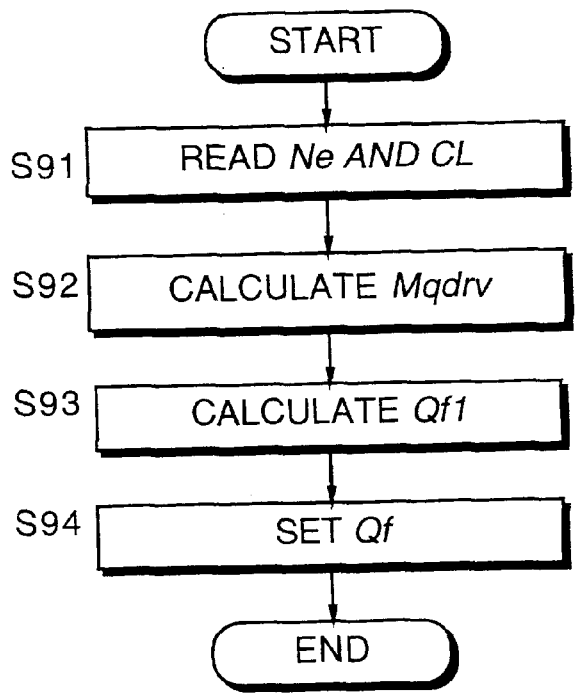
FIG. 23 is a flowchart describing a calculation routine for a fuel injection amount Qf executed by the controller.

A calculation routine for the fuel injection amount Qf will be described below with reference to FIG. 23. The controller 41 executes this routine synchronous with the Ref signal input.

Firstly in a step S91, the controller 41 reads the engine rotation speed Ne and a control lever opening CL corresponding to the depression amount of the accelerator pedal.

Figure 24:
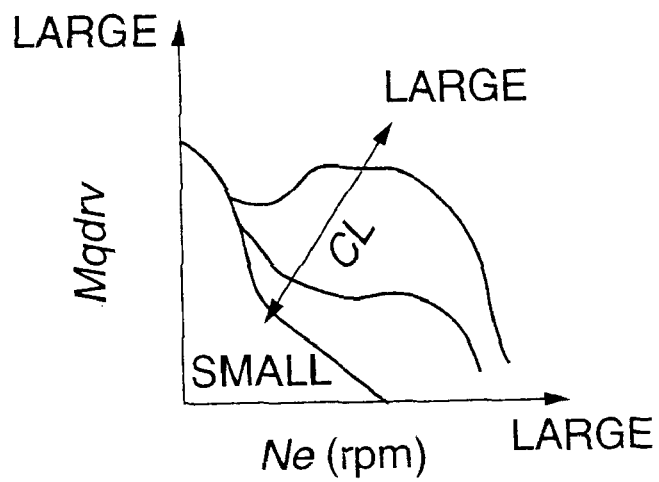
FIG. 24 is a diagram showing the characteristics of a map of a basic fuel injection amount Mqdrv stored in the controller.

Next in a step S92, a basic fuel injection amount Mqdrv is calculated based on the engine rotation speed Ne and the control lever opening CL by looking up a map having the characteristics as shown in FIG. 24 which is pre-stored in the memory of the controller 41.

In a next step S93, a corrected injection amount Qf1 is calculated by applying various types of corrections based on the engine cooling water temperature for example to the basic fuel injection amount Mqdrv.

Figure 25:
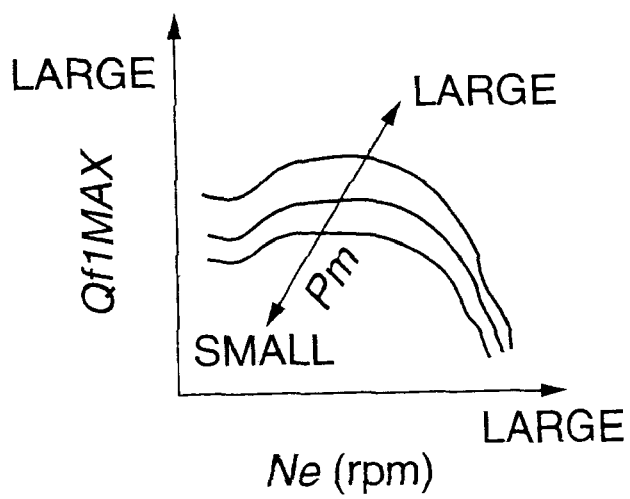
FIG. 25 is a diagram showing the characteristics of a map of a maximum fuel injection amount QF1MAX stored in the controller.

Next, in a step S94, an upper limiting value QF1MAX of fuel injection amount which is obtained by looking up a map having the characteristics as shown in FIG. 25 which is pre-stored in the memory of the controller 41 is applied to the corrected value QF1. The value after this limitation is then set as the fuel injection amount Qf. The fuel injection amount Qf is expressed in mass units.

Figure 26:
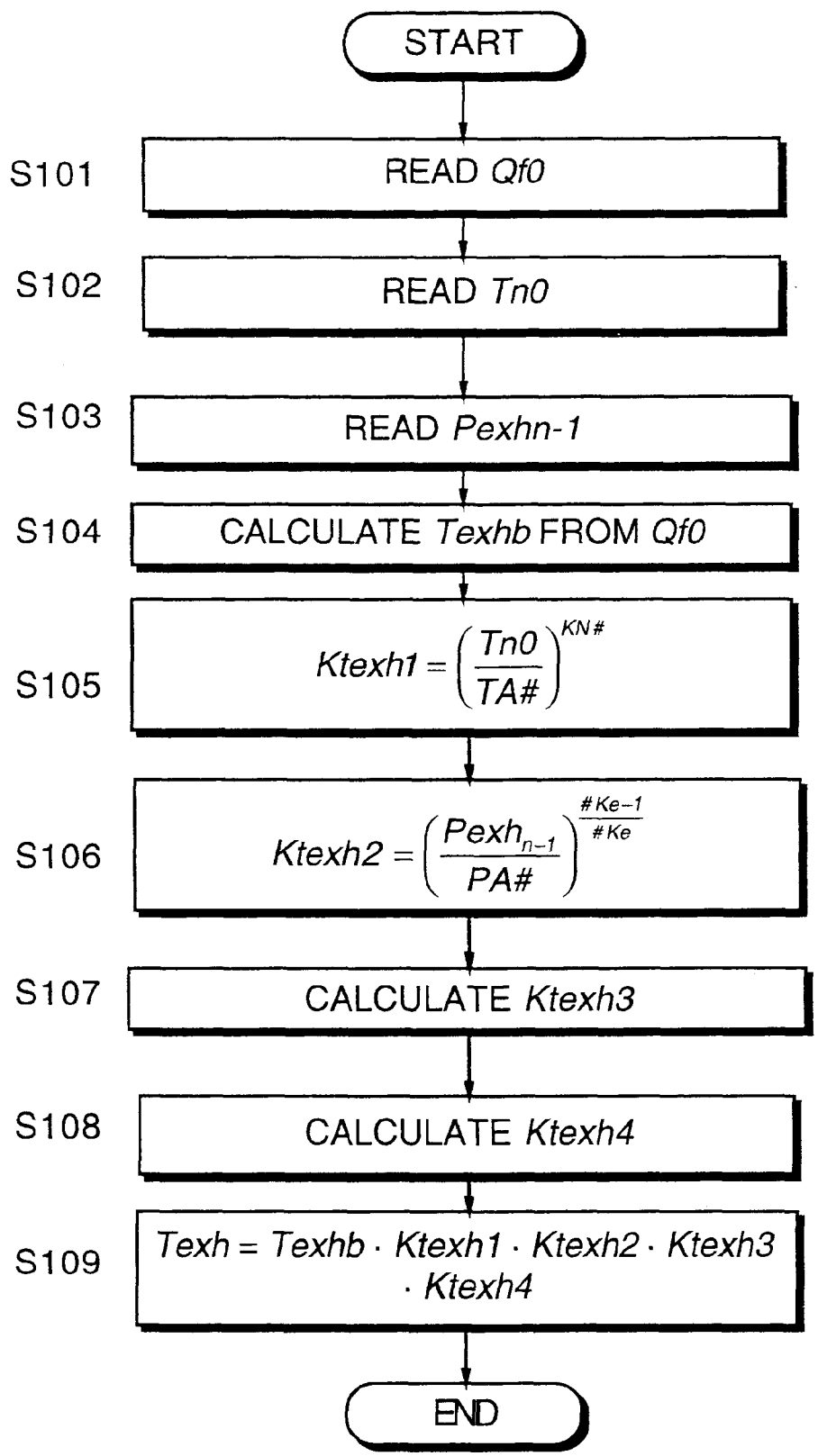
FIG. 26 is a flowchart describing a calculation routine for an exhaust gas temperature Texh executed by the controller.

A calculation routine for the exhaust gas temperature Texh will be described below with reference to FIG. 26. The controller 41 executes this routine synchronous with the Ref signal input.

Firstly in a step S101, the controller 41 reads the delay processing value Qf0 of the fuel injection amount.

Next in a step S102, a delay processing value Tn0 of the cylinder intake gas temperature is read.

In a next step S103, the immediately previous value $Pexh_{n-1}$ of the exhaust gas temperature Texh is read. The calculation of the exhaust gas pressure Pexh is described hereafter.

Figure 27:
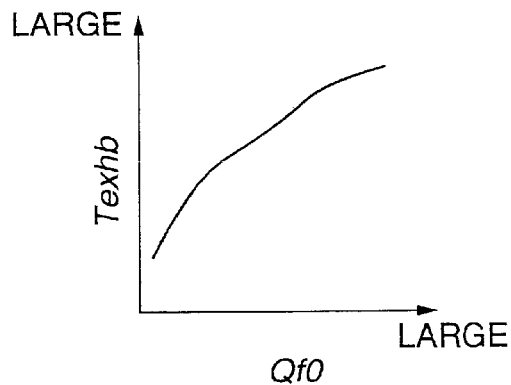
FIG. 27 is a diagram showing the characteristics of a map of an exhaust gas temperature basic value Texhb stored in the controller.

In a next step S104, an exhaust gas temperature basic value Texhb is calculated based on the delay processing value Qf0 of the fuel injection amount by looking up a map having the characteristics as shown in FIG. 27 which is pre-stored in the memory of the controller 41.

In a next step S105, an intake air temperature correction coefficient Ktexh1 for the exhaust gas temperature is calculated from the delay processing value Tn0 of the intake gas temperature from Equation (13).

$$Ktexh1 = \left(\frac{Tn0}{TA\#}\right)^{KN\#} \quad (13)$$

where, $TA\#$ = constant, and $KN\#$ = constant.

In a next step S106, an exhaust pressure correction coefficient KTexh2 for the exhaust gas temperature is calculated from the immediately previous value $Pexh_{n-1}$ of the exhaust pressure from Equation (14).

$$Ktexh2 = \left(\frac{Pexh_{n-1}}{PA\#}\right)^{\frac{\#Ke-1}{\#Ke}} \quad (14)$$

where, $PA\#$ = constant, and $\#Ke$ = constant.

Figure 28:
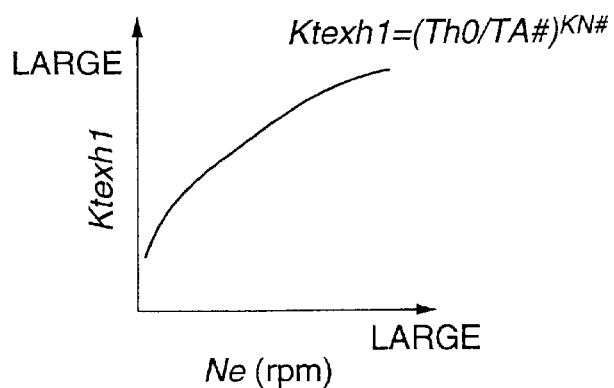
FIG. 28 is a diagram showing the characteristics of a map of an intake air temperature correction coefficient Ktexh1 stored in the controller.
Figure 29:
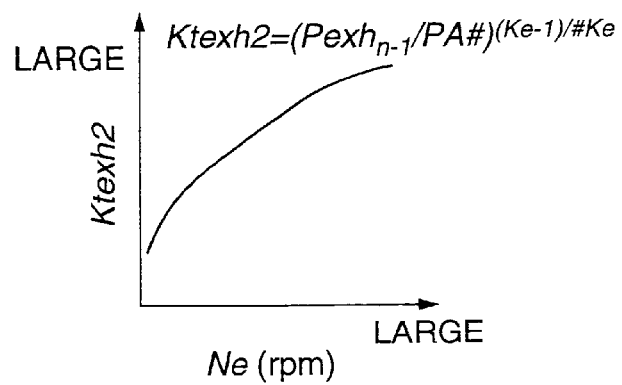
FIG. 29 is a diagram showing the characteristics of a map of an exhaust pressure correction coefficient Ktexh2 stored in the controller.

The intake air temperature correction coefficient Ktexh1 and the exhaust pressure correction coefficient Ktexh2 may also be calculated by looking up the maps shown in FIGS. 28 and 29.

Figure 30:
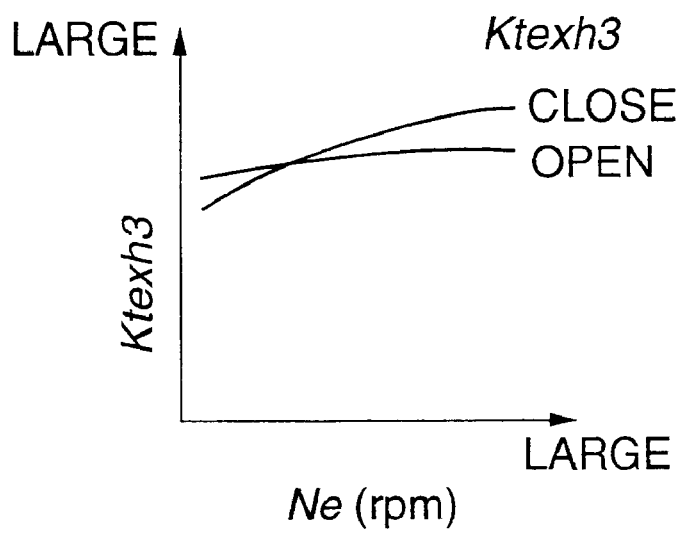
FIG. 30 is a diagram showing the characteristics of a map of a swirl correction coefficient Ktexh3 stored in the controller.

The controller 41 then calculates a swirl correction coefficient Ktexh3 for the exhaust gas temperature based on the engine rotation speed Ne and an operation position of the swirl control valve 4 by looking up a map having the characteristics as shown in FIG. 30 which is pre-stored in the memory of the controller 41. The operation position of the swirl control valve 4 provides only two types of values corresponding to an open and a closed states of the swirl control valve 4.

Figure 31:
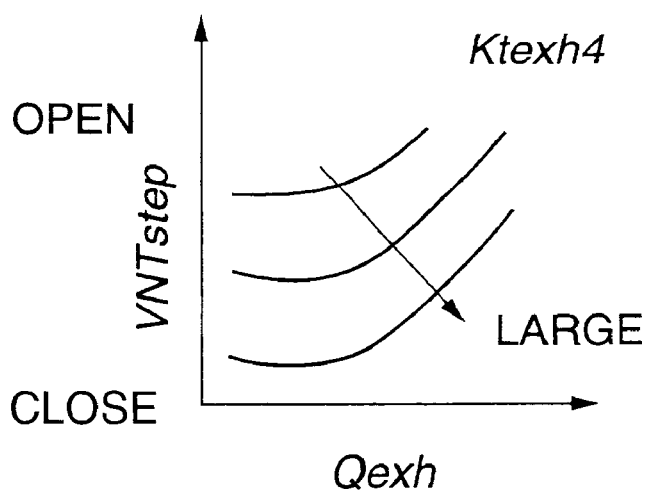
FIG. 31 is a diagram showing the characteristics of a map of a variable nozzle opening correction coefficient Ktexh4 stored in the controller.

In a next step S108, a nozzle opening correction coefficient KTexh4 for the exhaust gas temperature is calculated based on the command opening VNTstep and the exhaust gas amount Qexh by looking up a map having the characteristics as shown in FIG. 31 which is pre-stored in the memory of the controller 41.

In a next step S109, the exhaust gas temperature Texh is calculated by multiplying the four coefficients Ktexh1, Ktexh2, Ktexh3, Ktexh4 by the exhaust gas temperature basic value Texhb.

The process executed by this routine is based on the approximating Equation (15) derived from thermodynamic principles.

$$Texh = \frac{Qas0}{Qas0 + Qf} \cdot \frac{1}{\eta t \cdot \eta c} \cdot \frac{\frac{\kappa a}{\kappa a - 1}}{\frac{\kappa e}{\kappa e - 1}} \cdot Ta0 \cdot \frac{\left(\frac{Pm}{Pa}\right)^{\frac{\kappa a-1}{\kappa a}} - 1}{1 - \left(\frac{Pa}{Pexh}\right)^{\frac{\kappa e-1}{\kappa e}}} \quad (15)$$

where,
- $\eta t$=efficiency of work output from the exhaust gas turbine 2A with respect to work input thereto, according to the law of energy conservation,
- $\eta c$=efficiency of work output from the compressor 2B with respect to work input thereto, according to the law of energy conservation,
- $\kappa a$=ratio of specific heat of intake gas according to the first law of thermodynamics (Maxwell's formulae), and
- $\kappa e$=ratio of specific heat of exhaust gas according to the first law of thermodynamics (Maxwell's formulae).

Figure 32:
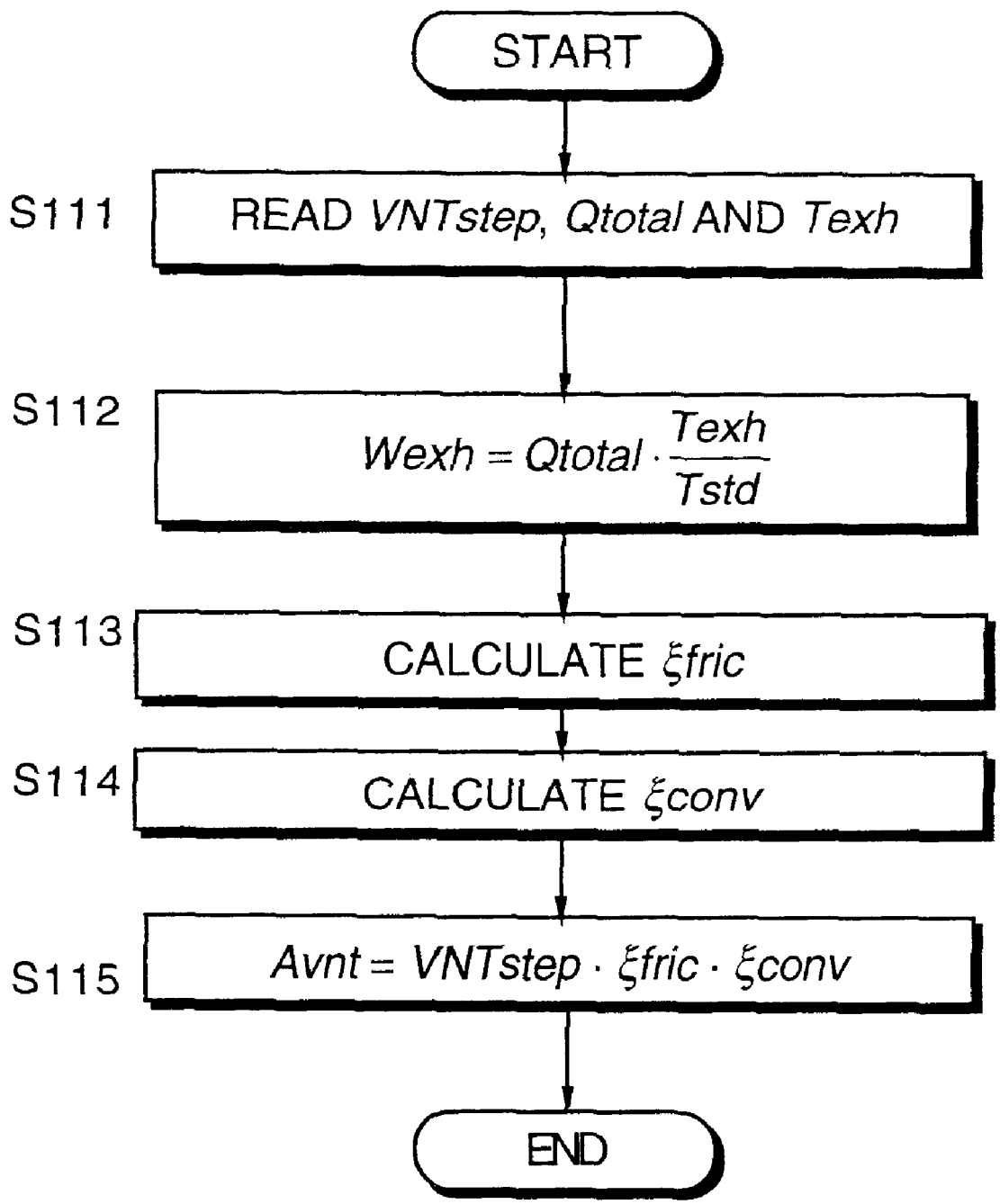
FIG. 32 is a flowchart describing a calculation routine for an effective sectional area equivalence value Avnt executed by the controller.

A calculation routine for an effective sectional equivalence value Avnt for the variable nozzle 2D will be described below with reference to FIG. 32. The controller 41 executes this routine synchronous with the Ref signal input.

Firstly in a step S111, the controller 41 reads the exhaust gas temperature Texh and a total exhaust gas mass Qtotal defined by Qtotal=Qas0+Qf of the diesel engine 51 and the command opening VNTstep of the variable nozzle 2D.

In a next step S112, an exhaust gas flow speed equivalence value Wexh is calculated based on the total exhaust gas mass Qtotal and the exhaust gas temperature Texh from Equation (16).

$$Wexh = Qtotal \cdot \frac{Texh}{Tstd} (m^2/\sec) \quad (16)$$

where, $Tstd$ = reference atmospheric temperature.

Figure 33:
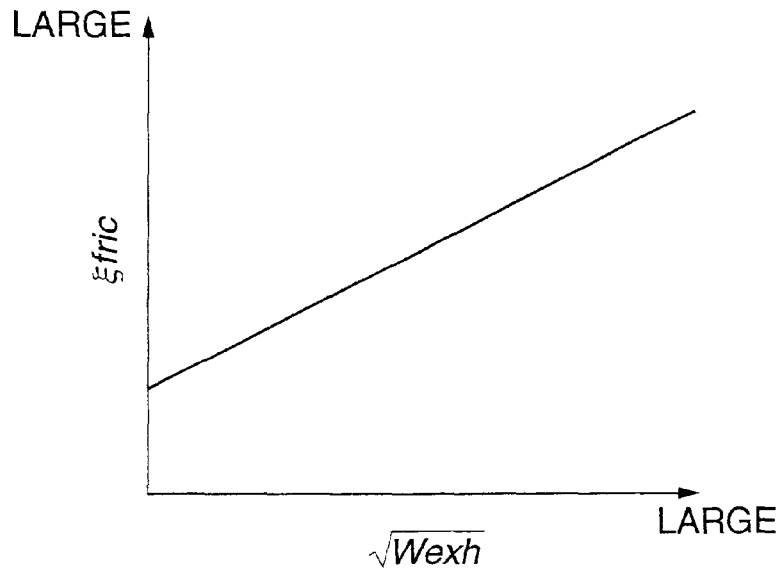
FIG. 33 is a diagram showing the characteristics of a map of a friction loss coefficient $\xi fric$ of exhaust gas stored in the controller.

In a next step S113, a friction loss coefficient $\xi fric$ of exhaust gas is calculated from the square root of the exhaust gas flow speed equivalence value Wexh by looking up a map having the characteristics as shown in FIG. 33 which is pre-stored in the memory of the controller 41.

Figure 34:
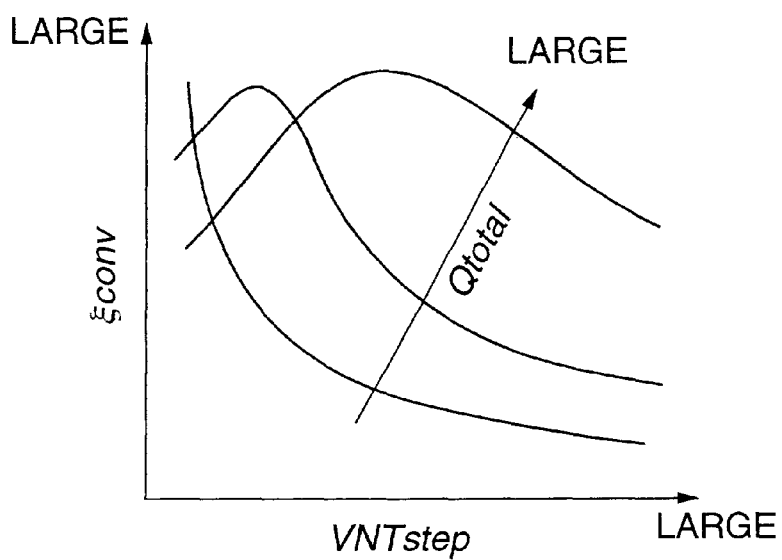
FIG. 34 is a diagram showing the characteristics of a map of a nozzle loss coefficient $\xi conv$ stored in the controller.

In a next step SI 14, a nozzle loss coefficient $\xi conv$ of the variable nozzle 2D is calculated from the command opening VNTstep and the total exhaust gas mass Qtotal by looking a map having the characteristics as shown in FIG. 34 which is pre-stored in the memory of the controller 41.

In a next step S115, the effective sectional equivalence value Avnt for the variable nozzle 2D is calculated by multiplying the friction loss coefficient $\xi fric$ and the nozzle loss coefficient $\xi conv$ by the command opening VNTstep.

Figure 35:
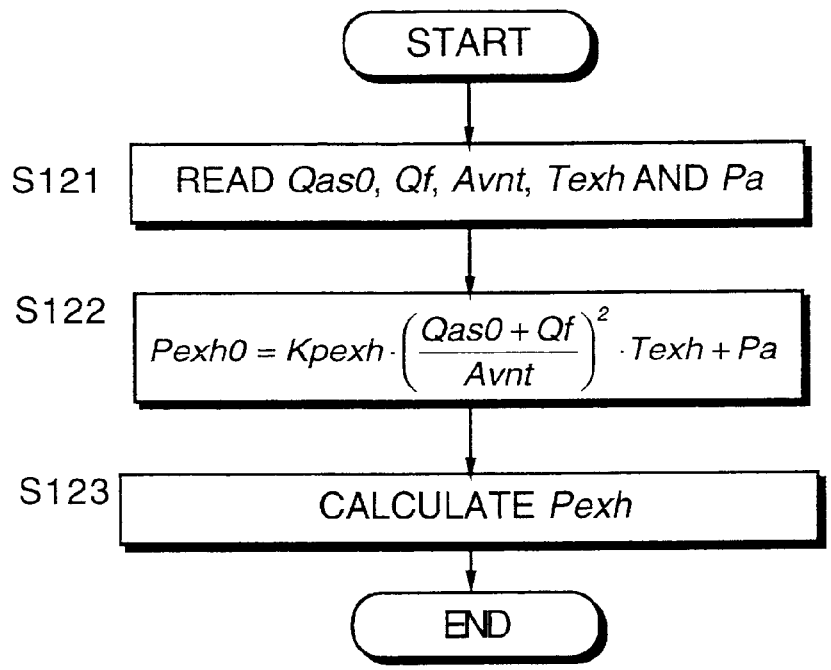
FIG. 35 is a flowchart describing a calculation routine for an exhaust pressure Pexh executed by the controller.

A calculation routine for the exhaust pressure Pexh will be described below with reference to FIG. 35. The controller 41 executes this routine synchronous with the Ref signal input. This routine is a routine for predicting the value for the exhaust pressure Pexh from other parameters.

Firstly in a step S121, the controller 41 reads the intake fresh air flowrate Qas0, the fuel injection amount Qf, the effective sectional equivalence value Avnt, the exhaust gas temperature Texh and the atmospheric pressure Pa.

In a next step S122, an exhaust pressure equivalence value Pexh0 is calculated from the above parameters from Equation (17).

$$Pexh0 = Kpexh \cdot \left(\frac{Qas0 + Qf}{Avnt}\right)^2 \cdot Texh + Pa \quad (17)$$

where, $Kpexh$ = constant.

Figure 36:
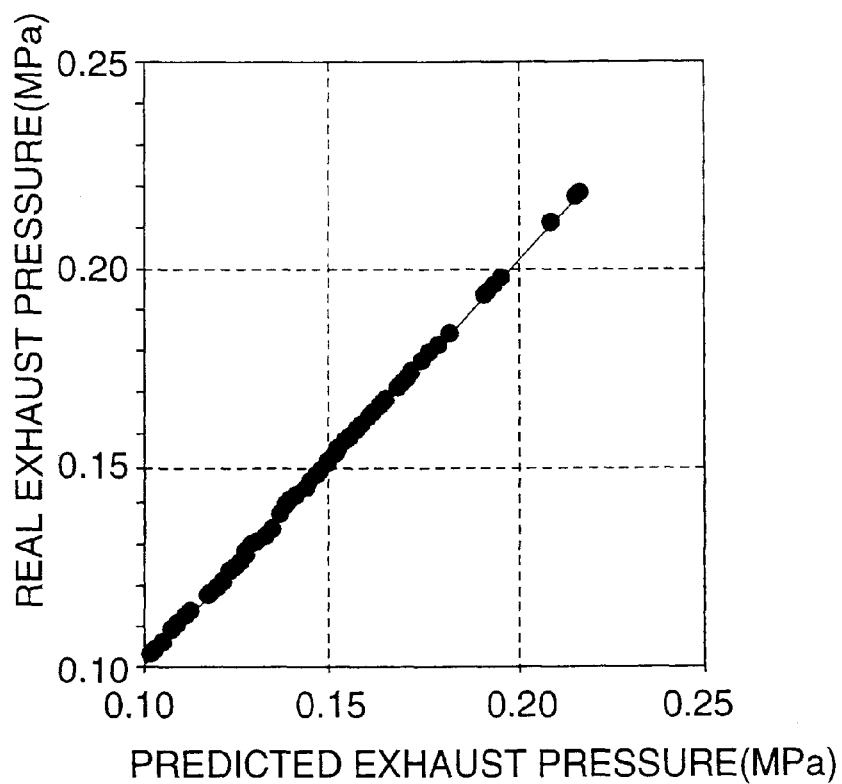
FIG. 36 is a diagram comparing the actual value for the exhaust pressure and the predicted value Pexh.

In a next step S123, the exhaust pressure Pexh is calculated by applying a weighted average to the exhaust pressure equivalence value Pexh0. The predicted value Pexh has been shown to be sufficiently accurate as shown in FIG. 36 on the basis of experimental confirmation by the inventors of the correlation between the real value of the exhaust pressure and the predicted value obtained by the above process.

Figure 37:
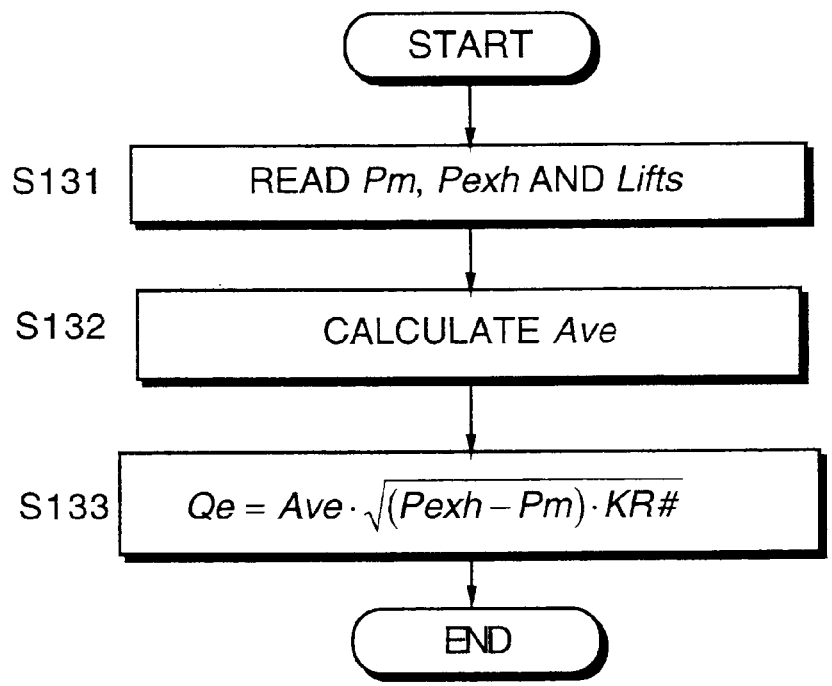
FIG. 37 is a flowchart describing a calculation routine for an EGR flowrate Qe executed by the controller.

A calculation routine for an EGR flowrate Qe will be described below with reference to FIG. 37. The controller 41 executes this routine synchronous with the Ref signal input.

Firstly in a step S131, the controller 41 reads the intake pressure Pm, the exhaust pressure Pexh and a lift amount Lifts for the EGR valve 57. The lift amount Lifts of the EGR valve 57 is a value which is converted from the step number output from the controller 41 to the step motor 2C.

Figure 38:
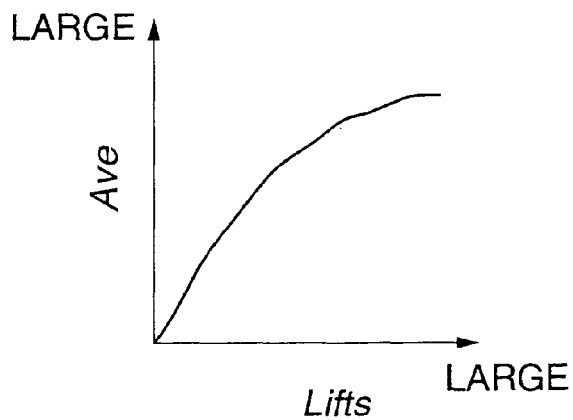
FIG. 38 is a diagram showing the characteristics of a map of an opening area equivalence value Ave of an EGR value stored in the controller.

In a next step S132, an opening area equivalence value Ave for the EGR valve 57 is calculated based on the lift amount Lifts of the EGR valve by looking up a map having the characteristics as shown in FIG. 38 which is pre-stored in the memory of the controller 41.

In a step S133, an EGR flowrate Qe is calculated from the opening area equivalence value Ave for the EGR valve, the exhaust pressure Pexh and the intake pressure Pm based on Equation (18).

$$Qe = Ave \cdot \sqrt{(Pexh - Pm) \cdot KR\#} \quad (18)$$

where, $KR\#$ = constant.

Figure 39:
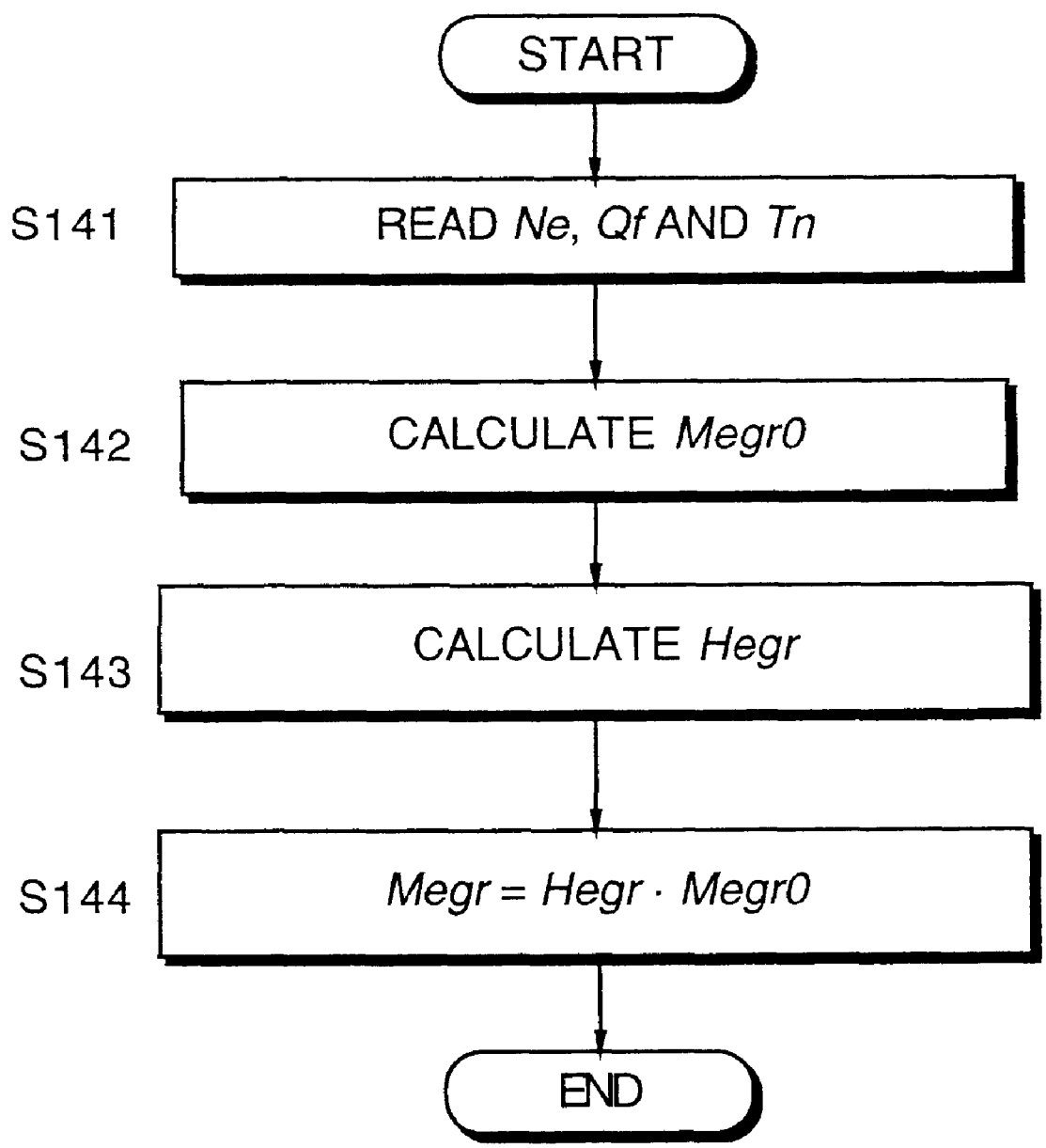
FIG. 39 is a flowchart describing a calculation routine for a target EGR rate Megr executed by the controller.

A calculation routine for a target EGR rate Megr will be described below with reference to FIG. 39. The controller 41 executes this routine synchronous with the Ref signal input.

Firstly in a step S141, the controller 41 reads the engine rotation speed Ne, the fuel injection amount Qf and the cylinder intake gas temperature Tn.

Figure 40:
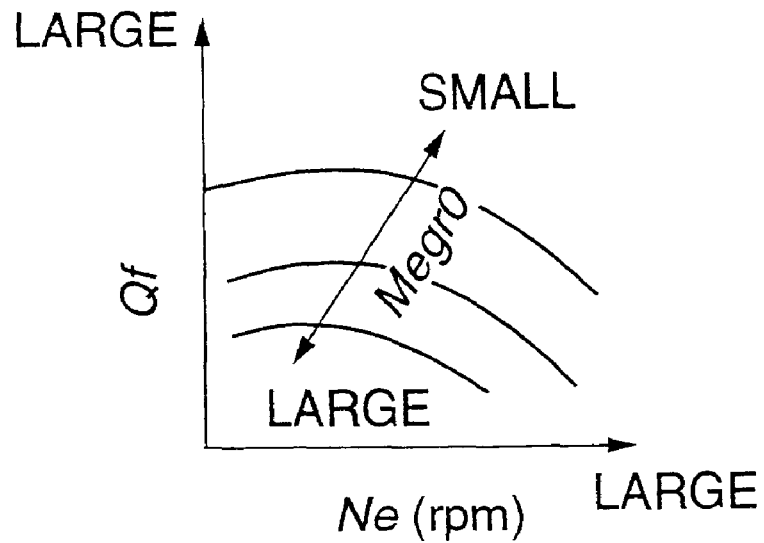
FIG. 40 is a diagram showing the characteristics of a map of a target EGR rate basic value Megr0 stored in the controller.

In a next step S142, a target EGR rate basic value Megr0 is calculated based on the engine rotation speed Ne and the fuel injection amount Qf by looking up a map having the characteristics as shown in FIG. 40 which is pre-stored in the memory of the controller 41.

Figure 41:
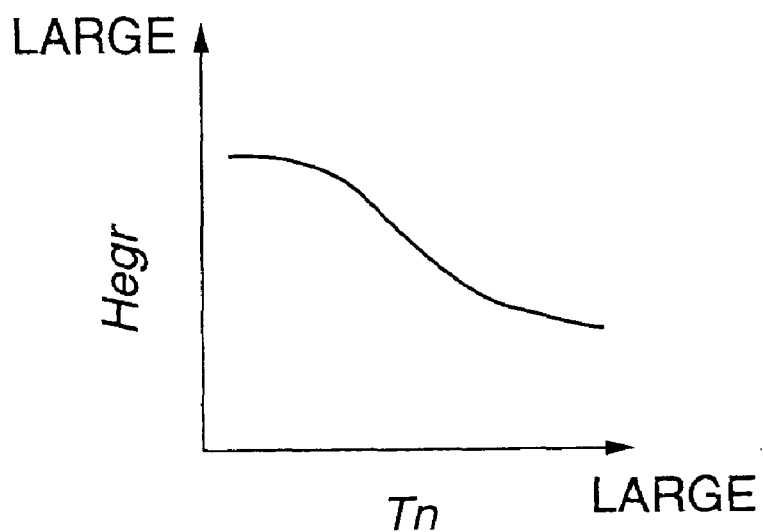
FIG. 41 is a diagram showing the characteristics of a map of a target EGR rate correction value Hegr stored in the controller.

In a next step S143, a target EGR rate correction value Hegr is calculated based on the cylinder intake gas temperature Tn by looking up a map having the characteristics as shown in FIG. 41 which is pre-stored in the memory of the controller 41.

In a next step S144, a target EGR rate Megr is calculated by multiplying the target EGR rate correction value Hegr by the target EGR rate basic value Megr0.

Figure 42:
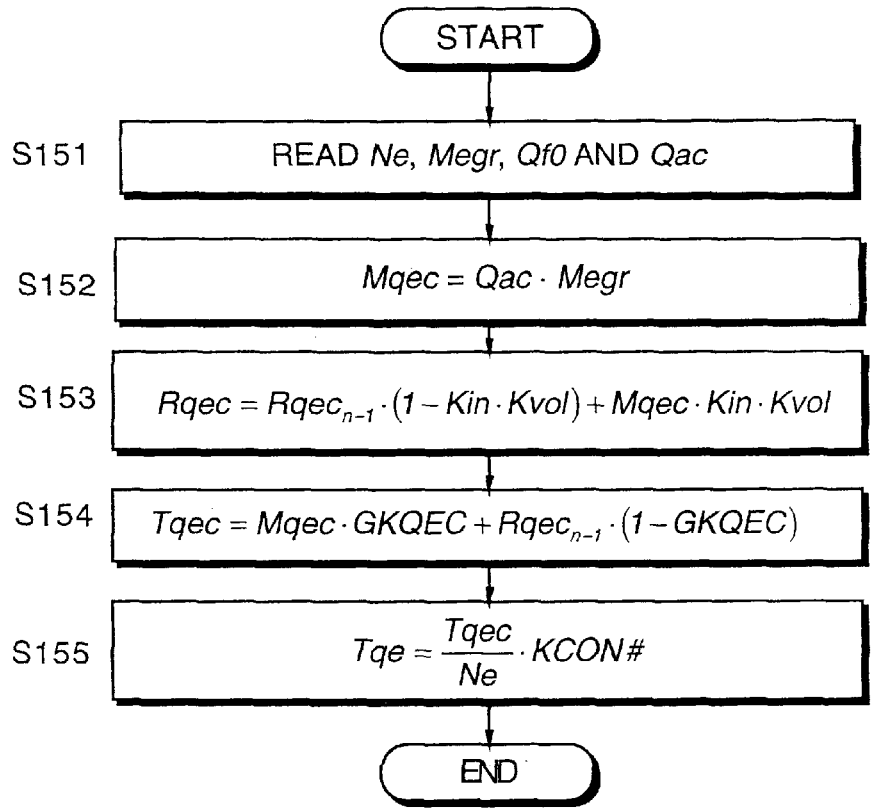
FIG. 42 is a flowchart describing a calculation routine for a required EGR flowrate Tqe executed by the controller.

A calculation routine for a required EGR flowrate Tqe will be described below with reference to FIG. 42. The controller 41 executes this routine synchronous with the Ref signal input.

Firstly in a step S151, the controller 41 reads the engine rotation speed Ne, the target EGR rate Megr, the cylinder intake fresh air amount Qac and the delay processing value Qf0 of the fuel injection amount.

In a next step S152, a target intake EGR amount Mqec is calculated by multiplying the target EGR rate Megr by the cylinder intake fresh air amount Qac.

In a next step S153, an intermediate processing value Rqec is calculated by applying a weighted average to the target intake EGR amount Mqec by Equation (19).

$$Rqec = Rqec_{n-1} \cdot (1 - Kin \cdot Kvol) + Mqec \cdot Kin \cdot Kvol \quad (19)$$

where, $Rqec_{n-1}$=Rqec calculated on the immediately preceding occasion the routine was performed, and Kin·Kvol=weighted average coefficient.

In a next step S154, a target cylinder intake EGR amount Tqec is calculated by performing an advancing process using the intermediate processing value Rqec and the target intake EGR amount Mqec with Equation (20).

$$Tqec = Mqec \cdot GKQEC + Rqec_{n-1}(1 - GKQEC) \quad (20)$$

where, $Rqec_{n-1}$=Rqec calculated on the immediately preceding occasion the routine was performed, and GKQEC=advance correction gain.

When the EGR valve 57 is operated to vary the EGR amount, a delay is generated from the operation of the EGR valve 57 until the variation in the EGR amount occurs in the cylinder 51A. The delay results from the capacity of the passage from the EGR valve 57 to the intake valve of the cylinder 51A via the collector 52A and the intake manifold 52B. The process in the step S154 is an advancing process for compensating this delay.

In a next step S155, the required EGR flowrate Tqe is calculated by converting the target cylinder intake EGR amount Tqec from an amount per cylinder to an amount per unit time by applying Equation (21).

$$Tqe = \frac{Tqec}{Ne} \cdot KCON\# \quad (21)$$

where, $KCON\#$ = constant.

Figure 43:
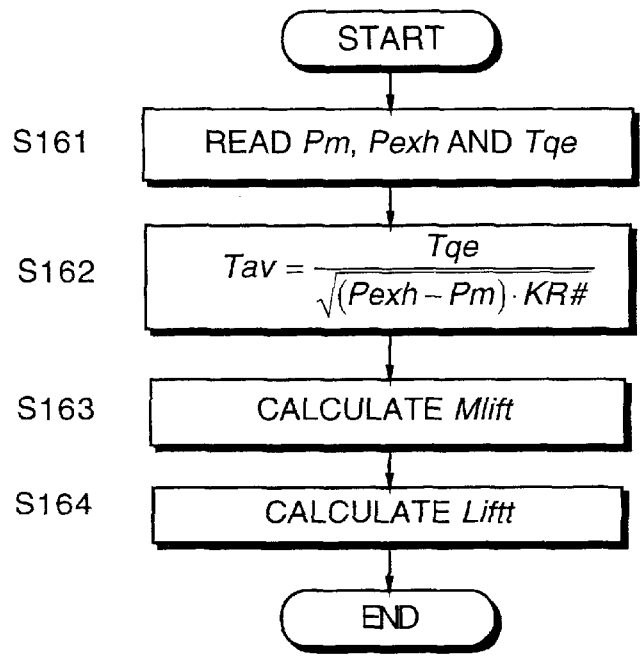
FIG. 43 is a flowchart describing a calculation routine for a command EGR valve lift amount Liftt executed by the controller.

A calculation routine for the command EGR valve lift amount Liftt will be described below with reference to FIG. 43. The controller 41 executes this routine synchronous with the Ref signal input.

Firstly in a step S161, the controller 41 reads the intake pressure Pm, the exhaust pressure Pexh and the required EGR flowrate Tqe.

In a next step S162, a required opening surface area Tav of the EGR valve 57 is calculated from Equation (22).

$$Tav = \frac{Tqe}{\sqrt{(Pexh - Pm) \cdot KR\#}} \quad (22)$$

where, $KR\#$ = constant.

Figure 44:
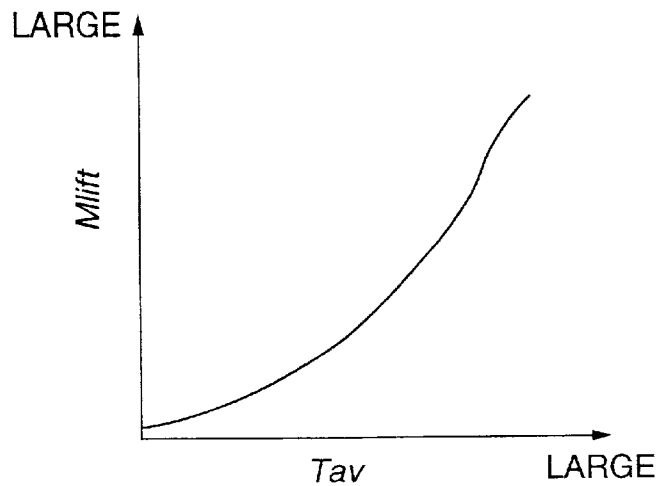
FIG. 44 is a diagram showing the characteristics of a map of an EGR valve target lift amount Mlift stored in the controller.

Next in a step S163, the EGR valve target lift amount Mlift is calculated based on the required opening surface area Tav of the EGR valve 57 by looking up a map having the characteristics as shown in FIG. 44 which is pre-stored in the memory of the controller 41.

In a next step S163, an EGR valve target lift amount Mlift is calculated based on the required opening surface area Tav of the EGR valve 57 by looking up a map having the characteristics as shown in FIG. 44 which is pre-stored in the memory of the controller 41.

In a next step S164, the command EGR valve lift amount Liftt is calculated by applying an advancing process corresponding to the response time of the EGR valve 57 to the target lift amount Mlift. The controller 41 drives the EGR valve 57 with the target lift amount Mlift by outputting a step number corresponding to the command EGR valve lift amount Liftt to the step motor 57A.

This completes the description of EGR control.

Next the fuel injection control according to this invention executed by the controller 41 will be described.

Although low-temperature premixing combustion suppresses combustion noise to a desirable level during a steady running state of the diesel engine 51, the combustion noise increases and exhaust gas composition is adversely affected during a transient running state, in particular during acceleration, of the diesel engine 51. In order to suppress noise and improve the exhaust gas composition, the controller 41 controls the diesel engine 51 so that low-temperature premixing combustion is performed during the steady running state and a predetermined pattern of pilot fuel injection and main fuel injection is performed during the transient running state.

The outline of this control will be firstly described.

Figure 45:
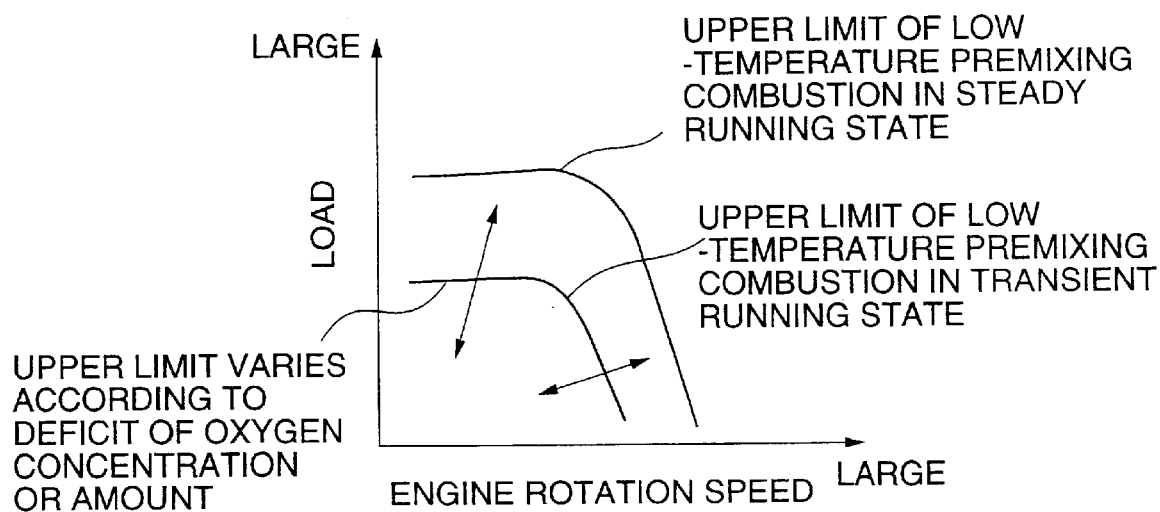
FIG. 45 is a diagram showing an operation region of a diesel engine enabling premixing combustion.

Referring to FIG. 45, the inventors have discovered on the basis of experiment that in the same diesel engine as that used in the aforesaid prior arts, the permissible region for premixing combustion during the transient running state is smaller than the permissible region for premixing combustion during the steady running state. The inventors have further discovered that the difference between these regions varies when there is a difference between the oxygen amount or the oxygen concentration of the intake gas during the transient running state and the target oxygen amount or concentration during the steady running state.

Consequently the inventors conducted an experiment on the basis of the following method in order to prevent deterioration in the exhaust gas composition and increase in noise during acceleration of the diesel engine.

Figure 46:
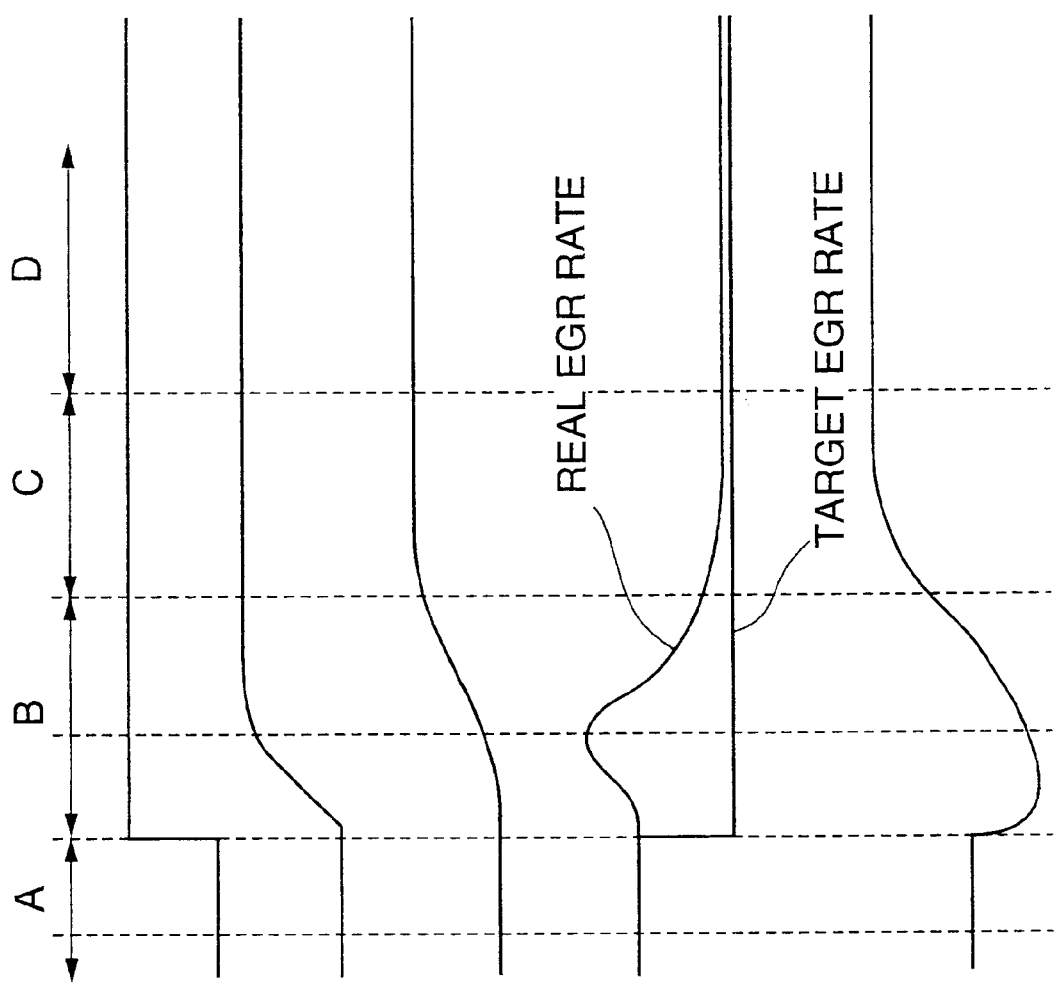
FIGS. 46A–46E is a timing chart showing a variation in the fuel injection amount, an exhaust pressure, an intake pressure, an excess air factor and an EGR rate during acceleration of a diesel engine as a result of low-temperature premixing combustion.
Figure 47:
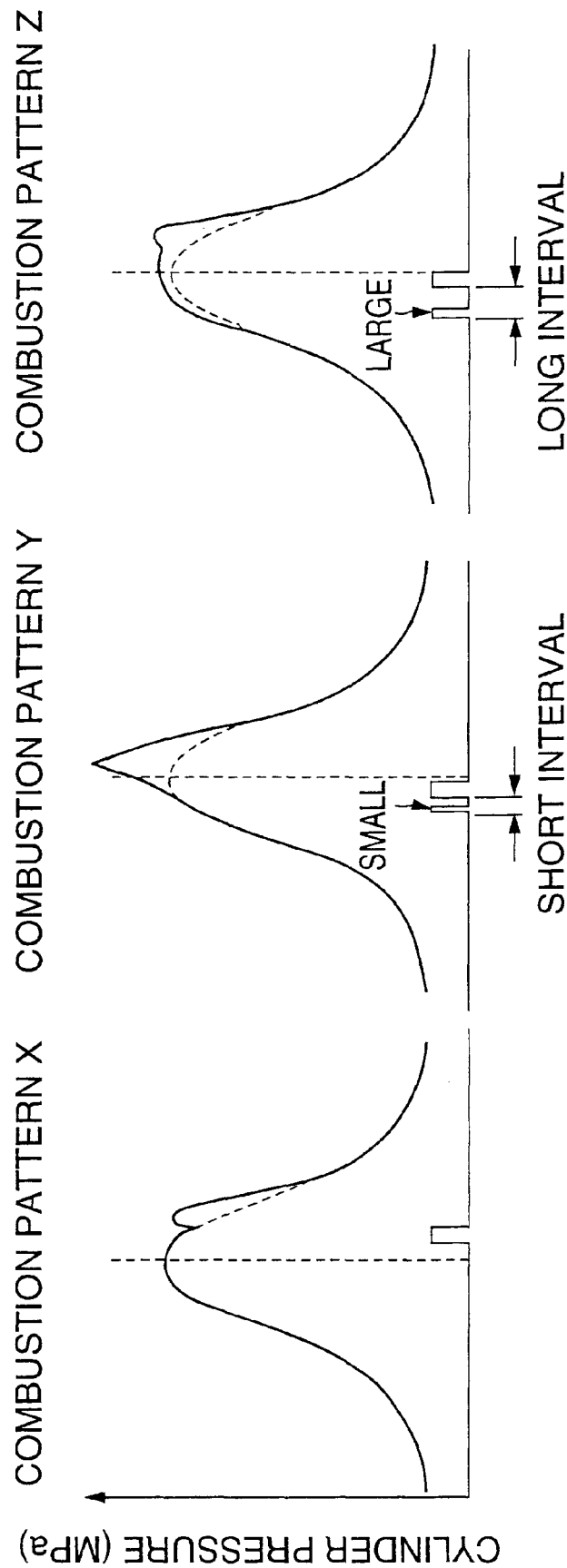
FIGS. 47A–47C is a timing chart showing combustion patterns X, Y and Z according to the operation region of the diesel engine in view of a variation in a cylinder pressure under a control by the fuel injection control device according to this invention.

Referring to FIG. 46A, region A shows a steady running state before acceleration. Low temperature premixing combustion is performed in the region A. The variation of the cylinder pressure of the diesel engine in this state is shown in FIG. 47A. When the accelerator pedal is depressed by the driver to accelerate the vehicle, the fuel injection amount undergoes a rapid increase as shown in FIG. 46A. However the exhaust pressure of the diesel engine increases gently as shown in FIG. 46B.

The intake pressure increases after a further delay as shown in FIG. 46C due to a turbo-lag during acceleration. As a result, the intake pressure is low in the region B before acceleration and the EGR amount undergoes a temporary rapid increase as shown in FIG. 46D. On the other hand, the excess air factor rapidly decreases as shown in FIG. 46E. Therefore in the engine, oxygen is in a state of considerable insufficiency and the EGR rate is in excess. This phenomenon causes increases in the generation of smoke and combustion noise as the ignition timing delay of the air-fuel mixture is considerable lengthened and thereafter the air-fuel mixture is suddenly combusted.

As stated above, the possible region for premixing combustion during the transient running state is smaller than the possible region for premixing combustion during the steady running state and the difference between these regions varies when there is a difference between the oxygen amount or the oxygen concentration of the intake gas during the transient running state and the target values for the oxygen amount or concentration during the steady running state.

Therefore in the region B, a relatively advanced small pilot fuel injection is performed in order to suppress excessive increase in the ignition delay period. The injection interval between the pilot fuel injection and the main fuel injection is shortened and the main fuel injection is completed before the compression top dead center of each cylinder.

As a result, the variation in the cylinder pressure of the diesel engine displays the same variation as in a gasoline engine as shown in FIG. 47B and combustion noise is reduced accordingly.

The oxygen amount and the oxygen concentration do not have the same meaning with respect to their effect on exhaust gas composition. In general, the oxygen amount effects the produced amount of particulate matter which results in smoke. The oxygen concentration results in the produced amount of nitrogen oxides (NOx). However it is not possible to completely separate the control characteristics of the oxygen amount and the oxygen concentration. Although an EGR device is used mainly in the control of the oxygen concentration and a turbocharger is used mainly in the control of the oxygen amount, the interrelation of the two variable means that it is not possible to perform control of the oxygen concentration independently of control of oxygen amount.

In the region C in the latter half of acceleration, excess EGR is eliminated and the oxygen concentration increases. However the absolute amount of oxygen remains insufficient due to the influence of the turbo-lag. In this case, the generated amount of smoke will increase if the fuel injection method of the region B is continued.

In the region C, the pilot fuel injection amount is increased and the injection interval between the pilot fuel injection and the main fuel injection is lengthened so that the main fuel injection is performed after complete combustion of the pilot fuel injection. As a result, the generation of smoke is suppressed. The combustion noise is also reduced due to the fact that combustion is performed in an inactive manner due to an internal exhaust gas recirculation caused by the combustion gas.

The variation in the cylinder pressure in this state is shown in FIG. 47C. The waveform corresponds to the waveform of typical diesel combustion due to a pilot fuel injection. A method of completing combustion of a pilot fuel injection before starting a main fuel injection is known from Tokkai 2000-64891 published by the Japanese Patent Office in 2000.

After fuel injection control in the region C, the target oxygen concentration or the target oxygen amount is realized as shown in the region D and the execution of the low-temperature premixing combustion is resumed.

On the basis of these experiments, when the diesel engine 51 is undergoing acceleration, the control device performs different fuel injection patterns in the region B and the region C. The region B and the region C are discriminated on the basis of the difference of the measured value of the oxygen concentration or oxygen amount from the target values thereof during the steady running state.

This fuel injection pattern is also applied during deceleration of the diesel engine 51. During deceleration, when fuel cut is performed and the engine rotation speed Ne falls to less than or equal to a predetermined value, fuel recovery by a small amount of fuel injection is performed in order maintain engine operation. During deceleration, the turbo-lag delays the reduction in the turbocharging pressure in an opposite manner to that during acceleration. As a result, oxygen is in excess and the ignition delay period is shortened due to the relatively high turbocharging pressure and the low fuel injection amount.

Conversely, after the turbocharging pressure is reduced, the ignition delay period is lengthened as a result of insufficiency in the oxygen amount. In this manner, in the regions displaying high turbocharging pressure and low fuel injection amounts in the first half of deceleration, fuel injection is controlled to coincide with the combustion pattern shown in FIG. 47C in order to prevent the generation of noise resulting from difference in the ignition delay period. After the turbocharging pressure falls, fuel injection is controlled to obtain the combustion pattern shown in FIG. 47B. In this manner, it is also possible to suppress noise during deceleration.

Next the control routines performed by the controller 41 to realize the above control concept will be described in detail.

Figure 48:
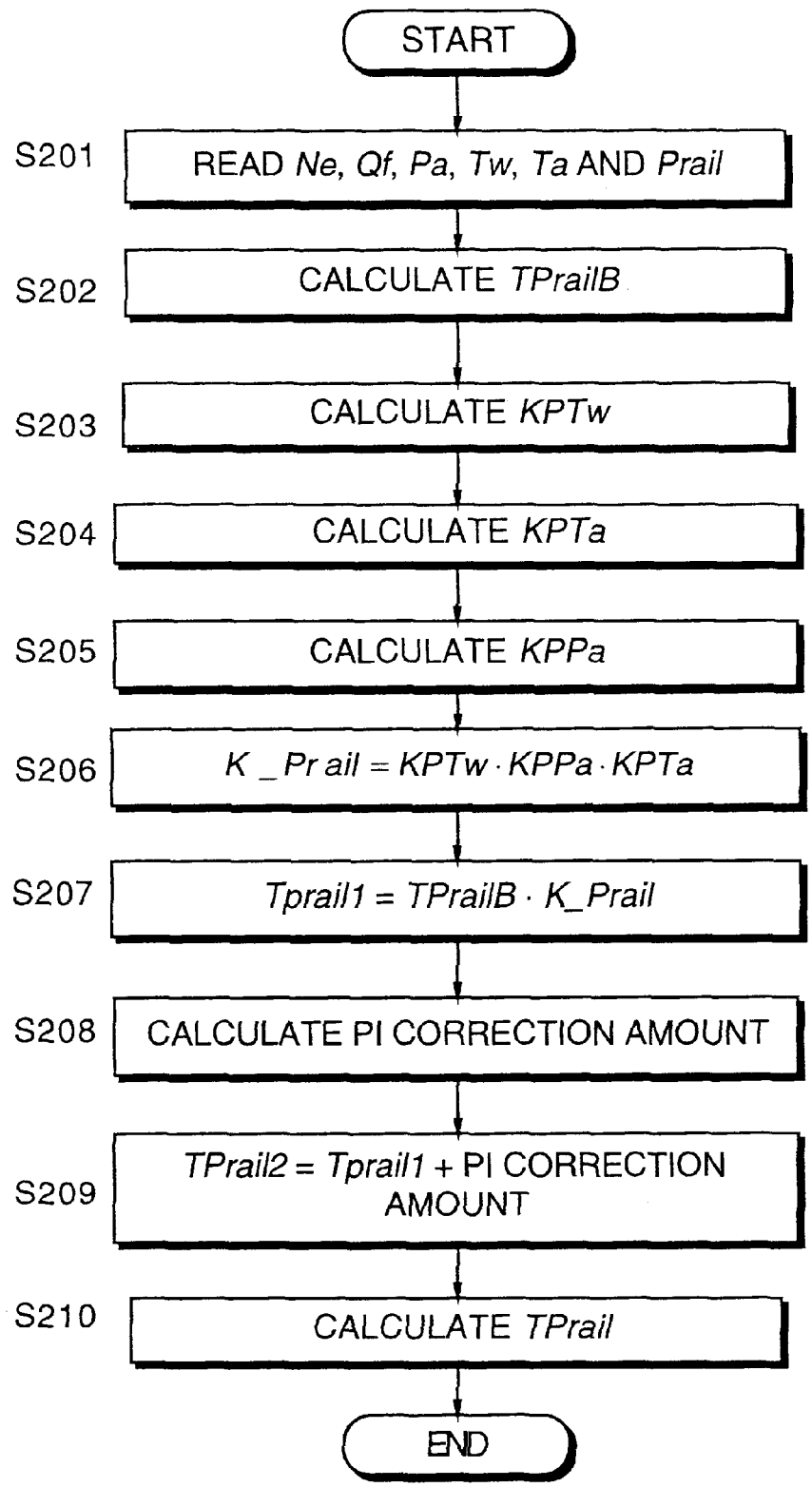
FIG. 48 is a flowchart describing a calculation routine for a target common-rail pressure TPrail executed by the controller.

Firstly a calculation routine for a target common rail pressure TPrail will be described referring to FIG. 48. The controller 41 performs this routine at intervals of ten milliseconds.

In a step S201, the controller 41 reads the engine rotation speed Ne, the fuel injection amount Qf, the atmospheric pressure Pa, the cooling water temperature Tw, the collector intake fresh air temperature Ta and a real common rail pressure Prail. The fuel injection amount Qf is the value calculated in the routine shown in FIG. 22 and the collector intake fresh air temperature Ta is the value calculated in the routine in FIG. 19. The real common rail pressure Prail is detected by the pressure sensor 32.

Figure 49:
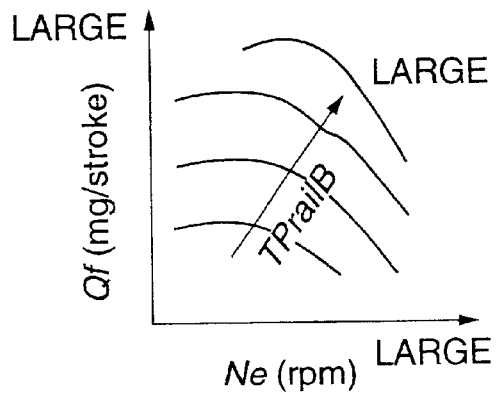
FIG. 49 is a diagram showing the characteristics of a map of a basic value TPrailB for the target common-rail pressure stored in the controller.

In a next step S202, a basic value TPrail for the target common rail pressure is calculated based on the engine rotation speed Ne, the fuel injection amount Qf by looking up a map having the characteristics as shown in FIG. 49 which is pre-stored in the memory of the controller 41.

Figure 50:
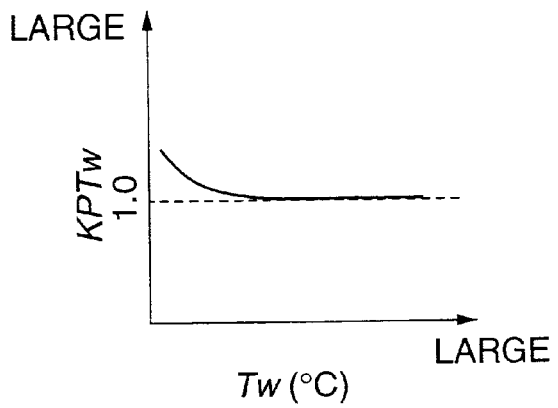
FIG. 50 is a diagram showing the characteristics of a map of a water temperature correction coefficient KPTw for the target common-rail pressure stored in the controller.

In a next step S203, a water temperature correction coefficient KPTw for the target common rail pressure is calculated based on the cooling water temperature Tw by looking up a map having the characteristics as shown in FIG. 50 which is pre-stored in the memory of the controller 41.

Figure 51:
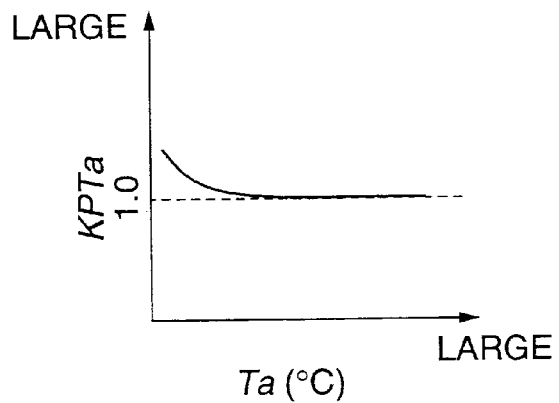
FIG. 51 is a diagram showing the characteristics of a map of an intake fresh air temperature correction coefficient KPTa stored in the controller.

Next in a step S204, an intake fresh air temperature correction coefficient KPTa is calculated based on the collector intake fresh air temperature Ta by looking up a map having the characteristics as shown in FIG. 51 which is pre-stored in the memory of the controller 41.

Figure 52:
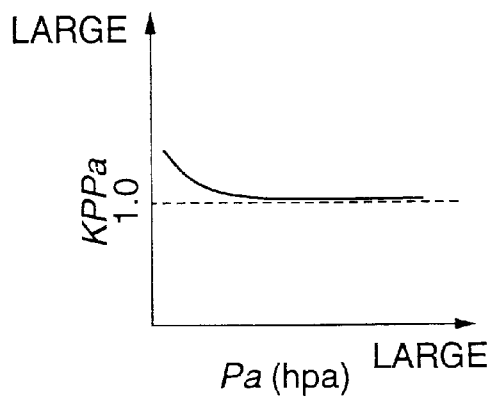
FIG. 52 is a diagram of a map of an atmospheric pressure correction coefficient KPPa stored in the controller.

Next in a step S205, an atmospheric pressure correction coefficient KPPa is calculated based on the atmospheric pressure Pa by looking up a map having the characteristics as shown in FIG. 52 which is pre-stored in the memory of the controller 41.

In a step S206, a common rail correction coefficient K_Prail is calculated from Equation (23).

$$K\_Prail = KPTw \cdot KPPa \cdot KPTa \qquad (23)$$

In a next step S207, the target common rail pressure TPrail1 is calculated by multiplying the correction coefficient K_Prail by the basic value TPrailB of the target common rail pressure.

In FIG. 50, the water temperature correction coefficient during low water temperatures is set to a larger value than 1.0. The reason of this setting may be explained as follows. At a low water temperature, the fuel temperature is also low and it is difficult to obtain preferred fuel spray characteristics. Consequently it has been proposed to improve the fuel spray characteristics by increasing the common rail pressure.

In FIG. 51, the intake fresh air correction coefficient KPTa at a low common rail intake fresh air temperature Ta is set to a larger value than 1.0. The reason of this setting may be explained as follows. When the common rail intake fresh air temperature Ta is low, atomization of the fuel spray is adversely affected. Thus fuel spray atomization is improved by increasing the common rail pressure that has an effect of reducing the particle size of the fuel spray.

In FIG. 52, the atmospheric pressure correction coefficient KPPa at a low atmospheric pressure Pa is set to a larger value than 1.0. The reason of this setting may be explained as follows. When the atmospheric pressure Pa is low, the real compression ratio of air-fuel mixture in the cylinder 51A is low and the air-fuel mixture can not easily be ignited. Thus air-fuel mixture ignition may be promoted by reducing the particle size of the fuel spray through increasing the common rail pressure.

Next in a step S208, a correction amount for a known proportional/integral (PI) control is calculated so that the real common rail pressure Prail coincides with the target common rail pressure TPrail1.

Next in a step S209, a corrected target common rail pressure TPrail2 is calculated by adding the correction amount to the target common rail pressure TPrail1.

Figure 53:
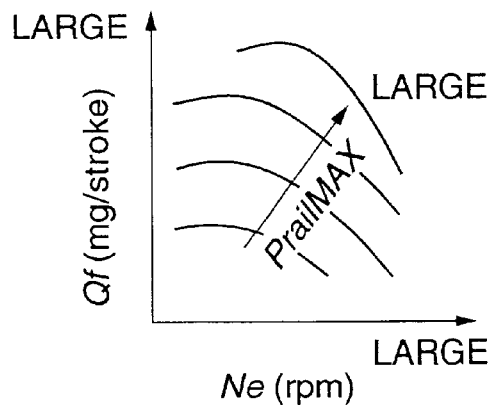
FIG. 53 is a diagram showing the characteristics of a map of a maximum common-rail pressure PrailMAX stored in the controller.
Figure 54:
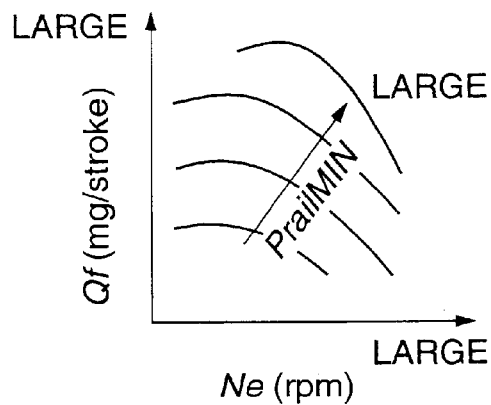
FIG. 54 is a diagram showing the characteristics of a map of a minimum common-rail pressure PrailMIN stored in the controller.

In a step S210, a maximum common rail pressure PrailMAX is calculated based on the engine rotation speed Ne by looking up a map having the characteristics as shown in FIG. 53 which is pre-stored in the memory of the controller 41. A minimum common rail pressure PrailMIN is calculated based on the fuel injection amount Qf by looking up a map having the characteristics as shown in FIG. 54 which is pre-stored in the memory of the controller 41. Thereafter the corrected target common rail pressure TPrail2 is limited to values between the maximum value PrailMAX and the minimum value PrailMIN and this limited value is set as the common rail pressure command value TPrail. The controller 41 control the common rail pressure to coincide with the target common rail pressure TPrail1 by controlling the pressure regulating valve 31 based on the common rail pressure command value TPrail calculated in the above manner.

Figure 55:
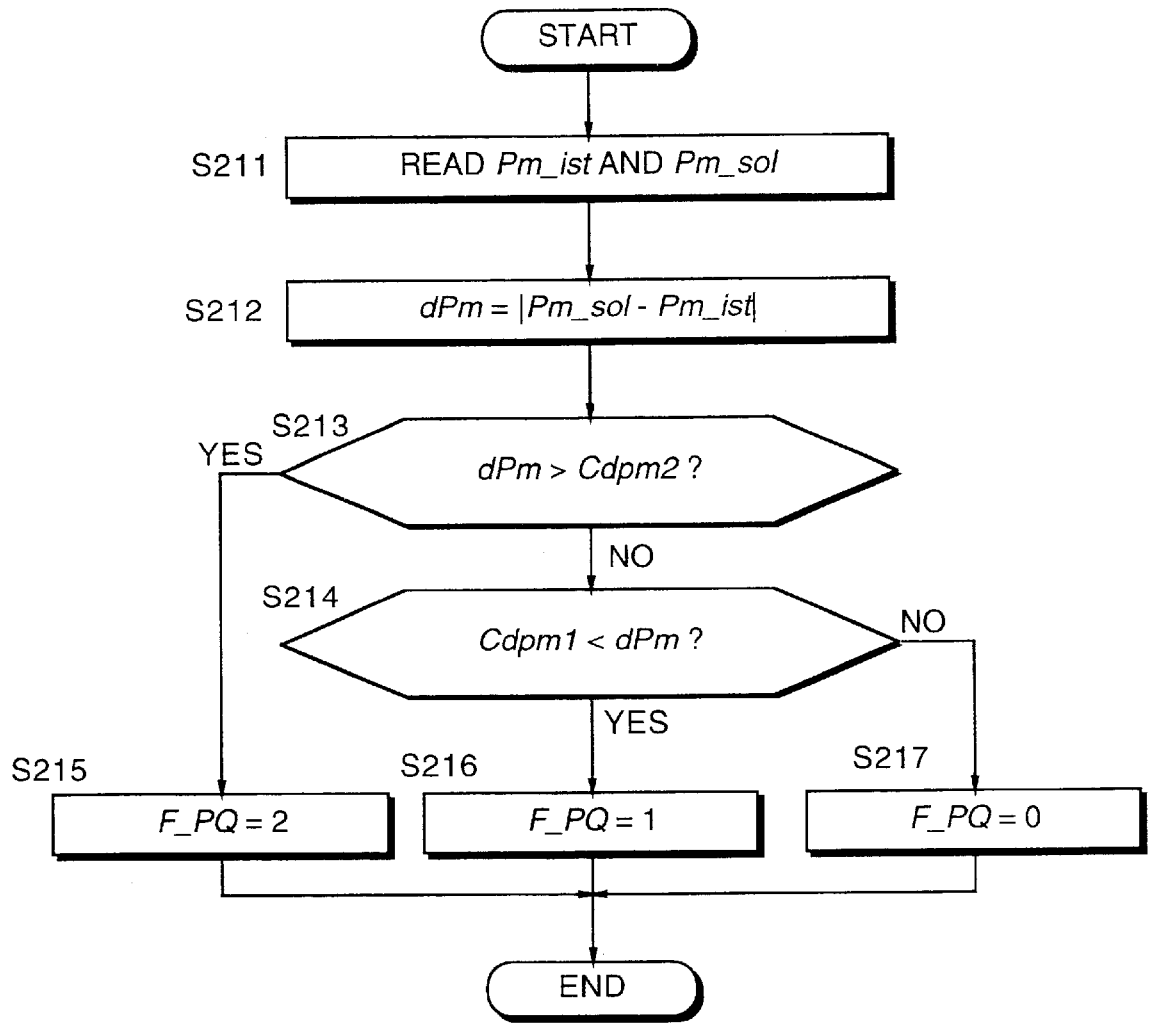
FIG. 55 is a flowchart describing a setting routine of a pilot fuel injection permission flag F_PQ executed by the controller.

Referring now to FIG. 55, a setting routine for the pilot fuel injection permission flag F_PQ will be described. The controller 41 executes this routine at intervals of ten milliseconds.

Firstly in a step S211, the controller 41 reads the real turbocharging pressure Pm_ist and the target turbocharging pressure Pm_sol. The real turbocharging pressure Pm_ist is equal to the intake pressure Pm detected by the intake pressure sensor 72. The target turbocharging pressure Pm_sol is a value calculated by the routine shown in FIG. 4.

In a next step S212, a difference dPm of the real turbocharging pressure Pm_ist and the target turbocharging pressure Pm_sol is calculated. Herein, the difference dPm is calculated as an absolute value. The reason the difference dPm is expressed as an absolute value is in order to apply this control routine not only during acceleration but also during deceleration.

In a next step S213, the difference dPm is compared with a predetermined value Cdpm2. When the difference dPm is greater than the predetermined value Cdpm2, the routine proceeds to a step S215. When the difference dPm is not greater than the predetermined value Cdpm2, the routine proceeds to a step S214. In the step S214, the difference dPm is compared with a predetermined value Cdpm1. The predetermined values Cdpm1 and Cdpm2 are values for determining whether or not the state of the diesel engine 51 corresponds to any of the regions B, C, D shown in FIGS. 46A–46E. The predetermined value Cdpm2 is set to a larger value than the predetermined value Cdpm1.

During acceleration as shown in FIGS. 46A–46E, in the region B, the difference dPm is greater than the predetermined value Cdpm2 as a result of the response delay in the turbocharging pressure. In the region C, the difference dPm is reduced and the relation Cdpm2≧dPm>Cdpm1 is established. In the region D, the difference dPm undergoes a further decrease and the relation Cdpm1≧dPm holds.

During deceleration, in the first half of deceleration, the difference dPm is greater than the predetermined value Cdpm2 as a result of the response delay in the turbocharging pressure. In the latter half of deceleration, the difference dPm is reduced and the relation Cdpm2≧dPm>Cdpm1 is established. In the interval corresponding to the steady running state after deceleration has completed, the difference dPm undergoes a further decrease and the relation Cdpm1≧dPm holds.

Thus when the difference dPm is larger than the predetermined value Cdpm2, the routine proceeds to the step S215. In this case, in the step S215, the pilot fuel injection permission flag F_PQ is set to two.

In the step S214, when the difference dPm is larger than the predetermined value Cdpm1, the routine sets the pilot fuel injection permission flag F_PQ to a value of one in a step S216.

In the step S214, when the difference is not larger than the predetermined value Cdpm1, the routine sets the pilot fuel injection permission flag F_PQ to a value of zero in a step S217.

When the pilot fuel injection permission flag F_PQ has a value of one or two, it shows that pilot fuel injection is permitted, that is to say, that the vehicle is operating in the transient running state.

When the pilot fuel injection permission flag F_PQ is se to a value of zero, it shows that pilot fuel injection is not permitted, that is to say, that the vehicle is operating in the steady running state.

The predetermined values Cdpm1 and Cdpm2 are determined by analysis of measurement results of the exhaust composition, the fuel consumption and the combustion noise, when the engine rotation speed Ne and load are fixed and the turbocharging pressure is varied. Since preferred values for the predetermined values Cdpm1 and Cdpm2 vary depending on the type of engine, the predetermined values Cdpm1 and Cdpm2 are set experimentally for various types of engine.

Figure 56:
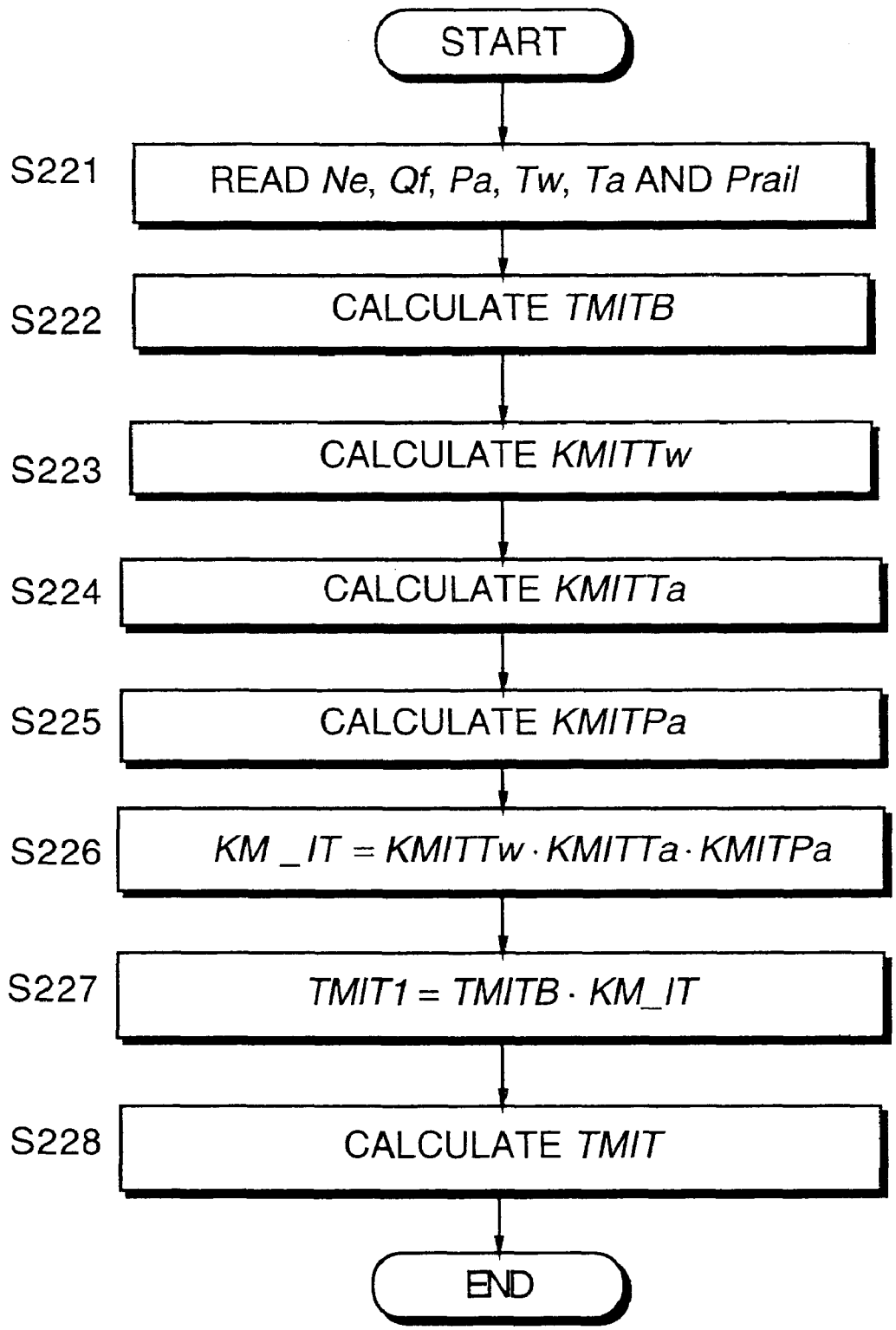
FIG. 56 is a flowchart describing a calculation routine of a target main fuel injection timing TMIT executed by the controller.

Next a calculation routine for a target main fuel injection timing TMIT will be described with reference to FIG. 56. This routine is executed synchronous with the Ref signal input.

Firstly in a step S221, the controller 41 reads the engine rotation speed Ne, the fuel injection amount Qf, the atmospheric pressure Pa, the cooling water temperature Tw, the collector intake fresh air temperature Ta and the pilot fuel injection permission flag F_PQ.

Figure 57:
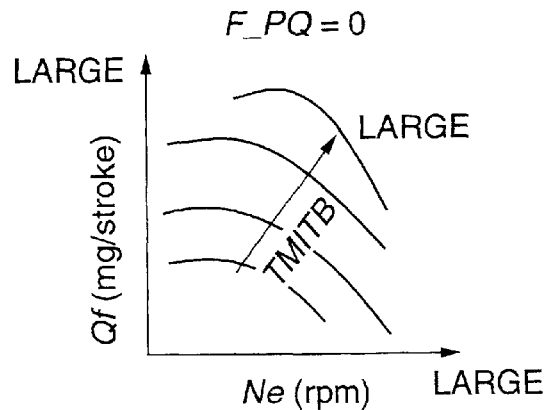
FIG. 57 is a diagram showing the characteristics of a map of a main fuel injection timing corresponding to the combustion pattern X stored in the controller.
Figure 58:
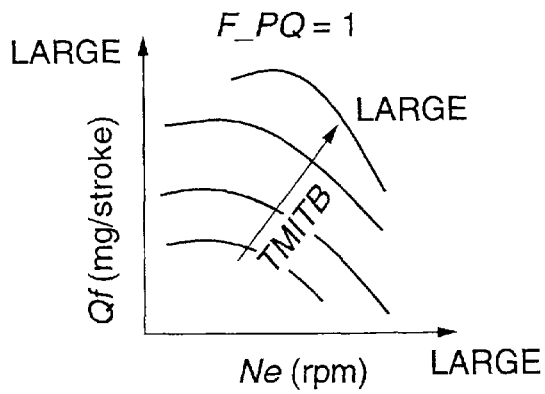
FIG. 58 is a diagram showing the characteristics of a map of a main fuel injection timing corresponding to the combustion pattern Y stored in the controller.
Figure 59:
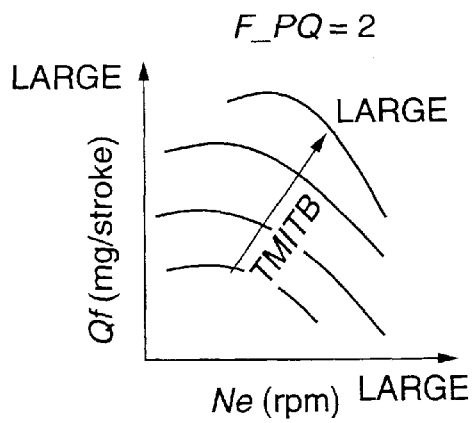
FIG. 59 is a diagram showing the characteristics of a map of a main fuel injection timing corresponding to the combustion pattern Z stored in the controller.

In a next step S222, a map having the characteristics as shown in any of FIGS. 57–59 which is pre-stored in the memory of the controller 41 is selected and the selected map is used in order to calculate a basic value TMITB for the target main fuel injection timing based on the engine rotation speed Ne and the fuel injection amount Qf.

Referring to FIGS. 47A–47C, in the combustion pattern X, only the main fuel injection is performed after the compression top dead center and the low-temperature premixing combustion is realized as a result, while in the combustion patterns Y and Z, both the pilot fuel injection and the main fuel injection are performed before the compression top dead center.

The map shown in FIG. 57 defines the basic value TMITB to realize the main fuel injection timing corresponding to the combustion pattern X. The map shown in FIG. 58 defines the basic value TMITB to realize the main fuel injection timing corresponding to the combustion pattern Y. The map shown in FIG. 58 defines the basic value TMITB to realize the main fuel injection timing corresponding to a combustion pattern Z.

Figure 60:
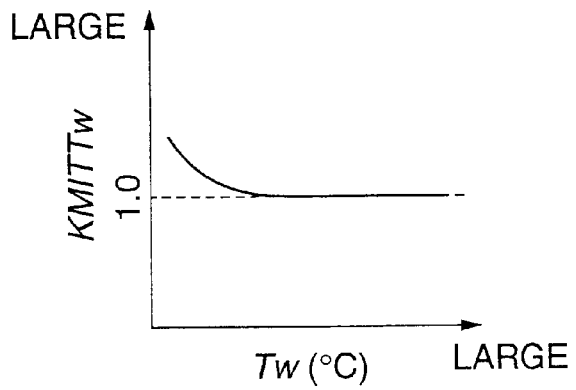
FIG. 60 is a diagram showing the characteristics of a map for a water temperature correction coefficient KMITTw for an injection timing, stored in the controller.

In this manner, after the basic value TMITB for the target main fuel injection timing is set, in a following step S233, the routine calculates a water temperature correction coefficient KMITTw for the injection timing based on the cooling water temperature Tw by looking up a map having the characteristics as shown in FIG. 60 which is pre-stored in the memory of the controller 41.

Figure 61:
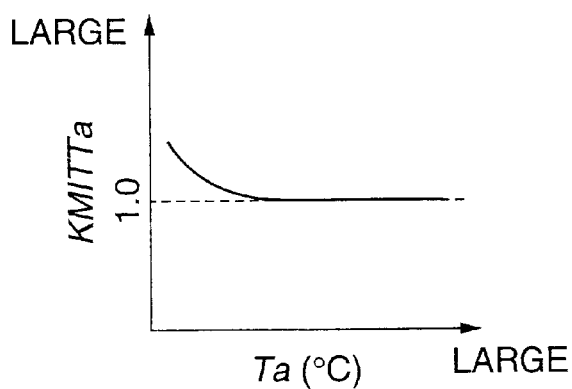
FIG. 61 is a diagram showing the characteristics of a map for a collector intake fresh air temperature correction coefficient KMITTa stored in the controller.

Next in a step S224, a collector intake fresh air temperature correction coefficient KMITTa for the injection timing is calculated based on the collector intake fresh air temperature Ta by looking up a map having the characteristics as shown in FIG. 61 which is pre-stored in the memory of the controller 41.

Figure 62:
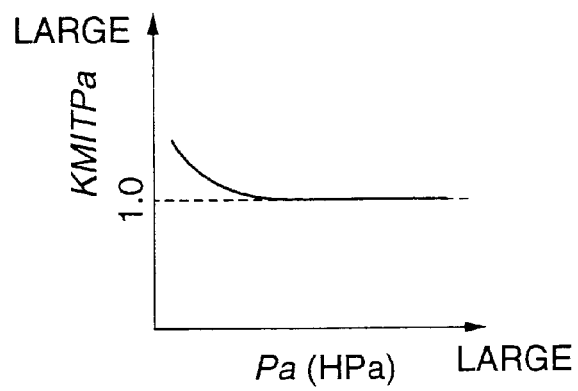
FIG. 62 is a diagram showing the characteristics of a map for an atmospheric pressure correction coefficient KMITPa for the injection timing, stored in the controller.

Next in a step S225, an atmospheric pressure correction coefficient KMITPa for the injection timing is calculated based on the atmosphere pressure Pa by looking up a map having the characteristics as shown in FIG. 62 which is pre-stored in the memory of the controller 41.

In a step S226, a main fuel injection timing correction coefficient KM_IT is calculated from Equation (24).

$$KM\_IT = KMITTw \cdot KMITTa \cdot KMITPa \quad (24)$$

In a next step S227, a target main fuel injection timing TMIT1 is calculated by multiplying a main fuel injection timing correction coefficient KM_IT by the target main fuel injection timing basic value TMITB.

The target main fuel injection timing basic value TMITB is an advance amount measured from a predetermined crank angle position in an advancing direction. Thus when the correction coefficients KMITTw, KMITTa, KMITPa are greater than one, the main fuel injection timing is advanced.

In FIG. 60, the reason the correction coefficient KMITTW is set to a value greater than one during low water temperatures may be explained as follows. When the water temperature is low, the fuel temperature is also low and there is a tendency for combustion to be delayed. Thus the delay in combustion can be corrected by shifting the center of combustion in the advancing direction.

This is the same reason for why in FIG. 61, the correction coefficient KMITTa during a low collector intake fresh air temperature Ta is greater than one and in FIG. 62, the correction coefficient KMITPa for low atmospheric pressure Pa is set to a value greater than one.

Although the target main fuel injection timing basic value TMITB is set to respective values depending on the three combustion patterns X, Y, Z, the correction coefficient KM_IT on the main fuel injection timing is not set in each combustion pattern. This is due to the fact that the calculation logic becomes complicated when the correction coefficient KM_IT on the main fuel injection timing is set to each combustion pattern.

Figure 63:
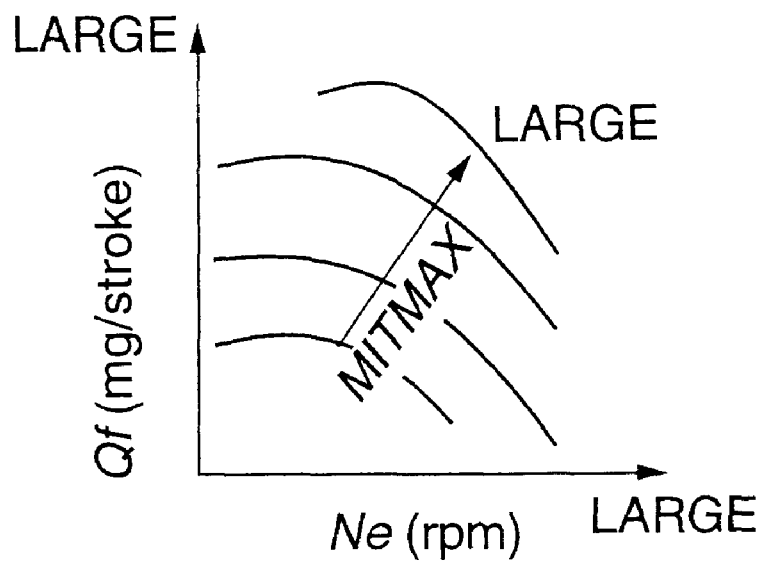
FIG. 63 is a diagram showing the characteristics of a map of a maiximum main fuel injection timing MITMAX stored in the controller.
Figure 64:
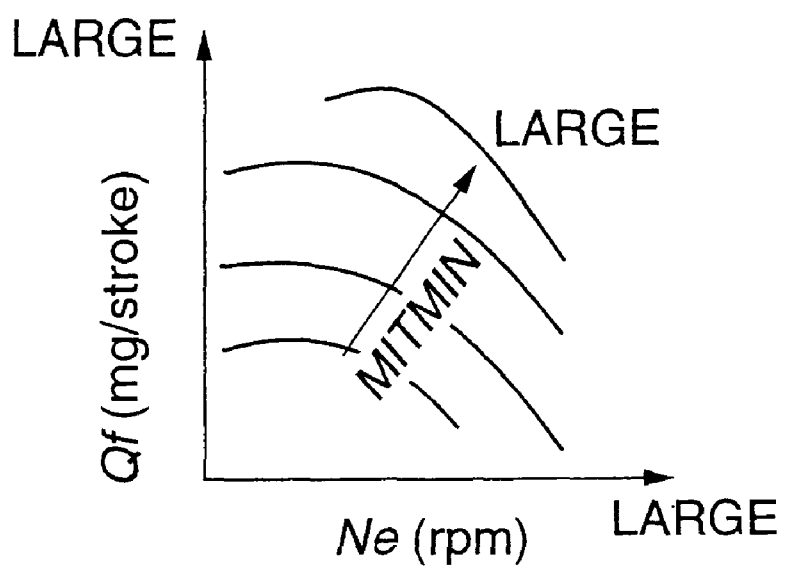
FIG. 64 is a diagram showing the characteristics of a map of a minimum main fuel injection timing MITMIN stored in the controller.

After calculating the target main fuel injection timing TMIT1, the controller 41 in a step S228 applies a limiting process on the target main fuel injection timing TMIT1. That is to say, a maximum main fuel injection timing MITMAX is calculated based on the engine rotation speed Ne by looking up a map having the characteristics as shown in FIG. 63 which is pre-stored in the memory of the controller 41. The maximum main fuel injection timing MITMAX describes the advancing limit on the main fuel injection timing. In the same manner, a minimum main fuel injection timing MITMIN is calculated based on the engine rotation speed Ne by looking up a map having the characteristics as shown in FIG. 64 which is pre-stored in the memory of the controller 41. The minimum main fuel injection timing MITMIN describes the retard limit on the main fuel injection timing. When the target main fuel injection timing TMIT1 is greater than the maximum main fuel injection timing MITMAX, the target main fuel injection timing TMIT1 is limited to the maximum main fuel injection timing MITMAX. When the target main fuel injection timing TMIT1 is less than the maximum main fuel injection timing MITMIN, the target main fuel injection timing TMIT1 is limited to the minimum main fuel injection timing MITMIN.

The controller 41 sets the value which has been limited in the above manner as the target main fuel injection timing TMIT. The controller 41 controls the start timing of the main fuel injection by outputting a fuel injection signal to the three-way solenoid valve 25 at a timing corresponding to the target main fuel injection timing TMIT.

Figure 65:
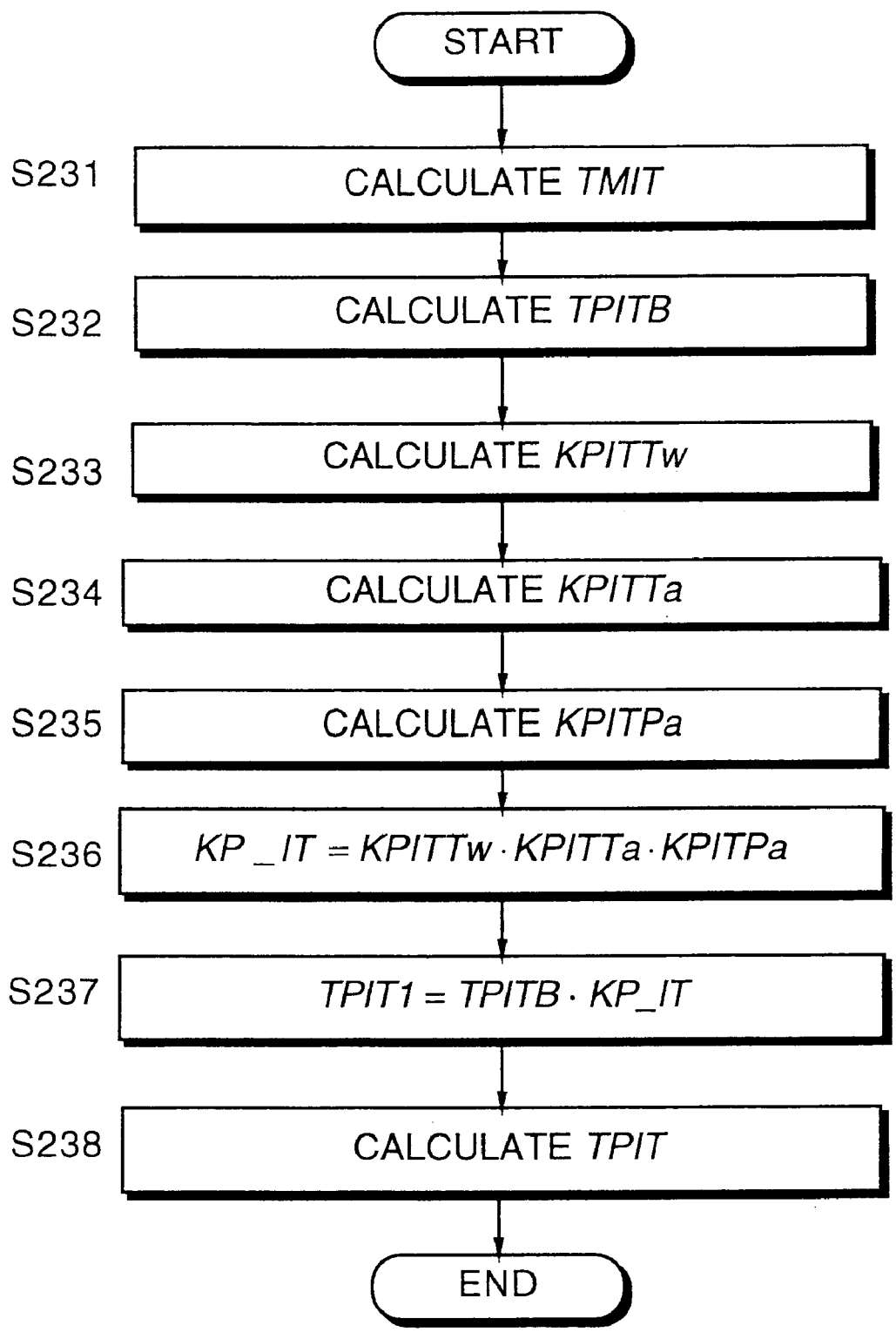
FIG. 65 is a flowchart describing a calculation routine of a target pilot fuel injection timing TPIT executed by the controller.

A calculation routine for a target pilot fuel injection timing TPIT will be described below with reference to FIG. 65. The controller 41 executes this routine synchronous with the Ref signal input only when the pilot fuel injection permission flag F_PQ has a value of one or two. When the pilot fuel injection permission flag F_PQ has a value of zero, the routine is not executed since pilot fuel injection is not performed.

The method of calculating the target pilot fuel injection timing TPIT is based on the calculation method of the target main fuel injection timing TMIT.

Firstly in a step S231, the controller 41 reads the engine rotation speed Ne, the fuel injection amount Qf, the atmospheric pressure Pa, the cooling water temperature Tw, the collector intake fresh air temperature Ta and the pilot fuel injection permission flag F_PQ.

Figure 66:
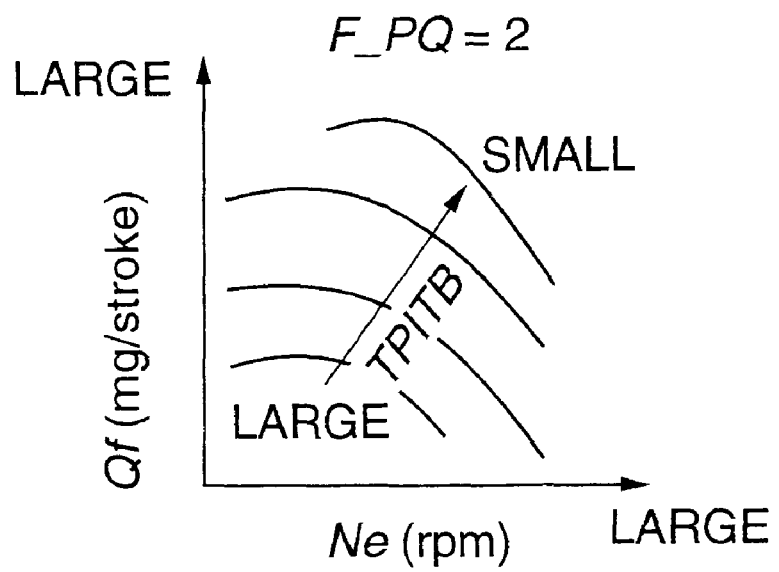
FIG. 66 is a diagram showing the characteristics of a map of a basic value TPIT for a target pilot fuel injection timing corresponding to a pilot fuel injection permission flag F_PQ=2, stored in the controller.
Figure 67:
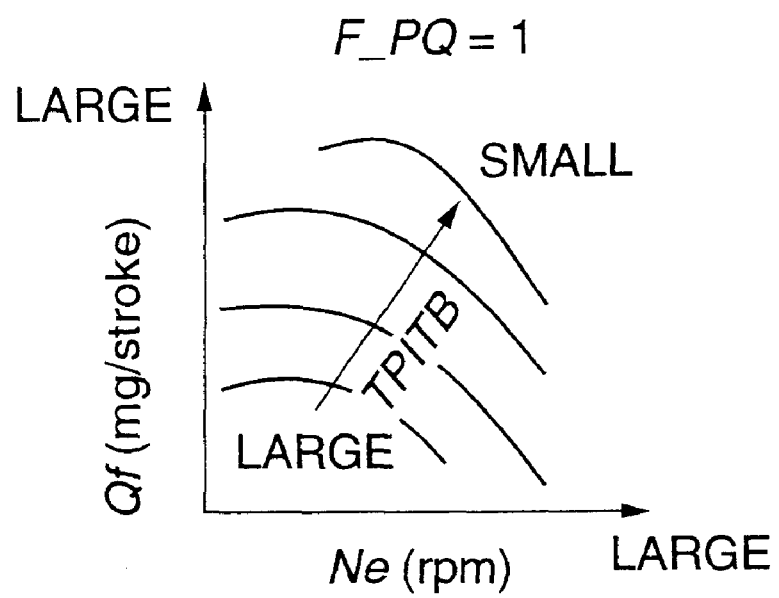
FIG. 67 is a diagram showing the characteristics of a map of a basic value TPITB for the target pilot fuel injection timing corresponding to the pilot fuel injection permission flag F_PQ=1, stored in the controller.

In a next step S232, a map having the characteristics as shown in FIG. 66 or a map having the characteristics as shown in FIG. 67 which are pre-stored in the memory of the controller 41 is selected according to the value of the pilot fuel injection permission flag F_PQ. The selected map is used in order to calculate a basic value TPITB for the target pilot fuel injection timing based on the engine rotation speed Ne and the fuel injection amount Qf.

Figure 68:
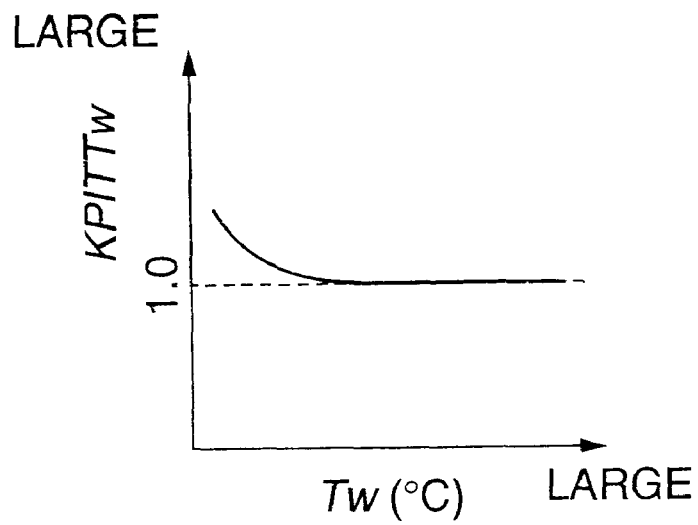
FIG. 68 is a diagram showing the characteristics of a map of a water temperature correction coefficient KPITTw for the pilot fuel injection timing stored in the controller.

In the following step S233, the routine calculates a water temperature correction coefficient KPITTw for the pilot fuel injection timing based on the cooling water temperature Tw by looking up a map having the characteristics as shown in FIG. 68 which is pre-stored in the memory of the controller 41.

Figure 69:
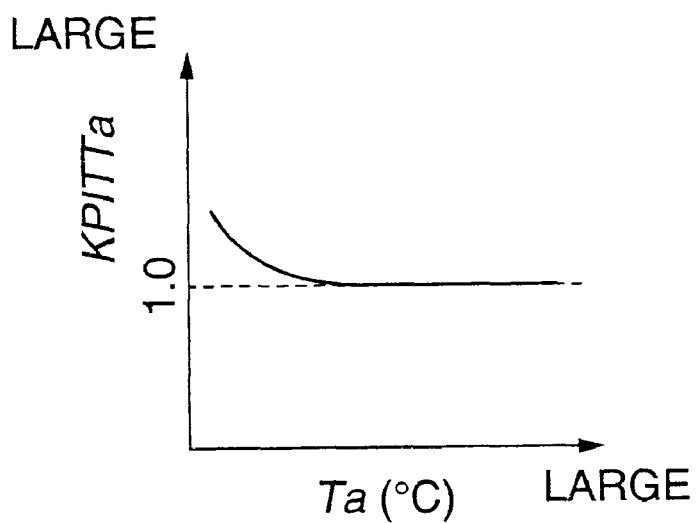
FIG. 69 is a diagram showing the characteristics of a map of a collector intake fresh air temperature correction coefficient KPITTa for the pilot fuel injection timing, stored in the controller.

Next in a step S234, a collector intake fresh air temperature correction coefficient KPITTa for the pilot fuel injection timing is calculated based on the collector intake fresh air temperature Ta by looking up a map having the characteristics as shown in FIG. 69 which is pre-stored in the memory of the controller 41.

Figure 70:
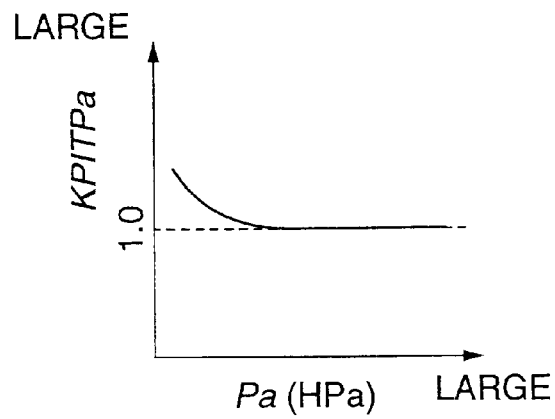
FIG. 70 is a diagram showing the characteristics of a map of an atmospheric pressure correction coefficient KPITPa stored in the controller.

Next in a step S235, an atmospheric pressure correction coefficient KPITPa is calculated based on the atmospheric pressure Pa by looking up a map having the characteristics as shown in FIG. 70 which is pre-stored in the memory of the controller 41.

In a step S236, a target pilot fuel injection timing correction coefficient KP_IT is calculated from Equation (25).

$$KP\_IT = KPITTw \cdot KPITTa \cdot KPTPa \qquad (25)$$

In a next step S237, a target pilot fuel injection timing TPIT1 is calculated by multiplying the target pilot fuel injection timing correction coefficient KP_IT by the target pilot fuel injection timing basic value TPITB.

The target pilot fuel injection timing basic value TPITB in the same manner as the target main fuel injection timing basic value TMITB is an advance amount measured from a predetermined crank angle position in an advancing direction. Thus when the correction coefficients KPITTw, KPITTa, KPITPa are greater than one, the pilot fuel injection timing is corrected in an advancing direction. The characteristics of the correction coefficients KPITTw, KPITTa, KPITPa shown in FIGS. 68–70 are the same as the correction coefficients KMITTw, KMITTa, KMITPa related to main fuel injection shown in FIGS. 60–62.

Figure 71:
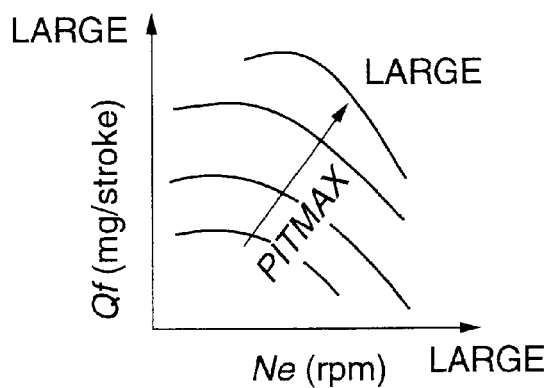
FIG. 71 is a diagram showing the characteristics of a map of a maximum pilot fuel injection timing PITMAX stored in the controller.

After calculating the target pilot fuel injection timing TPIT1, in a step S238, the controller 41 applies a limiting process on the target pilot fuel injection timing TPIT1. That is to say, a maximum pilot fuel injection timing PITMAX is calculated based on the engine rotation speed Ne by looking up a map having the characteristics as shown in FIG. 71 which is pre-stored in the memory of the controller 41.

Figure 72:
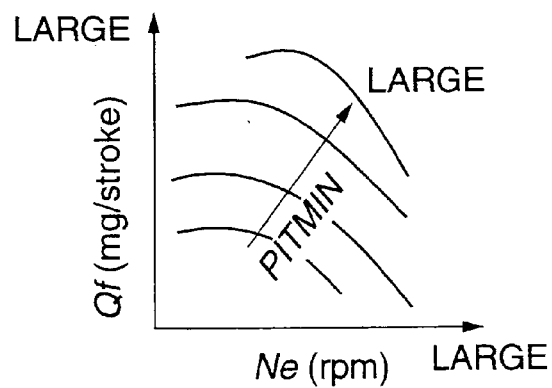
FIG. 72 is a diagram showing the characteristics of a map of a minimum pilot fuel injection timing PITMIN stored in the controller.

The maximum pilot fuel injection timing PITMAX describes the advance limit on the pilot fuel injection timing. In the same manner, a minimum pilot fuel injection timing PITMIN is calculated based on the engine rotation speed Ne by looking up a map having the characteristics as shown in FIG. 72 which is pre-stored in the memory of the controller 41. The minimum pilot fuel injection timing PITMIN describes the retard limit on the pilot fuel injection timing.

When the target pilot fuel injection timing TPIT1 is greater than the maximum pilot fuel injection timing PITMAX, the target pilot fuel injection timing TPIT1 is limited to the maximum pilot fuel injection timing PITMAX. When the target pilot fuel injection timing TPIT1 is less than the minimum pilot fuel injection timing PITMIN, the target pilot fuel injection timing TPIT1 is limited to the minimum pilot fuel injection timing PITMIN.

The controller 41 sets the value which has been limited in the above manner as the target pilot fuel injection timing TPIT. The controller 41 controls the start timing of the pilot fuel injection by outputting a fuel injection signal to the three-way solenoid valve 25 at a timing corresponding to the target pilot fuel injection timing TPIT.

Figure 73:
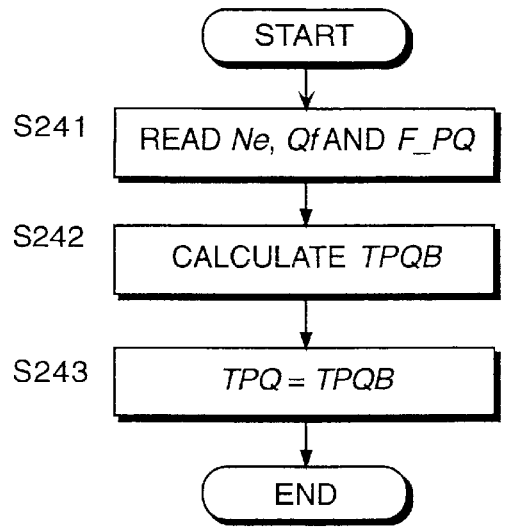
FIG. 73 is a flowchart describing a calculation routine for a target pilot fuel injection amount TPQ executed by the controller.

A calculation routine for a target pilot fuel injection amount TPQ will be described below with reference to FIG. 73. The controller 41 executes this routine synchronous with the Ref signal input only when the pilot fuel injection permission flag F_PQ has a value of one or two. When the pilot fuel injection permission flag F_PQ has a value of zero, the routine is not executed since pilot fuel injection is not performed.

Firstly in a step S241, the controller 41 reads the engine rotation speed Ne, the fuel injection amount Of, and the pilot fuel injection permission flag F_PQ.

Figure 74:
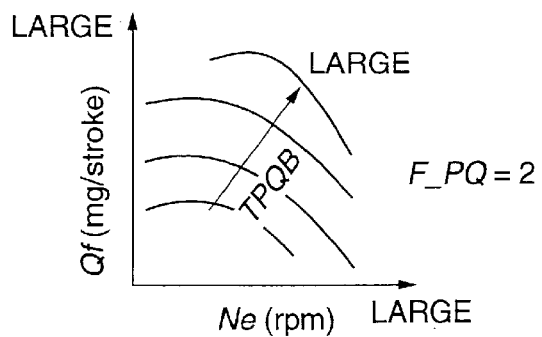
FIG. 74 is a diagram showing the characteristics of a map of a basic value TPQB for the target pilot fuel injection amount corresponding to the pilot fuel injection permission flag F_PQ=2 stored in the controller.
Figure 75:
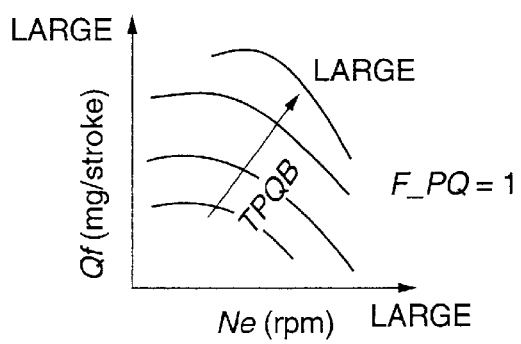
FIG. 75 is a diagram showing the characteristics of a map of a basic value TPQB for the target pilot fuel injection amount corresponding to the pilot fuel injection permission flag F_PQ=1, stored in the controller.

In a next step S242, a map having the characteristics as shown in either FIG. 74 or 75 which are pre-stored in the memory of the controller 41 is selected according to the pilot fuel injection permission flag F_PQ. The selected map is used in order to calculate a basic value TPQB for the target pilot fuel injection amount based on the engine rotation speed Ne and the fuel injection amount Qf.

In a following step S243, the target pilot fuel injection amount basic value TPQB is set as the target pilot fuel injection amount TPQ. The controller 41 controls the pilot fuel injection amount by outputting a fuel injection signal having a pulse width corresponding to the target pilot fuel injection amount TPQ to the three-way solenoid valve 25.

The fuel injection amount Qf represents the total of fuel injection amounts during pilot and main fuel injection. Thus a value subtracting the target pilot fuel injection amount TPQ from the target fuel injection amount Qf corresponds to the target main fuel injection amount.

The controller 41 performs control of the fuel injection timing and the fuel injection amount in the above manner.

Referring again to FIGS. 47A–47C, the pilot fuel injection amount is different in the combustion pattern Y and the combustion pattern Z. The injection interval from starting pilot fuel injection to starting main fuel injection is also different. The characteristics of the maps of the basic value TPITB of the target pilot fuel injection timing as shown in FIGS. 66 and 67 are set in response to the difference in the injection interval between the combustion pattern Y and the combustion pattern Z.

The characteristics of the maps of the target pilot fuel injection amount basic value TPQB as shown in FIGS. 74 and 75 are also set in response to the differences in the pilot fuel injection amount between the combustion pattern Y and the combustion pattern Z.

The result of experiments conducted by the inventors has shown that when the engine rotation speed is less than or equal to 4000 revolutions per minute (rpm), the pilot fuel injection amount in combustion pattern X is 0.2 to 1.0 milligrams per stroke cycle. The injection interval in combustion pattern Y corresponds to a crank angle of 7–18 degrees.

In the same manner, the pilot fuel injection amount in the combustion pattern ç±U is 1.5 to 3.0 milligrams per stroke cycle and the injection interval in combustion pattern Z corresponds to a crank angle of 30 degrees.

Although the upper limit of the engine rotation speed used in experiments was 4000 revolutions per minute, the invention is not limited to this value. The effect of reducing combustion noise due to pilot fuel injection differs with respect to engine rotation speed and type of engine.

However on the basis of the experimental results of the inventors with respect to three types of engine having completely different displacement volumes, all the engines satisfied the above values. Thus the range of values above represents general recommended values.

According to experiments performed by the inventors, when calculating the target pilot fuel injection amount basic value TPQB, the map as shown in FIG. 75 which is applied when the pilot fuel injection permission flag F_PQ has a value of one must return a value which is smaller than the map as shown in FIG. 74 which is applied when the pilot fuel injection permission flag F_PQ has a value of two.

According to experiments performed by the inventors, when the engine rotation speed increases, the injection interval is slightly reduced. When the engine load increases, the injection interval is slightly reduced. Thus the basic value TPITB for the target pilot fuel injection timing takes a small value which varies in the direction of the arrow in FIGS. 66 and 67 in order to realize the combustion pattern Y and Z.

The target pilot fuel injection timing basic value TPITB is set according to the two combustion patterns Y and Z. The correction coefficient KP_IT on the target pilot fuel injection timing is not set with respect to each combustion pattern. This is because the calculation logic becomes complicated when the target pilot fuel injection timing correction coefficient KP_IT is set to each combustion pattern.

Figure 77A:
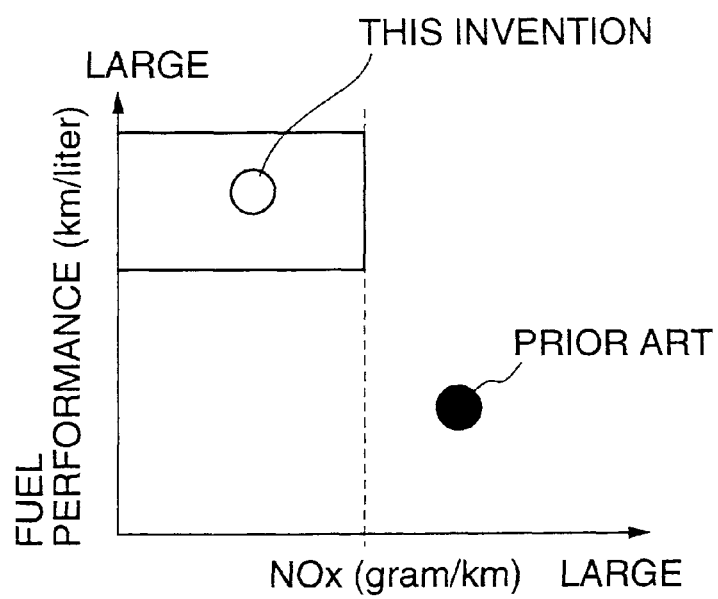
FIGS. 77A and 77B are diagrams showing an amount of fuel and particulate matter generated under fuel injection control performed by the fuel injection control device according to this invention.
Figure 77B:
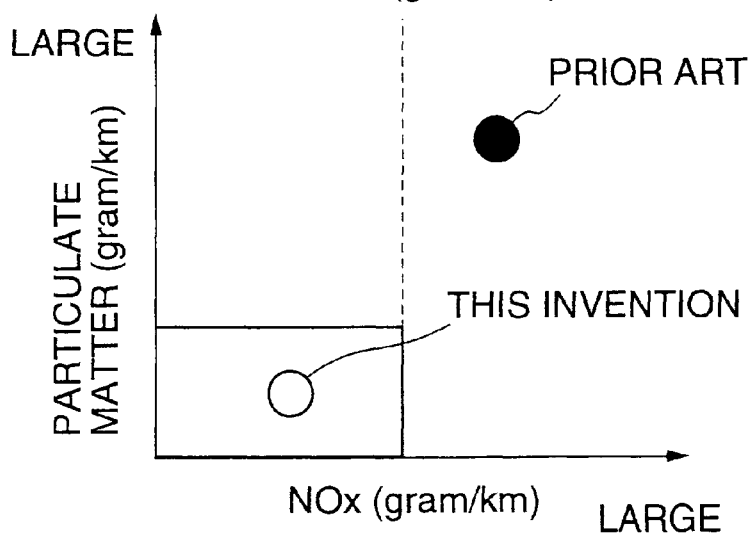

When executing the above control during vehicle acceleration, in the region B where the intake pressure is low and the EGR rate is in excess, combustion pattern Y is applied as shown in FIG. 47B. In the region C where the excess EGR rate is eliminated, the combustion pattern Z as shown in FIG. 47C is applied. During the steady running state, low-temperature premixing combustion pattern X is applied as shown in FIG. 47A. As a result, as shown in FIGS. 76A–76F, the combustion noise of the diesel engine 51 during acceleration is smaller in comparison to control in the prior arts. Further, as shown in FIGS. 77A and 77B, the generated amount of particulate matter or NOx is decreased and fuel performance is improved in comparison to control in the prior arts.

In fuel recovery operations during deceleration, in a state where the turbocharging pressure is high due to the turbo lag while the fuel injection amount is small, the oxygen amount becomes excess and the ignition delay is small. On the other hand, after the turbocharging pressure is reduced, the oxygen amount becomes insufficient and the ignition delay is large. When the controller 41 performs control as described above, the turbocharging pressure is high while the fuel injection amount is small, the fuel pattern Z in FIG. 47C is applied. After reducing the turbocharging pressure, the combustion pattern Y in FIG. 47B is applied. These combustion patterns make it possible to obtain preferred effects such as reductions in combustion noise, improvement of exhaust composition and fuel performance during fuel recovery operations during vehicle deceleration.

A second embodiment of this invention related to the setting of the pilot fuel injection permission flag F_PQ will be described below with reference to FIGS. 78 to 80.

Figure 78:
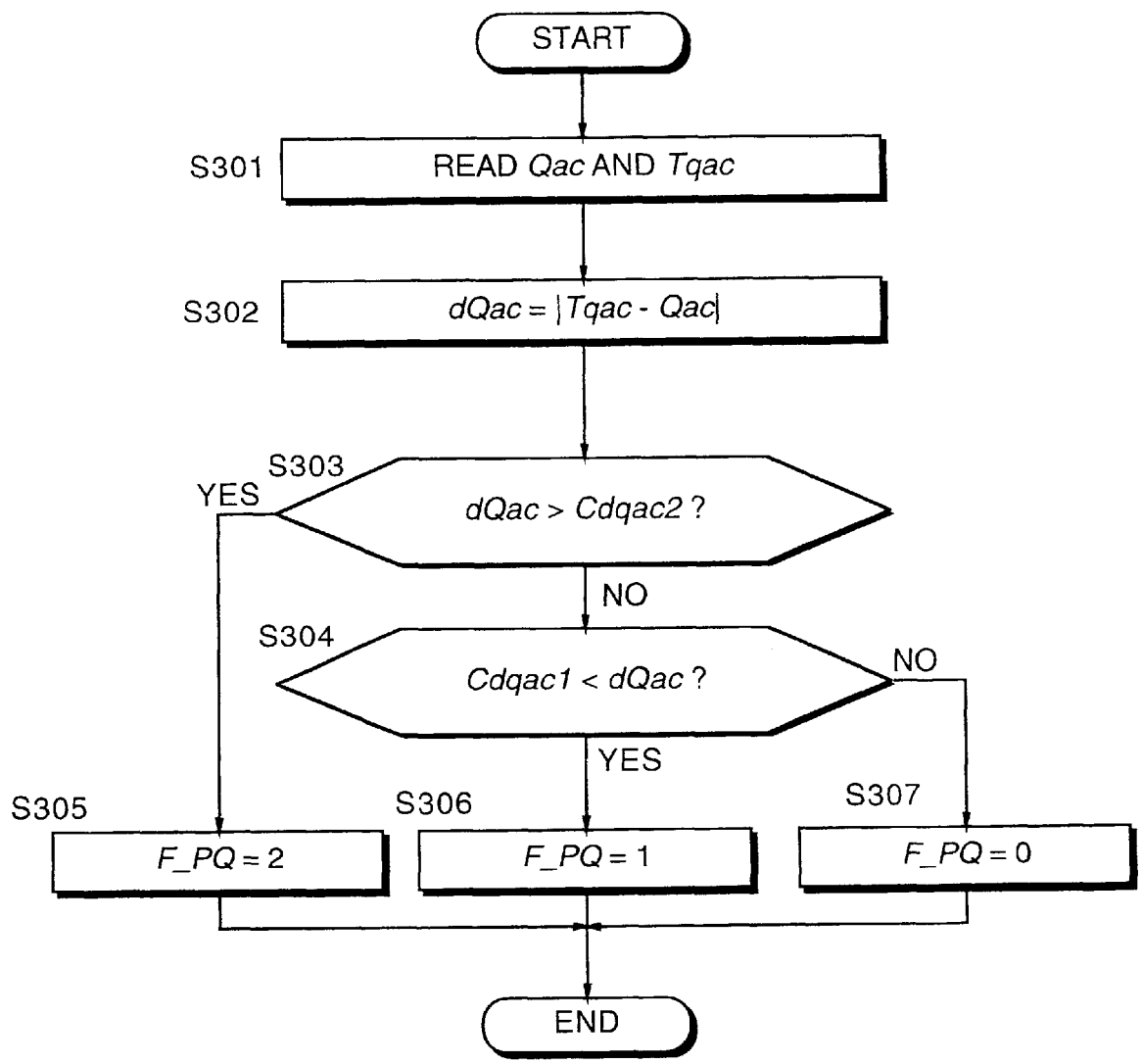
FIG. 78 is similar to FIG. 55, but showing a second embodiment of this invention.

In this embodiment, the controller 41 executes a routine shown in FIG. 78 instead of the routine in FIG. 55 for setting the pilot fuel injection permission flag F_PQ. This routine is executed at an interval of ten milliseconds.

Referring to FIG. 78, the controller 41 reads the cylinder intake fresh air amount Qac and a target cylinder intake fresh air amount Tqac in a step S301.

Figure 79:
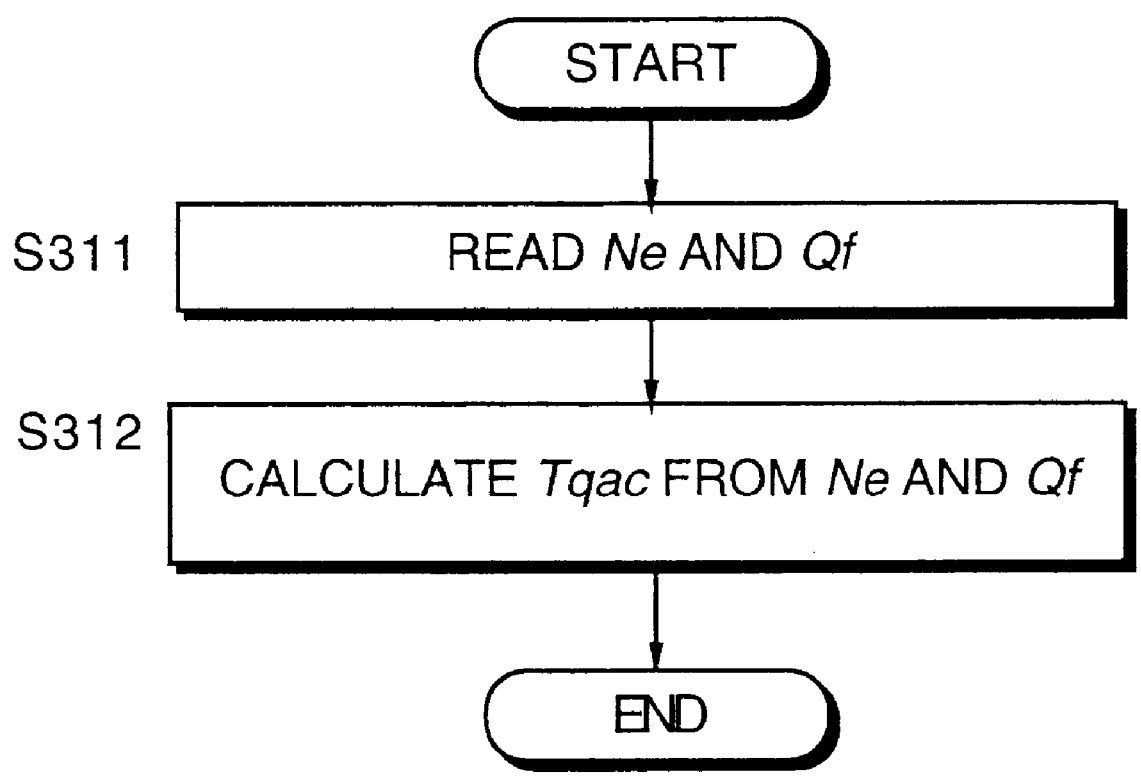
FIG. 79 is a flowchart describing a calculation routine for a target cylinder intake fresh air amount Tqac executed by a controller according to the second embodiment of this invention.

The target cylinder intake fresh air amount Tqac is calculated by a routine shown in FIG. 79. The controller 41 executes this routine at an interval of ten milliseconds.

Referring to FIG. 79, firstly in a step S311, the controller 41 reads the engine rotation speed Ne and the fuel injection amount Qf.

Figure 80:
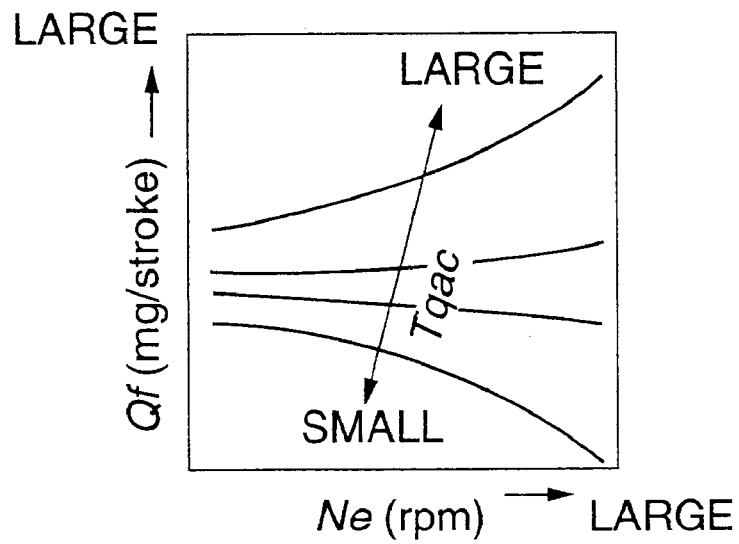
FIG. 80 is a diagram of the characteristics of a map of the target cylinder intake fresh air amount Tqac stored in the controller according to the second embodiment of this invention.

In a next step S312, the target cylinder intake fresh air amount Tqac is calculated from the engine rotation speed Ne and the fuel injection amount Qf by looking up a map having the characteristics shown in FIG. 80 which is pre-stored in the memory of the controller 41.

Referring again to FIG. 78, after reading the target cylinder intake fresh air amount Tqac and the cylinder intake fresh air amount Qac, in a step S302, the controller 41 calculates a difference dQac of the target cylinder intake fresh amount Tqac and the cylinder intake fresh air amount Qac. The difference dQac is calculated as an absolute value. The reason the difference dQac is expressed as an absolute value is in order to apply this control routine not only during acceleration but also during deceleration.

In a next step S303, the difference dQac is compared with a predetermined value Cdqac2. When the difference dQac is greater than the predetermined value Cdqac2, the pilot fuel injection permission flag F_PQ is set to two in a step S305. When the difference dQac is not greater than the predetermined value Cdqac2, the difference dQac is compared with a predetermined value Cdqac1.

The predetermined values Cdqac1 and Cdqac2 are values for determining whether or not the state of the diesel engine 51 corresponds to any of the regions B, C, D shown in FIGS. 46A–46E. The predetermined value Cdqac2 is set to a larger value than the predetermined value Cdqac1.

When the difference dQac is greater than the predetermined value Cdqac1, in a step S306, the pilot fuel injection permission flag F_PQ is set to one. When the difference dQac is not greater than the predetermined value Cdqac1, in a step S307, the pilot fuel injection permission flag F_PQ is set to zero.

In this embodiment, the determination of the regions B, C, D is performed based on the difference dQac between the target cylinder intake fresh air amount Tqac and the cylinder intake fresh air amount Qac.

A third embodiment of this invention related to the setting of the pilot fuel injection permission flag F_PQ will be described with reference to FIGS. 81 to 82. In this embodiment, the controller 41 executes the routine shown in FIG. 81 instead of the pilot fuel injection permission flag F_PQ setting routine in FIG. 55. This routine is executed at an interval of ten milliseconds.

Figure 81:
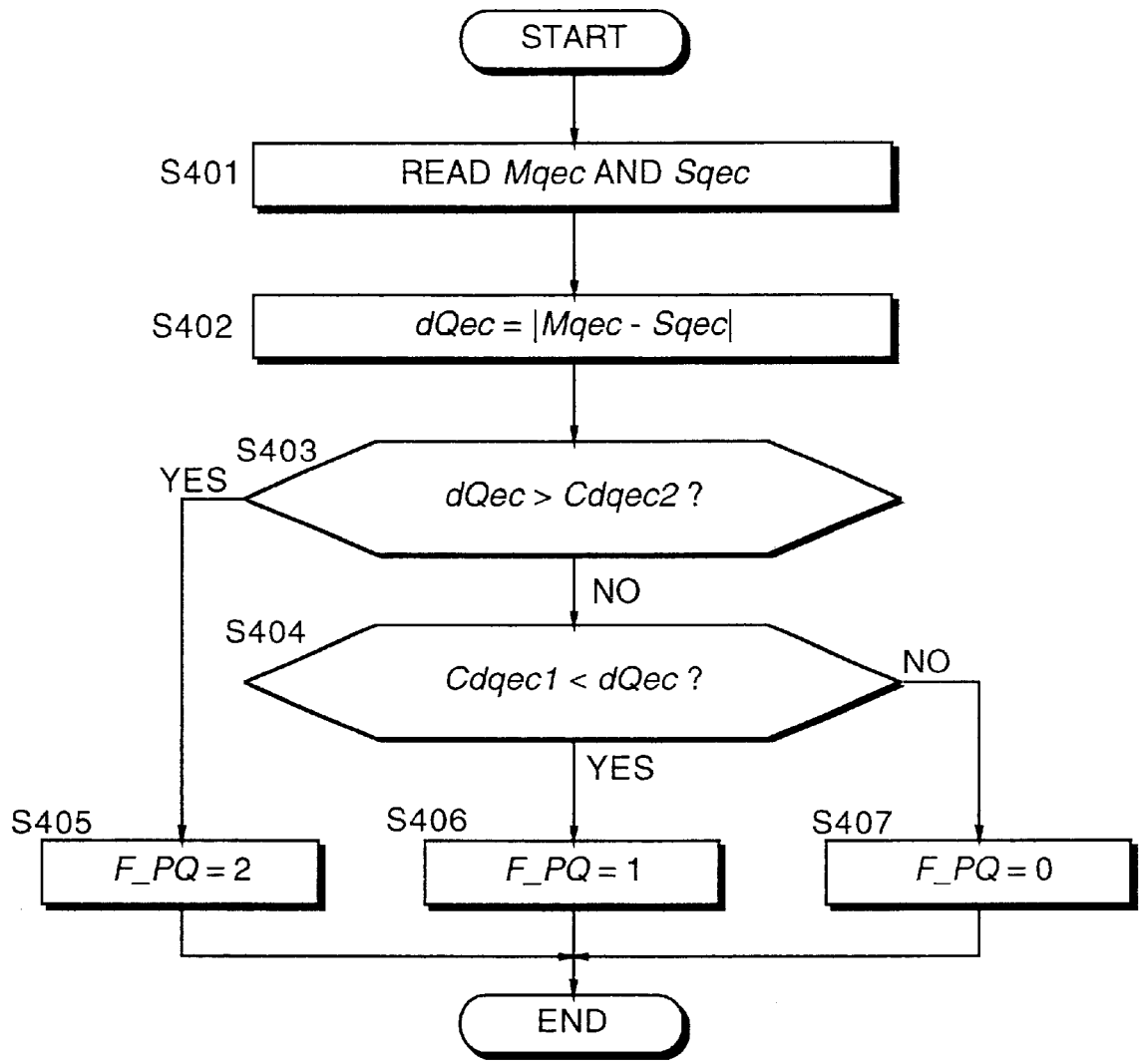
FIG. 81 is similar to FIG. 55, but showing a third embodiment of this

Referring to FIG. 81, the controller 41 reads the target intake EGR amount Mqec and a second target intake EGR amount Sqec. The target intake EGR amount Mqec is a value obtained by multiplying the target EGR rate Megr by the cylinder intake fresh air amount Qac as described above.

Figure 82:
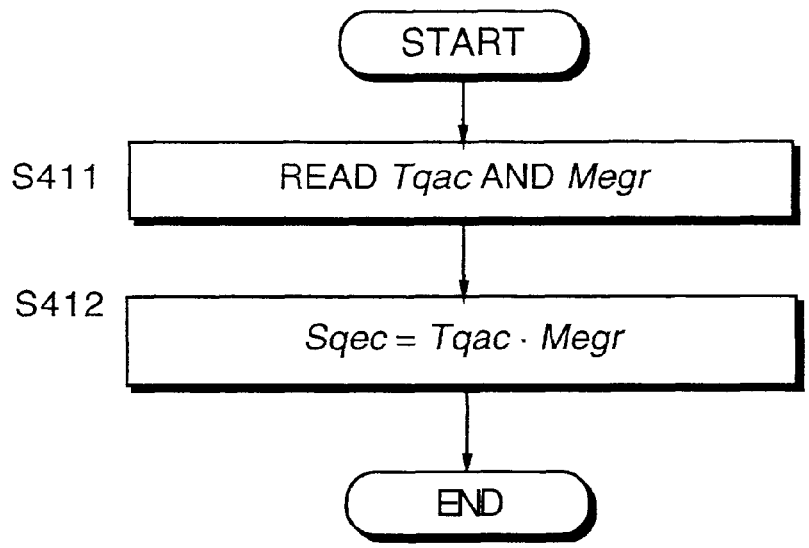
FIG. 82 is a flowchart describing a calculation routine for a second target intake EGR amount Sqec executed by a controller according to the third embodiment of this invention.

The second target intake EGR amount Sqec is calculated by a routine shown in FIG. 82. The controller 41 performs this routine synchronous with the Ref signal input.

Firstly in a step S411, the controller 41 reads the target cylinder intake fresh air amount Tqac and the target EGR rate Megr.

In a next step S412, the second target intake EGR amount Sqec is calculated by multiplying the target EGR rate Megr by the target cylinder intake fresh air amount Tqac.

Referring again to FIG. 81, after reading the target intake EGR amount Mqec and the second target intake EGR amount Sqec in a step S401, the controller 41 calculates a difference dQec of the target intake EGR amount Mqec and the second target intake EGR amount Sqec in a step S402. The difference dQec is calculated as an absolute value. The reason the difference dQec is expressed as an absolute value is in order to apply this control routine not only during acceleration but also during deceleration.

In a next step S403, the difference dQec is compared with a predetermined value Cdqec2. When the difference dQec is greater than the predetermined value Cdqec2, the pilot fuel injection permission flag F_PQ is set to two in a step S405. When the difference dqec is not greater than the predetermined value Cdqec2, the difference dQec is compared with a predetermined value Cdqec1 in a step S404.

The predetermined values Cdqec1 and Cdqec2 are values for determining whether or not the state of the diesel engine 51 corresponds to any of the regions B, C, D shown in FIGS. 46A–46E. The predetermined value Cdqec2 is set to a larger value than the predetermined value Cdqec1.

When the difference dQec is greater than the predetermined value Cdqec1, in a step S406, the pilot fuel injection permission flag F_PQ is set to one. When the difference dQec is not greater than the predetermined value Cdqec1, in a step S407, the pilot fuel injection permission flag F_PQ is set to zero.

The difference dQec used in this routine to determine the region is equal to a value representing the target EGR rate Megr multiplied by the difference dQac calculated in the step S302 in FIG. 78. When the target EGR rate Megr during acceleration as shown in FIG. 46D is fixed, the difference dQec is normally proportional to the difference dQac.

Thus this embodiment allows determination of the regions B, C, D to be performed based on the difference dQec in the EGR amount flowing into the cylinder. Furthermore it is possible to use the difference in the EGR rate instead of the difference dQec in the EGR amount as a parameter to determine the regions B, C, D.

A fourth embodiment of this invention related to setting the pilot fuel injection permission flag F_PQ will be described below with reference to FIGS. 83–85. This embodiment performs a routine shown in FIG. 83 instead of the routine shown in FIG. 55 for setting the pilot fuel injection permission flag F_PQ. The routine is executed at an interval of ten milliseconds.

Figure 83:
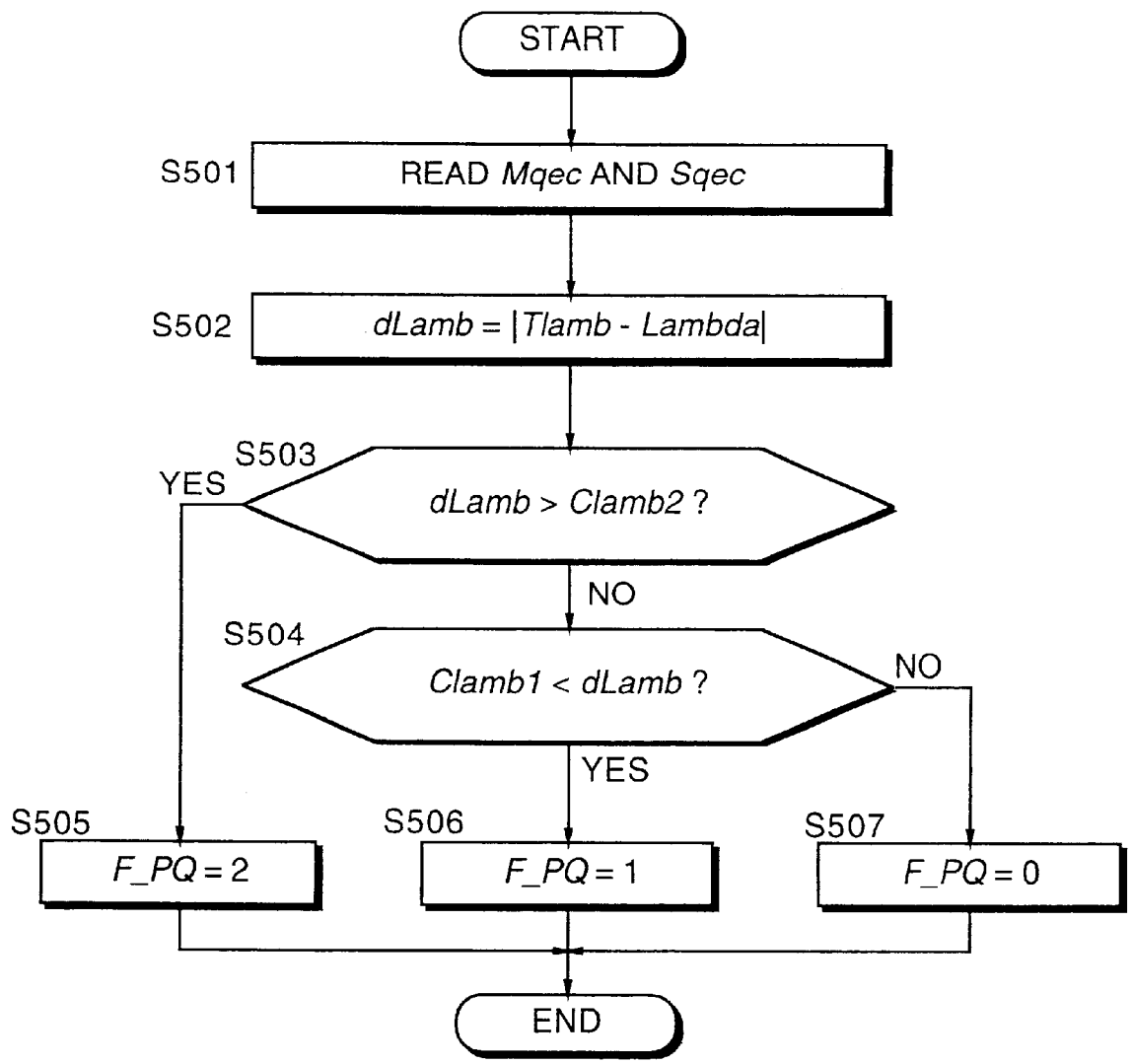
FIG. 83 is similar to FIG. 55, -but showing a fourth embodiment of this invention.

Referring to FIG. 83, the controller 41 reads a real excess air factor Lambda and a target excess air factor Tlamb in a step S501.

Figure 84:
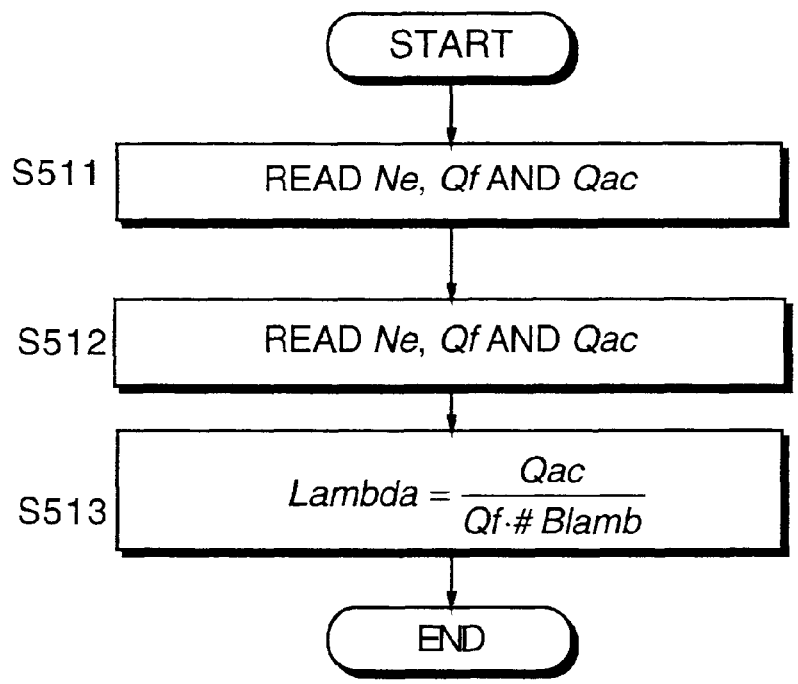
FIG. 84 is a flowchart describing a calculation routine for a target excess air factor Tlamb and a real excess air factor Lambda executed by a controller according to the fourth embodiment of this invention.

The real excess air factor Lambda and the target excess air factor Tlamb are calculated by a routine shown in FIG. 84. This routine is performed synchronous with the Ref signal input.

Referring to FIG. 84, firstly in a step S511, the controller 41 reads the engine rotation speed Ne, the fuel injection amount Qf and the cylinder intake fresh air amount Qac.

Figure 85:
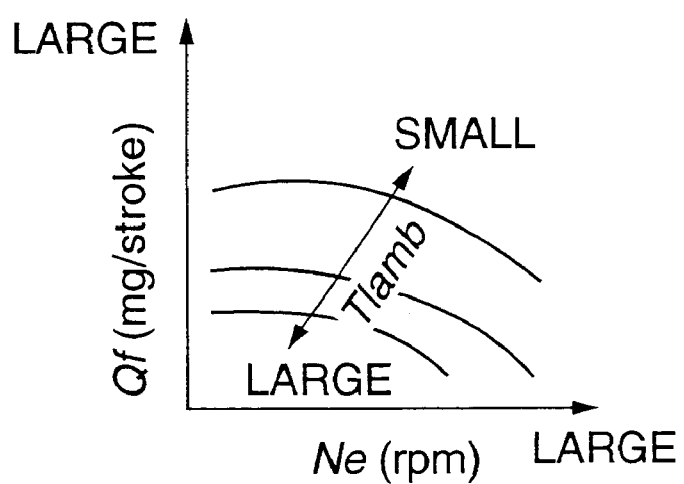
FIG. 85 is a diagram of the characteristics of a map for the target excess air factor Tlamb stored in the controller according to the fourth embodiment of this invention.

In a next step S512, a target excess air factor Tlamb is calculated from the engine rotation speed Ne and the fuel injection amount Qf by looking up a map having the characteristics shown in FIG. 85 which is pre-stored in the memory of the controller 41.

In a next step S513, the real excess air factor Lambda is calculated from Equation (26).

$$Lambda = \frac{Qac}{Qf \cdot \#Blamb} \quad (26)$$

where, #Blamb = stoichiometric air-fuel ratio.

Referring again to FIG. 83, after reading the target excess air factor Tlamb and the real excess air factor Lambda, in a step S502, the controller 41 calculates a difference dLamb of the target excess air factor Tlamb and the real excess air factor Lambda. The difference dLamb is calculated as an absolute value. The reason the difference dLamb is expressed as an absolute value is in order to apply this control routine not only during acceleration but also during deceleration.

In a next step S503, the difference dLamb is compared with a predetermined value Clamb2. When the difference dLamb is greater than the predetermined value Clamb2, the pilot fuel injection permission flag F_PQ is set to two in a step S505. When the difference dLamb is not greater than the predetermined value Clamb2, the difference dLamb is compared with a predetermined value Clamb1 in a step S504.

The predetermined values Clamb1 and Clamb2 are values for determining whether or not the state of the diesel engine 51 corresponds to any of the regions B, C, D shown in FIGS. 46A–46E. The predetermined value Clamb2 is set to a larger value than the predetermined value Clamb1.

When the difference dLamb is greater than the predetermined value Clamb1, in a step S506 the pilot fuel injection permission flag F_PQ is set to one. When the difference dLamb is not greater than the predetermined value Clamb1, in a step S507, the pilot fuel injection permission flag F_PQ is set to zero.

Thus this embodiment allows determination of the regions B, C, D to be performed based on the difference dLamb of the target excess air factor Tlamb and the real excess air factor Lambda.

As shown in the second to fourth embodiments, when the cylinder intake fresh air amount, the cylinder intake EGR amount or the excess air factor are used instead of the turbocharging pressure in order to determine the regions B, C, D, the following differences result.

When Using the Cylinder Intake Fresh Air Amount

What gives a direct influence on the combustion in the diesel engine 51 is the fresh air intake amount, not the turbocharging pressure.

When the air flow meter 55 which measures the fresh air flowrate is disposed in the upstream section of the intake passage 52, the time period from the variation in the measured flowrate of fresh air until the resultant variation in the intake fresh air amount is larger than the time period from the variation in the measured turbocharging pressure until the resultant variation in the intake pressure of the diesel engine 51. Furthermore, a flowrate sensor has a higher cost than a pressure sensor. Despite these drawbacks, the control based on the fresh air intake flowrate has the advantage that highly accurate control characteristics are obtained, due to the fact that the factor directly affecting the combustion is measured and the control is performed according to the measurement result.

When Using the Cylinder Intake EGR Amount

Variation in the EGR amount varies the oxygen amount and the oxygen concentration of gas aspirated into the diesel engine 51 and has a large effect on the ignition delay period as well as the fuel injection timing. Thus performing determination of the combustion region based on the EGR amount means that the control is responsive to the ignition delay period. This has a large effect on reducing combustion noise related to the ignition delay period.

When Using the Excess Air Factor

The definition of the excess air factor, i.e., excess air factor=cylinder intake fresh air amount/(fuel injection amount×14.7), means that it is possible to take variation in the fuel injection amount as well as the cylinder intake fresh air amount into account when determining combustion regions. Since variation in the fuel injection amount is more rapid than the variation in the cylinder intake fresh air amount, determining combustion regions by monitoring the ratio of the above variables displays a higher accuracy during transient running states than using solely the cylinder intake fresh air amount or the cylinder intake EGR amount.

The contents of Tokugan 2001-1547, with a filing date of Jan. 9, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the above embodiments are related to the diesel engine which perform low-temperature premixing combustion during the steady running state. However this invention may also be applied to a diesel engine performing diffusive combustion during the steady running state. Low temperature premixing combustion means combustion in which a heat release pattern corresponds to that of a single-stage combustion.

Combustion mainly comprising diffusive combustion does not have a heat release pattern of this type. Actually diesel engines which perform low-temperature premixing combustion during the steady running state encounter substantial difficulty in realizing low-temperature premixing combustion in all the steady running states. When the load becomes large in these engines, the combustion pattern changes to diffusive combustion from low-temperature premixing combustion.

Combustion mainly comprising diffusive combustion generally displays inferior exhaust composition in comparison to low-temperature premixing combustion. However, a diesel engine which mainly performs diffusive combustion can also suppress combustion noise and improve exhaust composition during transient running states by applying this invention to fuel injection control during transient running states.

In the above embodiments, the diesel engine 51 is provided with the common-rail fuel injection mechanism 10. However this invention may be applied to a diesel engine provided with any type of fuel injection mechanism.

In the above embodiments, the diesel engine 51 is provided with the variable geometry turbocharger 2, but this invention may be applied to a diesel engine provided with a fixed capacity turbocharger.

Furthermore, this invention may be applied to a diesel engine in which different control methods are applied with respect to the EGR control or the turbocharging pressure control other than those disclosed in the above embodiments.

The embodiments of this invention in which an exclusive property or privilege is claimed are defined as follows:

What is claimed is:

1. A fuel injection control device for a diesel engine, the diesel engine comprising a piston reciprocating through a compression top dead center and a fuel injection mechanism of which a fuel injection amount and a fuel injection timing is controllable, the device comprising:
   a sensor which detects a parameter expressing either of oxygen concentration and oxygen amount in gas aspirated into the diesel engine; and
   a programmable controller programmed to:
      calculate a difference between a parameter value set for a steady running state of the diesel engine and the parameter detected by the sensor;
      control the fuel injection mechanism, when the difference is greater than a predetermined value, to cause the fuel injection mechanism to perform a main fuel injection at a first timing which completes a combustion of an injected fuel before the compression top dead center and a pilot fuel injection at a second timing earlier than the first timing; and
      control the fuel injection mechanism, when the difference is smaller than the predetermined value, to cause the fuel injection mechanism to perform a pilot fuel injection at a third timing with an injection amount which is larger than an injection amount of the pilot injection performed when the difference is greater than the predetermined value, and a main injection at a fourth timing, an interval between the third timing and the fourth timing being larger than a period required for combusting fuel injected by the pilot injection at the third timing.

2. The fuel injection control device as defined in claim 1, wherein the diesel engine further comprises a turbocharger which turbocharges an intake fresh air of the diesel engine, and the parameter comprises a turbocharging pressure of the turbocharger.

3. The fuel injection control device as defined in claim 1, wherein the parameter comprises an intake fresh air amount of the diesel engine.

4. The fuel injection control device as defined in claim 1, wherein the diesel engine further comprises an exhaust recirculation mechanism which recirculates a part of an exhaust gas of the diesel engine into the diesel engine, and the parameter comprises either of an exhaust gas recirculation amount and an exhaust gas recirculation rate of the exhaust recirculation mechanism.

5. The fuel injection control device as defined in claim 1, wherein the parameter comprises an air excess factor of a fuel mixture combusted in the diesel engine.

6. The fuel injection control device as defined in claim 1, wherein the controller is further programmed to prevent the fuel injection mechanism from performing the pilot fuel injection when the difference is smaller than a second predetermined value which is smaller than the predetermined value.

7. The fuel injection control device as defined in claim 6, wherein the controller is further programmed to set the main fuel injection timing, when the difference is smaller than the second predetermined value, to a timing later than the compression top dead center.

8. The fuel injection control device as defined in claim 1, wherein the diesel engine further comprises an exhaust recirculation mechanism which recirculates a part of an exhaust gas of the diesel engine into the diesel engine, and the controller is further programmed to control the fuel injection mechanism and the exhaust recirculation mechanism to cause the diesel engine to perform a low-temperature premixing combustion which has a heat release pattern of a single-stage, when the difference is smaller than a second predetermined value which is smaller than the predetermined value.

9. The fuel injection control device as defined in claim 1, wherein the injection amount of the pilot fuel injection performed when the difference is greater than the predetermined value is set to 0.2 to 1.0 milligrams per stroke cycle of the piston, and an interval between the first timing and the second timing is set to 7 to 18 degrees in a crank angle of the piston.

10. The fuel injection control device as defined in claim 1, wherein the injection amount of the pilot fuel injection performed when the difference is smaller than the predetermined value is set to 1.5 to 3.0 milligrams per stroke cycle of the piston, and the interval between the third timing and the fourth timing is set to 30 degrees in crank angle of the piston.

11. The fuel injection control device as defined in claim 1, wherein the device further comprises a sensor which detects an operating state of the diesel engine, and the controller is further programmed to calculate the target parameter value based on the operating state of the diesel engine.

12. A fuel injection control device for a diesel engine, the diesel engine comprising a piston reciprocating through a compression top dead center and a fuel injection mechanism of which a fuel injection amount and a fuel injection timing is controllable, the device comprising:
   means which detects a parameter expressing either of oxygen concentration and oxygen amount in gas aspirated into the diesel engine;
   means for calculating a difference between a parameter value set for a steady running state of the diesel engine and the parameter detected by the sensor;
   means for controlling the fuel injection mechanism, when the difference is greater than a predetermined value, to cause the fuel injection mechanism to perform a main fuel injection at a first timing which completes a combustion of an injected fuel before the compression top dead center and a pilot fuel injection at a second timing earlier than the first timing; and
   means for controlling the fuel injection mechanism, when the difference is smaller than the predetermined value, to cause the fuel injection mechanism to perform a pilot fuel injection at a third timing with an injection amount which is larger than an injection amount of the pilot injection performed when the difference is greater than the predetermined value, and a main injection at a fourth timing, an interval between the third timing and the fourth timing being larger than a period required for combusting fuel injected by the pilot injection at the third timing.

13. A fuel injection control method for a diesel engine, the diesel engine comprising a piston reciprocating through a compression top dead center and a fuel injection mechanism of which a fuel injection amount and a fuel injection timing is controllable, the method comprising:

detecting a parameter expressing either of oxygen concentration and oxygen amount in gas aspirated into the diesel engine;

calculating a difference between a parameter value set for a steady running state of the diesel engine and the parameter detected by the sensor;

controlling the fuel injection mechanism, when the difference is greater than a predetermined value, to cause the fuel injection mechanism to perform a main fuel injection at a first timing which completes a combustion of an injected fuel before the compression top dead center and a pilot fuel injection at a second timing earlier than the first timing; and controlling the fuel injection mechanism, when the difference is smaller than the predetermined value, to cause the fuel injection mechanism to perform a pilot fuel injection at a third timing with an injection amount which is larger than an injection amount of the pilot injection performed when the difference is greater than the predetermined value, and a main injection at a fourth timing, an interval between the third timing and the fourth timing being larger than a period required for combusting fuel injected by the pilot injection at the third timing.

* * * * *